(12) United States Patent
Moriguchi et al.

(10) Patent No.: US 8,989,438 B2
(45) Date of Patent: Mar. 24, 2015

(54) MOBILE BODY TRACK IDENTIFICATION SYSTEM

(75) Inventors: Yukie Moriguchi, Tokyo (JP); Yuusuke Konishi, Tokyo (JP); Yuichi Nino, Tokyo (JP)

(73) Assignee: NEC Corporation, Tokyo (JP)

( * ) Notice: Subject to any disclaimer, the term of this patent is extended or adjusted under 35 U.S.C. 154(b) by 448 days.

(21) Appl. No.: 13/391,199

(22) PCT Filed: Aug. 13, 2010

(86) PCT No.: PCT/JP2010/063770
§ 371 (c)(1),
(2), (4) Date: Feb. 17, 2012

(87) PCT Pub. No.: WO2011/021588
PCT Pub. Date: Feb. 24, 2011

(65) Prior Publication Data
US 2012/0148102 A1 Jun. 14, 2012

(30) Foreign Application Priority Data

Aug. 20, 2009 (JP) ................................. 2009-191358
Dec. 10, 2009 (JP) ................................. 2009-280926

(51) Int. Cl.
*G06K 9/00* (2006.01)
*G06T 7/20* (2006.01)
(52) U.S. Cl.
CPC ....... *G06T 7/208* (2013.01); *G06T 2207/10016* (2013.01); *G06T 2207/30241* (2013.01)
USPC ........................................................ 382/103
(58) Field of Classification Search
None
See application file for complete search history.

(56) References Cited

U.S. PATENT DOCUMENTS 7,965,867 B2 * 6/2011 Lanz .............................. 382/103
8,374,388 B2 * 2/2013 Stolkin et al. ................. 382/103
(Continued)

FOREIGN PATENT DOCUMENTS

JP 2003-139856 A 5/2003
JP 2005-031955 A 2/2005
(Continued)

OTHER PUBLICATIONS

Communication dated Dec. 16, 2014, issued by the Japanese Patent Office in counterpart Japanese application No. 2011-527661.

*Primary Examiner* — Tahmina Ansari
(74) *Attorney, Agent, or Firm* — Sughrue Mion, PLLC

(57) ABSTRACT

There is provided a mobile body track identification system that determines which mobile body matches which detected track with a high precision irrespective of frequent interruption of tracks of a mobile body detected in a tracking area. Herein, hypotheses are generated by use of sets of track-coupling candidate/identification pairs, which combines track-coupling candidates, combining tracks of a mobile body detected in a predetermined time in the past, and identifications of the mobile body and which satisfies a predetermined condition. Next, identification likelihoods are calculated as likelihoods of detecting identifications in connection with tracks indicated by track-coupling candidates included in track-coupling candidate/identification pairs ascribed to each of the selected hypotheses. Identification likelihoods are integrated per each track-coupling candidate/identification pair, thus calculating an identification likelihood regarding the selected hypothesis. A most-probable hypothesis is estimated based on identification likelihoods of hypotheses.

33 Claims, 32 Drawing Sheets

(56) References Cited

U.S. PATENT DOCUMENTS

| | | | |
|---|---|---|---|
| 2003/0108220 A1* | 6/2003 | Jepson et al. | 382/103 |
| 2003/0219146 A1* | 11/2003 | Jepson et al. | 382/103 |
| 2008/0031492 A1* | 2/2008 | Lanz | 382/103 |
| 2008/0170751 A1* | 7/2008 | Lei et al. | 382/103 |
| 2009/0012703 A1* | 1/2009 | Aso et al. | 701/200 |
| 2012/0148102 A1* | 6/2012 | Moriguchi et al. | 382/103 |
| 2013/0100286 A1* | 4/2013 | Lao | 348/148 |

FOREIGN PATENT DOCUMENTS

| | | |
|---|---|---|
| JP | 2005-250692 A | 9/2005 |
| JP | 2006-352626 A | 12/2006 |
| JP | 2007-087150 A | 4/2007 |
| JP | 2008-122093 A | 5/2008 |
| JP | 2008-535041 A | 8/2008 |
| JP | 2008-299742 A | 12/2008 |
| JP | 2009-151359 A | 7/2009 |

\* cited by examiner

IDENTIFICATION DETECTION PROBABILITY MAP
OF IDENTIFICATION INFORMATION DETECTION DEVICE 2a

| 0.9 | 0.8 | 0.6 | 0.3 | 0.1 | 0.1 | 0.1 | 0.1 | 0.01 |
|---|---|---|---|---|---|---|---|---|
| 0.8 | 0.7 | 0.5 | 0.3 | 0.1 | 0.1 | 0.1 | 0.01 | 0.01 |
| 0.6 | 0.5 | 0.4 | 0.2 | 0.1 | 0.1 | 0.01 | 0.01 | 0.01 |
| 0.3 | 0.3 | 0.2 | 0.1 | 0.1 | 0.01 | 0.01 | 0.01 | 0.01 |
| 0.1 | 0.1 | 0.1 | 0.1 | 0.01 | 0.01 | 0.01 | 0.01 | 0.01 |

IDENTIFICATION DETECTION PROBABILITY MAP
OF IDENTIFICATION INFORMATION DETECTION DEVICE 2b

| 0.01 | 0.01 | 0.01 | 0.01 | 0.01 | 0.1 | 0.1 | 0.1 | 0.1 |
|---|---|---|---|---|---|---|---|---|
| 0.01 | 0.01 | 0.01 | 0.01 | 0.1 | 0.1 | 0.2 | 0.3 | 0.3 |
| 0.01 | 0.01 | 0.01 | 0.1 | 0.1 | 0.2 | 0.3 | 0.5 | 0.6 |
| 0.01 | 0.01 | 0.1 | 0.1 | 0.1 | 0.3 | 0.5 | 0.7 | 0.8 |
| 0.01 | 0.1 | 0.1 | 0.1 | 0.1 | 0.3 | 0.6 | 0.8 | 0.9 |

| TIME \ DEVICE NUMBER | IDENTIFICATION INFORMATION DETECTION DEVICE 2a | IDENTIFICATION INFORMATION DETECTION DEVICE 2b |
|---|---|---|
| $t_1$ | ID1 | |
| $t_2$ | ID1 | |
| $t_3$ | | |
| $t_4$ | | |
| $t_5$ | | |
| $t_6$ | | |
| $t_7$ | | |
| $t_8$ | | ID1 |
| $t_9$ | | ID1 |

□ : 0

▨ : 3.0

▨ : 0.5

MOBILE BODY TRACK IDENTIFICATION SYSTEM

CROSS REFERENCE TO RELATED APPLICATION

This application is a National Stage of International Application No. PCT/JP2010/063770 filed Aug. 13, 2010, claiming priority based on Japanese Patent Application Nos. 2009-191358 filed Aug. 20, 2009, and 2009-280926 filed Dec. 10, 2009, the contents of all of which are incorporated herein by reference in their entirety.

TECHNICAL FIELD

The present invention relates to a mobile body track identification system which keeps track of the position of a mobile body while discriminating the identification of the mobile body, thus determining which mobile body matches with the recognized track. Additionally, the present invention relates to a mobile body track identification method and a mobile body track identification system.

BACKGROUND ART

In general, a mobile body such as a person or an object is tracked using the correlation between positional information of a mobile body and its identification. That is, it is possible to univocally identify and track a mobile body by way of the correlation between positional information of a mobile body and its identification. Various technologies have been developed with respect to mobile body tracking techniques (see Patent Document 1, Patent Document 2).

Patent Document 1 discloses a person tracking device which shoots images of persons in a surveillance area with a sensor (a viewable camera) so as to extract features of persons based on video signals output from the sensor. This person tracking device learns the correlation between identifications and features of persons, thus specifying an ID of a person based on the result of learning and newly extracted features. Additionally, the person tracking device outputs tracking information including an ID of a specified person and features of the person. When it fails to track a person halfway, the person tracking device specifies an ID of a person again based on the result of learning and the features of the person with whom tracking is resumed. That is, when an interruption occurs in tracking a person, the person tracking device specifies an ID of a person again based on the features extracted at the timing of resuming tracking.

Patent Document 2 discloses a mobile body tracking system equipped with a surveillance camera for shooting images in a predetermined space. This mobile body tracking system obtains positional information by identifying a mobile body based on the output of a surveillance camera, thus managing the correlation between positional information and a first identification inherent in each mobile body. Additionally, the mobile body tracking system reads a second identification inherent in each mobile body, thus managing the correlation between the positional information and the second identification. The mobile body tracking system includes a position management table for managing the correlation between positional information and a third identification. Moreover, the mobile body tracking system includes a position estimation table for managing the correlation between the second identification and the third identification. The mobile body tracking system tracks a mobile body with reference to the position management table and the position estimation table. That is, the mobile body tracking system integrates detection information produced by a plurality of sensors, thus tracking a mobile body.

CITATION LIST PATENT LITERATURE

PLT 1: Japanese Patent Application Publication No. 2008-299742 (see paragraphs 0006, 0008 through 0013)
PLT 2: Japanese Patent Application Publication No. 2005-31955 (see paragraphs 0008, 0009)

SUMMARY OF THE INVENTION

Problem to be Solved by the Invention

In general, cameras are able to track mobile bodies but they do not identify mobile bodies; hence, it is impossible to determine which mobile body is being tracked with cameras. Using individual identification devices such as RFID (Radio Frequency Identification) readers which are located at various positions in a monitored area, it is possible to follow which mobile body is passing by individual identification devices, but it is impossible to follow the track of a mobile body at a remote place distanced from individual identification devices.

The person tracking device disclosed in Patent Document 1 combines a camera with a function of extracting features of persons, while the mobile body tracking system disclosed in Patent Document 2 achieves tracking of mobile bodies by combining a camera with a plurality of sensors.

When a plurality of mobile bodies exists at the same position to approach each other (or overlap with each other), interruption may occur in tracking a specific mobile body. A person tracking device or a mobile body tracking system is able to follow the track of a mobile body when it successfully extracts feature information or when it successfully extracts identification information with a sensor. When interruption occurs frequently in tracking, it is necessary to resume tracking based on newly extracted feature information or identification information, thus lowering a tracking precision of a mobile body. That is, it resumes tracking of a mobile body based on a small amount of information newly extracted after the occurrence of interruption in tracking a mobile body, wherein it is impossible to determine which mobile body matches which track being recognized with a high precision.

It may be possible to detect feature information or identification information in the limited situation in which the size or position of a mobile body in a viewing angle of a camera satisfies a certain condition or in which a mobile body exists in an area that allows a sensor to detect a radio tag; this prevents frequent detection of information. For this reason, numerous tracks, which cannot be correlated to identification information of a mobile body, may occur due to frequent interruption of tracking. Additionally, a track of an object, which is not subjected to tracking, may cause noise. This noise constitutes a factor of increasing the number of tracks that cannot be correlated to identification information.

Solution to Problem

The present invention is made in consideration of the aforementioned circumstances, wherein an object thereof is to provide a mobile body track identification system that is able to determine which mobile body matches which track based on identification information. Additionally, the present invention provides a mobile body track identification method and a mobile body track identification program.

A mobile body track identification system of the present invention includes a track-coupling candidate generation part that generates track-coupling candidates each representing a combination of tracks of a mobile body detected in a predetermined time in the past; a hypothesis generation part that generates sets of track-coupling candidate/identification pairs, which combine identification information of the mobile body, detected in the predetermined time in the past, with track-coupling candidates, so as to generate hypotheses by use of the sets of track-coupling candidate/identification pairs satisfying a predetermined condition; and a likelihood calculation part which selects an individual hypothesis so as to calculate identification likelihoods representing likelihoods of detecting the identification information with respect to tracks specified by track-coupling candidates, included in track-coupling candidate/identification pairs ascribed to the selected hypothesis, and which integrates identification likelihoods per each track-coupling candidate/identification pair so as to calculate an identification likelihood of the selected hypothesis, thus estimating a most-probable hypothesis based on the identification likelihood per each hypothesis.

According to the present invention, a mobile body track identification method and a mobile body track identification program, which causes a computer to execute the mobile body track identification method, comprises the steps of: generating track-coupling candidates each representing a combination of tracks of a mobile body detected in a predetermined time in the past; generating sets of track-coupling candidate/identification pairs, which combine identification information of the mobile body, detected in the predetermined time in the past, with track-coupling candidates, so as to generate hypotheses by use of the sets of track-coupling candidate/identification pairs satisfying a predetermined condition; selecting an individual hypothesis so as to calculate identification likelihoods representing likelihoods of detecting the identification information with respect to tracks specified by track-coupling candidates, included in track-coupling candidate/identification pairs ascribed to the selected hypothesis; and integrating identification likelihoods per each track-coupling candidate/identification pair so as to calculate an identification likelihood of the selected hypothesis, thus estimating a most-probable hypothesis based on the identification likelihood per each hypothesis.

In the above, it is possible to refer to a probability map which defines in advance detection probabilities of the identification information of a mobile body in response to positional coordinates in a tracking area. Alternatively, it is possible to refer to track/identification correlation likelihoods representing likelihoods of correlating the identification information to tracks of a mobile body. Alternatively, it is possible to refer to attribute information or mobility information of a mobile body. It is possible to estimate a most-probable hypothesis based on a track-coupling likelihood representing a likelihood of connecting tracks included in track-coupling candidates of track-coupling candidate/identification pairs. Herein, it is possible to select track-coupling candidates corresponding to track-coupling likelihoods equal to or above a threshold, thus generating hypotheses. Moreover, it is possible to use environmental information representing a position of obstruction in a tracking area and a transient time in which a mobile body passes by the obstruction, or it is possible to use environmental information representing a transient time in which a mobile body passes through a passable path in the tracking area. In this case, it is necessary to calculate a real transient time from a track disappearance detection time to a next track appearance detection time with respect to each track-coupling candidate, and it is necessary to estimate a transient time of a mobile body based on environmental information. Track-coupling candidates, in which the estimated transient time is longer than the real transient time, are precluded from track-coupling candidates for use in generation of hypotheses.

Advantageous Effects of the Invention

As described above, a most-probable hypothesis is estimated based on a combination of a plurality of parameters, so that it is possible to estimate a disappearing part of a track with a high precision even when an interruption occurs in tracking a mobile body. That is, even when an interruption frequently occurs in following a track of a mobile body, it is possible to connect tracks of a mobile body with a high precision, thus significantly improving a tracking performance.

DESCRIPTION OF EMBODIMENTS

Figure 1:
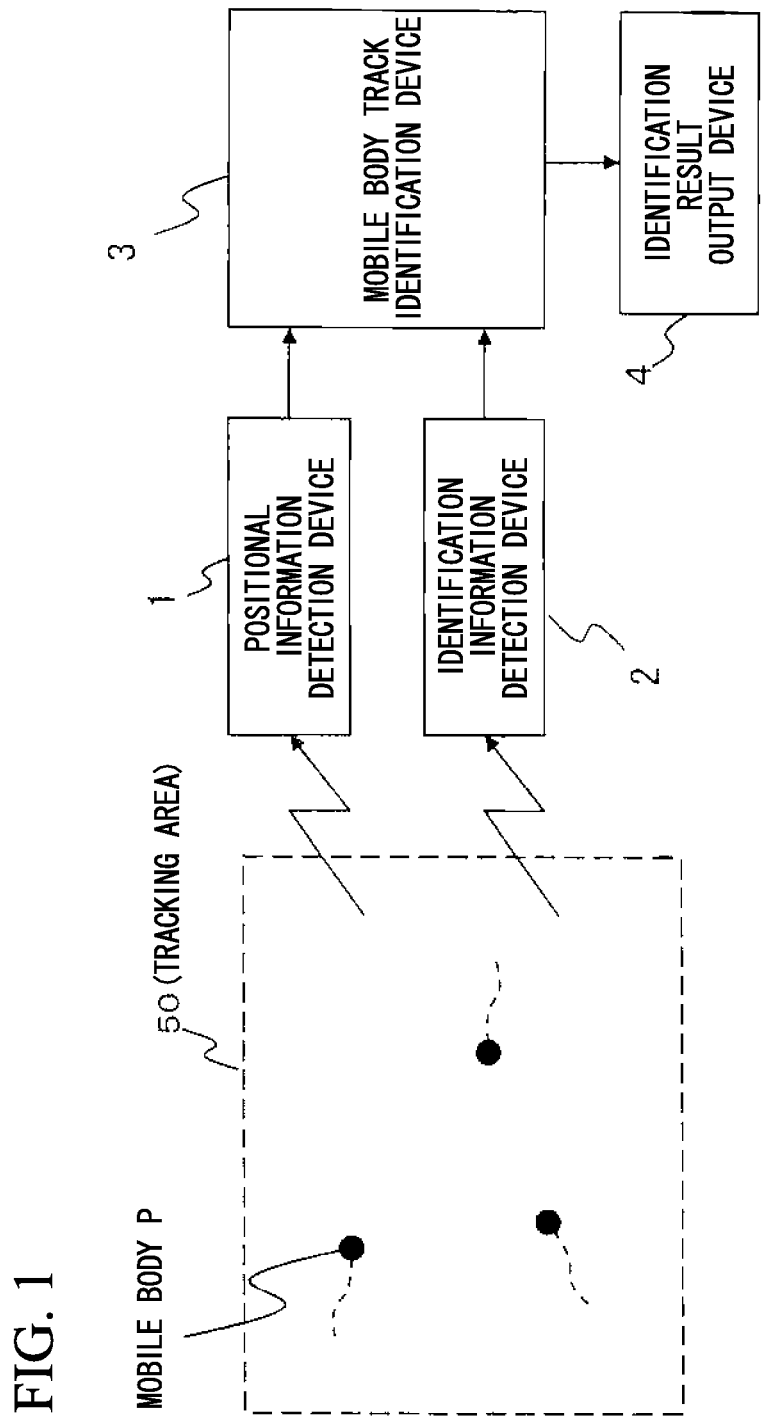
FIG. 1 A block diagram showing a mobile body track identification system according Embodiment 1 of the present invention.

The embodiments of the present invention will be described with reference to the accompanying drawings. In the drawings, corresponding parts are designated by the same reference numerals; hence, duplicate descriptions thereof will be omitted.

Embodiment 1

FIG. 1 is a block diagram of a mobile body track identification system according to Embodiment 1 of the present invention. This mobile body track identification system includes a positional information detection device 1, an identification information detection device 2, a mobile body track identification device 3, and an identification result output device 4. The mobile body track identification system identifies which mobile body matches which track in a tracking area 50. That is, it is possible to recognize the position where a mobile body P exists.

The mobile body P freely moves in the tracking area 50. Additionally, the mobile body P can move outside the tracking area 50. In this connection, the type of a mobile body is not limited to a particular one; hence, it can be a person, an animal, or an object.

The positional information detection device 1 detects the position of a mobile body in the tracking area 50. In the following description, each position in the tracking area 50 is detected as two-dimensional coordinates. The positional information detection device 1 sends a combination of two-dimensional coordinates (hereinafter, simply referred to as "positional coordinates") of a mobile body in the tracking area 50, its detection time, and its track ID to the mobile body track identification device 3. The detected positional coordinates may be referred to as positional information.

The track ID constituting an identification is allocated to discriminate the positional information of the same mobile body with respect to positional information of a mobile body successfully involved in consecutive detection. That is, a series of positional coordinates ascribed to the same track ID collectively indicates a track of the same mobile body. When positional detection of a mobile body fails at a certain time, however, an interruption occurs in detecting a track of a mobile body. For this reason, when positional detection is successfully performed on a mobile body again after positional information of a mobile body fails, a new track ID is allocated to the mobile body. Embodiment 1 indicates track IDs in the numbering form (i.e. track numbers), but it is possible to indicate track IDs in another form than the numbering form.

The positional information detection device 1 is required to detect positional coordinates of mobile bodies in the tracking area 50, to specify detection times, and to allocate track numbers. For instance, the positional information detection device 1 may be realized using a floor pressure sensor, a GPS (Global Positioning System), or the like.

It is preferable that the positional information detection device 1 be arranged to detect the entirety of the tracking area 50 without blind spots, although it may be permissible to include blind spots causing partial undetectability. This is because the mobile body track identification device 3 is able to connect fragments of a track and to identify which mobile body matches with the track.

The identification information detection device 2 obtains an identification of a mobile body in the tracking area 50. Even when a mobile body exists in the tracking area 50, the identification information detection device 2 may not always detect its identification; hence, a probability of actually detecting an identification of a mobile body depends on two-dimensional positional coordinates of a mobile body in the tracking area 50. For instance, a mobile body, which is positioned proximate to the identification information detection device 2, provides a high probability of detecting its identification, whilst a mobile body, which is distanced from the identification information detection device 2, provides a low probability of detecting its identification.

The mobile body track identification system of FIG. 1 adopts a single identification information detection device 2, although it is possible to arrange a plurality of identification information detection devices 2 to cover the entirety of the tracking area 50. An identification detection device ID is allocated to the identification information detection device 2 to univocally specify it. The identification detection device ID is used to discriminate which identification information detection device 2 detects identification. Embodiment 1 indicates identification detection device IDs in the numbering form (i.e. identification detection device numbers), although it is possible to indicate them in another form than the numbering form.

The identification information detection device 2 sends a combination of detected identification, its detection time, and its identification detection device number to the mobile body track identification device 3. When the identification information detection device 2 tries to detect an identification of a mobile body but fails to detect it, a combination of identification "Null", its time, and its identification detection device number is sent to the mobile body track identification device 3. Alternatively, the mobile body track identification device 3 may determine that no identification is detected at a prescribed time when the identification information detection device 2 does not send identification to the mobile body track identification device 3.

The identification information detection device 2 is required to detect identification and to specify its detection time and its identification detection device number. For instance, it is possible to employ an RFID reader as the identification information detection device 2 since an active RFID tag is attached to a mobile body and used as its identification. When a mobile body represents a person, it is possible to employ a reader device for reading identification, such as a person's face, fingerprints, and veins, as the identification information detection device 2. Additionally, it is possible to combine devices for detecting identifications of different samples, such as a face recognition device and a RFID reader.

In order to cover the tracking area 50 by use of a plurality of identification information detection devices 2, it is possible to arrange the identification information detection devices 2 such that their detection ranges overlap with each other. Alternatively, it is possible to arrange them such that their detection ranges do not overlap with each other.

The positional information detection device 1 for detecting positional coordinates needs to operate in synchronism with the identification information detection device 2 for detecting identifications. That is, the positional information detection device 1 detects positional coordinates of a mobile body while the identification information detection device 2 detects its identification at the same time. When the positional information detection device 1 for detecting positional coordinates operates in asynchronism with the identification diction device 3 for detecting identifications, the mobile body track identification device 3 retains positional coordinates and identifications in a buffer for a certain time; then, positional coordinates and identifications accumulated in the buffer can be used every predetermined time. Alternatively, when no timing synchronization is established between the positional information detection device 1 and the identification information detection device 2, it is possible to set the same detection time with respect to positional coordinates and identification simultaneously received by the mobile body track identification device 3.

By use of positional information of the positional information detection device 1 and identification of the identification information detection device 2, the mobile body track identification device 3 determines which mobile body matches which track. When the positional information detection device 1 is interrupted in tracking, it detects fragments of a track of a mobile body. In this case, the mobile body track identification device 3 sets combinations of tracks of mobile bodies specified by track numbers as track-coupling candidates, determining a most-probable combination of identification and its track-coupling candidate. In this sense, each track-coupling candidate may define one connecting fragment of a track of a mobile body.

Figure 2:
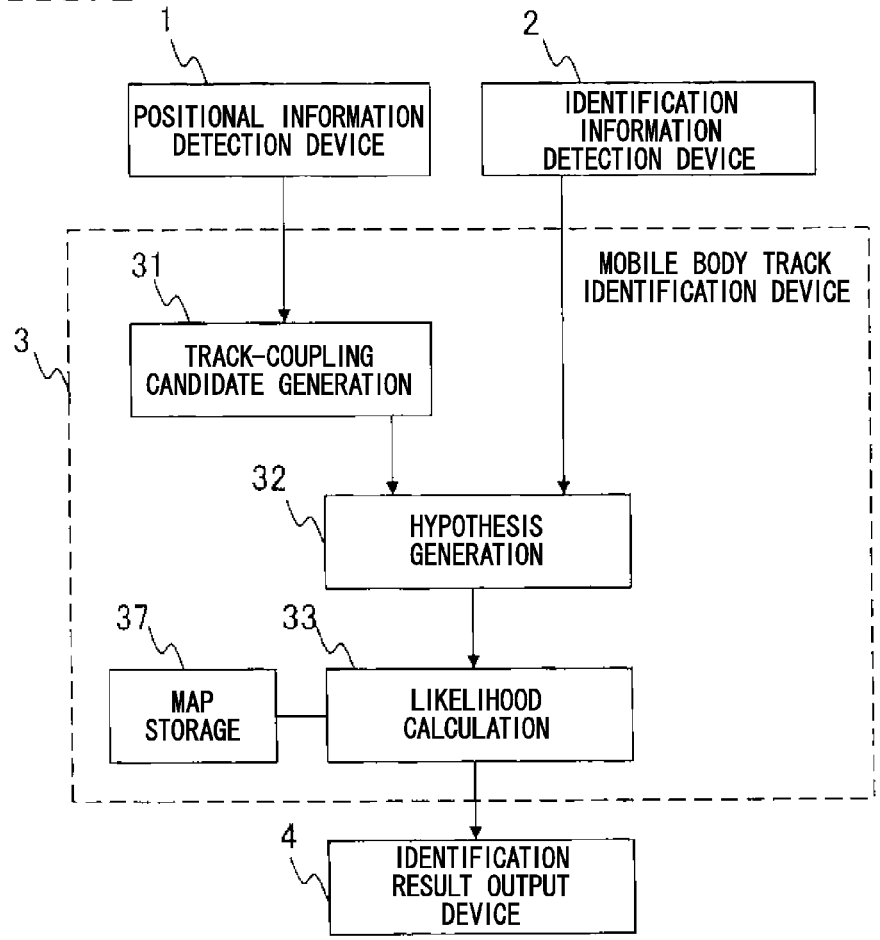
FIG. 2 A block diagram showing the constitution of a mobile body track identification device in the mobile body track identification system.

FIG. 2 is a block diagram showing the constitution of the mobile body track identification device 3. The mobile body track identification device 3 is connected to the positional information detection device 1, the identification information detection device 2, and the identification result output device 4. The mobile body track identification device 3 includes a track-coupling candidate generation part 31 that implements connection processing on fragments of tracks of mobile bodies, a hypothesis generation part 32 that generates hypotheses representing a set of pairs of track-coupling candidates and identifications, a likelihood calculation part 33 that calculates likelihoods of hypotheses so as to specify a most-probable hypothesis, and a map storage 37. Specifying one hypothesis makes it possible to determine a set of pairs of track-coupling candidates and identifications. This indicates that a correlation is established between a detected track of a mobile body and the mobile body P in the tracking area 50.

The track-coupling candidate generation part 31 receives a combination of positional information (i.e. positional coordinates), its detection time, and its track number from the positional information detection device 1. A set of positional coordinates, which are ascribed to the same track number and which are detected in a time range from a predetermined time in the past to the current time, indicates a single track of a mobile body. The track-coupling candidate generation part 31 generates combinations of tracks of individual mobile tracks so as to send them as track-coupling candidates to the hypothesis generation part 32.

When the number of tracks is N, the track-coupling candidate generation part 31 generates all types of track-coupling candidates ranging from a track-coupling candidate including one track and a track-coupling candidate including N tracks. When three tracks are detected, for example, the track-coupling candidate generation part 31 generates "track 1", "track 2", and "track 3" as a track-coupling candidate including one track. As a track-coupling candidate including two tracks, it generates "track 1, track 2", "track 1, track 3", and "track 2, track 3". As a track-coupling candidate including three tracks, it generates "track 1, track 2, track 3". Thus, the track-coupling candidate generation part 31 generates seven track-coupling candidates in connection with three tracks. In this connection, the track-coupling candidate generation part 31 does not generate track-coupling candidates combining the same tracks. For this reason, no duplication occurs among track-coupling candidates.

A plurality of tracks with positional coordinates detected at the same time may be included in track-coupling candidates. In a track-coupling candidate of "track 1, track 2" in which positional coordinates of track 1 and positional coordinates of track 2 are detected at the same time, for example, the track-coupling candidate generation part 31 calculates median points among positional coordinates detected at the same time. When coordinates A of track 1 and coordinates B of track 2 are detected at the same time, for example, the track-coupling candidate generation part 31 calculates a median point between coordinates A and B (i.e. a midpoint between two coordinates). The same calculation is performed on other combinations of coordinates detected at the same time. An identification likelihood, described below, is calculated with reference to coordinates, wherein when a plurality of coordinates is detected at the same time, the track-coupling candidate generation part 31 calculates a median point among a plurality of coordinates so as to refer to it.

The hypothesis generation part 32 receives identifications, their detection times, and their identification detection device numbers from the identification information detection device 2, thus holding their correlations. Additionally, the hypothesis generation part 32 generates all the combinations of track-coupling candidates and their identifications, thus providing them to the likelihood calculation part 33 as hypotheses.

Next, a hypothesis generation procedure will be described in detail. First, the hypothesis generation part 32 generates all combinations of track-coupling candidates and identifications based on track-coupling candidates of the track-coupling candidate generation part 31 and identifications which are detected by the identification information detection device 2 in a time range from a predetermined time in the past to the current time.

Considering a possibility leading to excessiveness or omissiveness in detecting tracks and identifications by the positional information detection device 1 and the identification information detection device 2, it is possible to presume the situation in which tracks and identifications, which are not actually correlated to their counterparts, may be detected. Herein, the excessiveness in detecting tracks indicates an event in which tracks of objects other than a tracked object are mistakenly detected. The excessiveness in detecting identifications indicates an event in which even when a mobile body having an RFID tag exists outside the tracking area, its identification is detected by an RFID reader located in the tracking area due to radio interference or an event in which when a person recognized as a mobile body passes in front of the identification information detection device 2 adopting a biometric identification technology (or a face recognition technology), its identification is mistakenly detected. Additionally, the omissiveness in detecting tracks indicates the impossibility of detecting a track of a mobile body which moves in blind spots of the positional information detection device 1. The omissiveness in detecting identifications indicates an event in which even when a mobile body having an RFID tag exists in the detection area of an RFID reader, its identification is not detected since radio reception is weakened due to radio interference or an event in which when a person recognized as a mobile body passes in front of the identification information detection device 2 adopting a biometric identification technology (or a face recognition technology), its picture with an ideal face direction and an ideal size is not produced so that its identification cannot be detected. To cope with these drawbacks, the hypothesis generation part 32 additionally generates information, representing nonexistence of counterparts (i.e. counterpart track-coupling candidates and counterpart identifications), which is paired with all pairs of track-coupling candidates and identifications. In this connection, the information representing the nonexistence of counterparts is specified using a character string of "unknown". When the track-coupling candidate generation part 31 generates track-coupling candidates T1, T2, . . . , Tn whilst the identification information detection device 2 detects identifications ID1, ID2, . . . , IDm, for example, the hypothesis generation part 32 generates pairs of (T1, unknown), (T2, unknown), . . . , (Tn, unknown) and pairs of (unknown, ID1), (unknown, ID2), . . . , (unknown, IDm), which are added to the foregoing pairs of track-coupling candidates and identifications.

In this connection, pairs of track-coupling candidates and identifications will be referred to as "track-coupling candidate/identification pairs". Pairs including "unknown" are equivalent to track-coupling candidate/identification pairs.

The hypothesis generation part 32 selects a set of track-coupling candidate/identification pairs satisfying prescribed conditions as a hypothesis. There is a possibility that a plurality of sets of track-coupling candidate/identification pairs satisfying prescribed conditions may exist. For this reason, the hypothesis generation part 32 extracts all the sets of track-coupling candidate/identification pairs satisfying prescribed conditions, thus determining these sets as individual hypotheses.

It is possible to name three conditions as prescribed conditions for determining hypotheses corresponding to sets of track-coupling candidate/identification pairs, as follows.

A first condition refers to non-repetition of tracks and identifications among track-coupling candidate/identification pairs ascribed to each hypothesis. When identifications ID1, ID2 are detected in connection with four tracks k1, k2, k3, and k4, for example, a set of [{(k1, k2), ID1}, {(k1, k3, k4), ID2}] does not satisfy the first condition because of repetition of the track k1. A set of [{(k1, k2), ID1}, {(k3, k4), ID1}] does not satisfy the first condition because of repletion of the identification ID1. On the other hand, a set of [{(k1, k2), ID1}, {(k3, k4), ID2}] satisfies the first condition because of non-repetition of tracks and identifications. Herein, (k1, k2) indicates a track-coupling candidate, while {(k1, k2), ID1} indicates a track-coupling candidate/identification pair. Each hypothesis is made on precondition that a single track of a mobile body is included in a single track-coupling candidate. Hypotheses are candidates used for determining which mobile body is connected to which track, wherein the first condition is needed because hypotheses including repetition of tracks or identifications cannot be determined as appropriate candidates.

However, the present embodiment allows for repetition of "unknown" serving as identifications. That is, the present embodiment shall not determine a failure to meet the first condition even when repletion of "unknown" occurs in identifications.

A second condition refers to inclusion of individual tracks, specified by track numbers, into track-coupling candidates ascribed to all the track-coupling candidate/identification pairs. In the foregoing case in which the tracks k1 to k4 and the identifications ID1, ID2 are detected, a set of [{(k1, k2), ID1}] includes only the tracks k1, k2 in a track-coupling candidate/identification pair but does not include the tracks k3, k4. Therefore, this set does not satisfy the second condition. On the other hand, a set of [{(k1, k2), ID1}, {(k3, k4), ID2}] includes all the tracks in track-coupling candidate/identification pairs, thus satisfying the second condition.

A third condition refers to inclusion of at least one track-coupling candidate/identification pair whose identification is not "unknown" in a set of track-coupling candidate/identification pairs. In the foregoing case in which the tracks k1 to k4 and the identifications ID1, ID2 are detected, identifications "unknown" are found in two track-coupling candidate/identification pairs included in a set of [{(k1, k2), unknown}, {(k3, k4), unknown}], which thus does not satisfy the third condition. On the other hand, a set of [{(k1, k2) ID1}, {(k3, k4), unknown}] includes a track-coupling candidate/identification pair whose identification is not "unknown", thus satisfying the third condition.

The hypothesis generation part 32 selects all the sets of track-coupling candidate/identification pairs satisfying the first to third conditions as hypotheses. When the identifications ID1, ID2 are detected, for example, it is possible to establish a hypothesis using a set with one track-coupling candidate/identification pair including ID1 and another track-coupling candidate/identification pair including an identification of "unknown". Similarly, it is possible to establish a hypothesis using a set with one track-coupling candidate/identification pair including ID2 and another track-coupling candidate/identification pair including an identification of "unknown". Additionally, it is possible to establish a hypothesis using a set with one track-coupling candidate/identification pair including ID1, another track-coupling candidate/identification pair including ID2, and a further track-coupling candidate/identification pair including an identification of "unknown". It is possible to establish a hypothesis using a set consisting of track-coupling candidate/identification pairs without identifications of "unknown". The hypothesis generation part 32 selects hypotheses covering all the sets satisfying the first to third conditions.

The map storage 37 stores an identification likelihood map. The identification likelihood map will be described later.

In Embodiment 1, the likelihood calculation part 33 calculates two types of likelihoods per each hypothesis. A first likelihood is a likelihood of connecting tracks included in track-coupling candidates in track-coupling candidate/identification pairs ascribed to each hypothesis. The first likelihood will be referred to as a track-coupling likelihood. A second likelihood is a likelihood of detecting identifications with respect to tracks specified by track-coupling candidates in track-coupling candidate/identification pairs. The second likelihood will be referred to as an identification likelihood or an identification detection likelihood. An identification likelihood is represented by a conditional probability P(OiS) using a track S and an identification O specified by a track-coupling candidate, In this connection, an identification likelihood is calculated per each track-coupling candidate/identification pair, so that the result of integrating identification likelihoods for track-coupling candidate/identification pairs ascribed to each hypothesis is used as an identification likelihood per each hypothesis.

Figure 3:
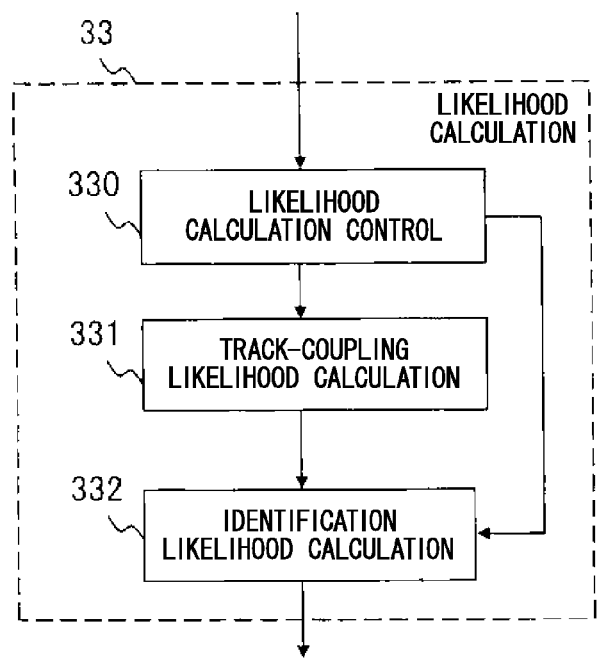
FIG. 3 A block diagram showing the constitution of a likelihood calculation part of the mobile body track identification device.

FIG. 3 is a block diagram showing the constitution of the likelihood calculation part 33 in Embodiment 1. The likelihood calculation part 33 includes a likelihood calculation control part 330, a track-coupling likelihood calculation part 331, and an identification likelihood calculation part 332. The likelihood calculation control part 330 sends hypotheses with uncalculated likelihoods to the track-coupling likelihood calculation part 331 and the identification likelihood calculation part 332. The track-coupling likelihood calculation part 331 calculates a track-coupling likelihood of a track-coupling candidate per each track-coupling candidate/identification pair ascribed to each hypothesis. The identification likelihood calculation part 332 calculates identification likelihoods for track-coupling candidate/identification pairs per each hypothesis. Additionally, the identification likelihood calculation part 332 determines the result of integrating calculations of two types of likelihoods (i.e. a track-coupling likelihood and an identification likelihood) as a likelihood per each hypothesis, so that the most-probable estimation result indicating a hypothesis having the highest likelihood is sent to the identification result output device 4.

Next, the operation of the track-coupling likelihood calculation part 331 calculating track-coupling candidates will be described. To simplify explanation, the following description refers to the operation of calculating track-coupling candidates combining two tracks.

Combinations of track-coupling candidates may include a combination of tracks which are repetitively detected at the same time and another combination of tracks which are independently detected at different times.

First, the operation of calculating a track-coupling likelihood of a track-coupling candidate combining tracks which are repetitively detected at the same time will be described. The track-coupling likelihood calculation part 331 calculates euclidean distances between coordinates which are detected at the same time per each track, thus determining track-coupling likelihoods such that higher track-coupling likelihoods are determined with respect to shorter euclidean distances while lower track-coupling likelihoods are determined with respect to longer euclidean distances. An event in which tracks are detected at the same time indicates a high possibility of existence of a plurality of pairs of coordinates which are detected at the same time. Specifically, the track-coupling likelihood calculation part 331 calculates a euclidean distance, between coordinates detected at the same time, per each pair of coordinates, thus calculating an average value. Track-coupling likelihoods are determined such that a higher track-coupling likelihood is determined for a smaller average value of euclidean distances, each calculated per each pair of coordinates, whilst a lower track-coupling likelihood is determined for a larger average value. Herein, a track-coupling likelihood is determined using an average value of euclidean distances between coordinates, but it is possible to use a variance value instead of an average value. When two tracks do not coincide with each other in terms of the start time and the end time of detecting coordinates, the aforementioned process is carried out in a time range in which coordinates of two tracks are detected simultaneously.

The track-coupling likelihood calculation part 331 may calculate a mobile vector per each track, so that a cosine similarity of a mobile vector is calculated as a track-coupling likelihood. A mobile vector of each track is a vector with its start point, specified by coordinates used for starting simultaneous detection of coordinates of two tracks, and its end point, specified by stopping simultaneous detection of coordinates. Herein, the track-coupling likelihood calculation part 331 calculates mobile vectors V1, V2 according to Equation 1 so as to calculate a cosine similarity $\cos\theta$, thus determining a track-coupling likelihood.

$$\cos\theta = \frac{\langle V1, V2 \rangle}{\|V1\|\|V2\|} \quad \text{[Equation 1]}$$

In Equation 1, ⟨V1,V2⟩ indicates a scalar product of mobile vectors V1, V2, while ‖V1‖ indicates a norm of the mobile vector V1, and ‖V2‖ indicates a norm of the mobile vector V2.

In this connection, the likelihood calculation part 33 may determine a threshold for track-coupling likelihoods in advance, so that track-coupling likelihoods less than the threshold are precluded from the processing thereafter.

Next, the operation of calculating track-coupling likelihoods of track-coupling candidates combining tracks which are independently detected at different times will be described. Herein, the track-coupling likelihood calculation part 331 calculates a mobility of a mobile body based on the disappearance time and positional coordinates of a preceding track and the appearance time and positional coordinates of a subsequent track. The track-coupling likelihood calculation part 331 calculates track-coupling likelihoods such that a higher track-coupling likelihood is calculated for a smaller error between an actually calculated mobility and a mobility of a mobile body, which is selected as a mobile model in advance, whilst a lower track-coupling likelihood is calculated for a larger error.

Considering the halfway station of a mobile body, it is possible to determine a likelihood function which hardly decreases a track-coupling likelihood when a negative error is produced by subtracting a mobility of a preselected mobile model from a calculated mobility while steadily decreasing a track-coupling likelihood when a positive error is produced. Specifically, mobility data are collected upon occurrence of interruption in tracking, so that sets of mobility with positive errors between the mobility of a mobile model and the collected mobility data are separated from sets of mobility with negative errors, wherein an average value and a variance value are calculated per each set. Replicate sets are produced with respect to sets with positive errors, wherein replicate sets are reversed with negative signs and then added to original sets, thus producing a zero average. On the other hand, replicate sets are produced with respect to sets with negative errors, wherein replicate sets are reversed with positive signs and then added to original sets, thus producing a zero average. The distribution of errors included in these sets is presumed as normal distribution, wherein sets with positive errors have an average μs and a variance σs. Similarly, sets with negative errors have an average μm and a variance σm. In this case, a probability density function is defined as Equation 2.

$$f(x) = \frac{1}{\sigma s \sqrt{2\pi}} \exp\left(-\frac{(x-\mu s)^2}{2\sigma s^2}\right) (x \geq 0)$$

$$f(x) = \frac{1}{\sigma m \sqrt{2\pi}} \exp\left(-\frac{(x-\mu m)^2}{2\sigma m^2}\right) (x < 0)$$

[Equation 2]

The track-coupling likelihood calculation part 331 uses a calculated error (i.e. a value produced by subtracting a mobility of a preselected mobile model from a calculated mobility) as a variable x, which is put into Equation 2, thus calculating a track-coupling likelihood.

Additionally, a threshold for track-coupling candidates combining tracks which are independently detected at different times is determined in advance, so that track-coupling likelihoods less than the threshold are precluded from the processing thereafter.

The above procedure is related to track-coupling candidates each combining two tracks. With respect to track-coupling candidates each combining three tracks, the track-coupling likelihood calculation part 331 calculates track-coupling likelihoods according to the following procedure.

First, the track-coupling likelihood calculation part 331 sequences tracks included in track-coupling candidates in an order of earlier disappearance times.

Next, the track-coupling likelihood calculation part 331 calculates a track-coupling likelihood with respect to two tracks which adjoin in their places of ordering. That is, the track-coupling likelihood calculation part 331 calculates a track-coupling likelihood with respect to tracks of first and second places of ordering regarding their disappearance times. Similarly, it calculates a track-coupling likelihood with respect to tracks of second and third places of ordering regarding their disappearance times; subsequently, it calculates a track-coupling likelihood with respect to tracks of third and fourth places of ordering regarding their disappearance times. In this connection, the foregoing method is used to calculate a track-coupling likelihood with respect to two tracks which adjoin in their places of ordering.

After calculating track-coupling likelihoods with respect to pairs of tracks which adjoin in their places of ordering, the track-coupling likelihood calculation part 331 multiplies the calculation results of track-coupling likelihoods so as to calculate a radical root of the number of multiplication times. This calculation result is used as a track-coupling likelihood regarding a combination of three or more tracks. In this connection, the calculation of a radical root implements normalization of track-coupling likelihoods.

The track-coupling likelihood calculation part 331 sets a constant (e.g. "1") to a track-coupling likelihood of a track-coupling candidate consisting of a single track.

The identification likelihood calculation part 332 calculates an identification likelihood per each hypothesis generated by the hypothesis generation part 32. The identification likelihood calculation part 332 calculates identification likelihoods with reference to an identification probability map which is preselected per each identification information detection device 2. The identification probability map is a map, in which the tracking area 50 is subjected to grid-dividing to produce cells and which defines values, ranging from 0 to 1, representing a probability of the identification information detection device 2 detecting an identification in each cell.

As described above, the present embodiment does not employ two values representing the inside and the outside of a certain area to define a detection area for an identification, but the present embodiment defines a probability distribution for detecting identifications in the entire tracking area 50, whereby it is possible to obtain a detection probability of an identification at a specific position irrespective of the location of a mobile body in the tracking area 50. The identification likelihood calculation part 332 calculates identification likelihoods for track-coupling candidate/identification pairs. The identification likelihood calculation part 332 calculates an identification likelihood based on a detection probability of an identification, which has been detected in a time range from a predetermined time in the past to the current time, with reference to the identification probability map; hence, it is possible to discriminate the correlation between a track and an identification without depending on identification detected at the current time. Irrespective of a low detection probability of an identification at the current time, it is possible to discriminate the correlation between a track and an identification with a high precision on the condition that a mobile body passed a position of a high detection probability in the past.

The identification likelihood calculation part 332 calculates an identification likelihood per each hypothesis in accordance with the following procedure.

First, the identification likelihood calculation part 332 extracts track-coupling candidate/identification pairs included in a hypothesis. The identification likelihood calculation part 332 calculates and multiplies identification likelihoods of track-coupling candidate/identification pairs. Since the number of track-coupling candidate/identification pairs included in each hypothesis is not fixed, there exist track-coupling candidate/identification pairs with uncalculated identifications. For this reason, the identification likelihood calculation part 332 normalizes the multiplication result of identification likelihoods calculated for track-coupling candidate/identification pairs respectively.

In order to individually calculate identification likelihoods with respect to track-coupling candidate/identification pairs, the identification likelihood calculation part 332 refers to a detection time for detecting an identification of a track-coupling candidate/identification pair which is currently focused on, and the identification detection device number of the identification information detection device 2 detecting the identification. Additionally, the identification likelihood calculation part 332 selects an identification probability map specified by the identification detection device number. The identification probability map per each identification detection device number is stored in the map storage 37 in advance. In this connection, the identification likelihood calculation part 332 retrieves the correlation between the identification, its detection time, and the identification detection device number of the identification information detection device 2 detecting the identification from the hypothesis generation part 32.

The track-coupling candidate generation part 31 provides the identification likelihood calculation part 332 with the correlation between positional coordinates of a mobile body, its detection time, and its track number. The track-coupling candidate generation part 31 additionally provides coordinates of a median point when positional coordinates of different tracks, included in a track-coupling candidate, are detected at the same time. The identification likelihood calculation part 332 determines which cell in an identification probability map corresponds to positional coordinates with reference to coordinates of a track-coupling candidate at the detection time of its identification, thus retrieving an identification likelihood defined in the cell. When positional coordinates of tracks, included in a track-coupling candidate, are detected at the same time so that a median point thereof is calculated, the identification likelihood calculation part 332 specifies a cell corresponding to coordinates of the median point, thus retrieving an identification likelihood defined in the cell.

The identification likelihood calculation part 332 multiplies identification likelihoods, which are obtained at all the detection times of identifications. The multiplication result is used as an identification likelihood for a track-coupling candidate/identification pair which is currently focused on.

In his connection, the identification likelihood calculation part 332 does not calculate identification likelihoods with respect to track-coupling candidate/identification pairs with uncalculated identification likelihoods. That is, an identification likelihood is not calculated with respect to a track-coupling candidate/identification pair with an identification or a track-coupling candidate indicating "unknown".

The identification likelihood calculation part 332 calculates and multiplies identification likelihoods per each track-coupling candidate/identification pair ascribed to a hypothesis, wherein it subsequently normalizes the multiplication result to produce an identification likelihood representing the entirety of the hypothesis. Since an identification likelihood per each track-coupling candidate/identification pair is equivalent to the product of probabilities defined in an identification probability map, the multiplication result of identification likelihoods per each track-coupling candidate/identification pair is equivalent to the produce of probabilities. Therefore, it is necessary to specify the number of probabilities, defined in an identification likelihood map, which are involved in the product, whereby it is possible to normalize the multiplication result of identification likelihoods per each track-coupling candidate/identification pair by calculating a radical root of the number of probabilities. This normalization makes it possible to appropriately compare identification likelihoods among hypotheses irrespective of the different numbers of track-coupling candidate/identification pairs ascribed to hypotheses.

The identification likelihood calculation part 332 repeats the above procedure to calculate identification likelihoods with respect to all the hypotheses.

Additionally, the identification likelihood calculation part 332 integrates a track-coupling likelihood and an identification likelihood per each hypothesis, thus producing an overall likelihood per each hypothesis. It can be said that a hypothesis having the highest likelihood may appropriately represent the relationship between tracks and identifications. The identification likelihood calculation part 332 selects a hypothesis having the highest likelihood so as to send it to the identification result output device 4.

The identification result output device 4 presents the correlation between a track and a mobile body based on the hypothesis (i.e. a most-probable estimation result) sent from the identification likelihood calculation part 332. Since individual track-coupling candidate/identification pairs ascribed to a hypothesis represent the correlations between tracks and identifications, it is possible to determine and present which mobile body is correlated to which track based on track-coupling candidate/identification pairs ascribed to a hypothesis. At this time, coordinates at the current time or tracks detected in a predetermined time in the past are presented as well. For instance, the identification result output device 4 is configured of a display. That is, the identification result output device 4 includes a display so as to show the correlation between a track and a mobile body on the display. In this connection, the output mode of the identification result output device 4 is not necessarily limited to a display mode; hence, it is possible to employ other output modes such as a print output.

The track-coupling candidate generation part 31, the hypothesis generation part 32, and the likelihood calculation part 33 (i.e. the likelihood calculation control part 330, the track-coupling likelihood calculation part 331, and the identification likelihood calculation part 332) is realized using a CPU of a computer which operates in accordance with a mobile body track identification program. That is, a program memory of a computer (not shown) stores a mobile body track identification program; a CPU loads the mobile body track identification program, thus realizing the functions of the track-coupling candidate generation part 31, the hypothesis generation part 32, and the likelihood calculation part 33 according to the program. In this connection, it is possible to realize the track-coupling candidate generation part 31, the hypothesis generation part 32, and the likelihood calculation part 33 by use of individual hardware elements. Additionally, it is possible to realize the likelihood calculation control part 330, the track-coupling likelihood calculation part 331, and the identification likelihood calculation part 332 by use of individual hardware elements.

Figure 4:
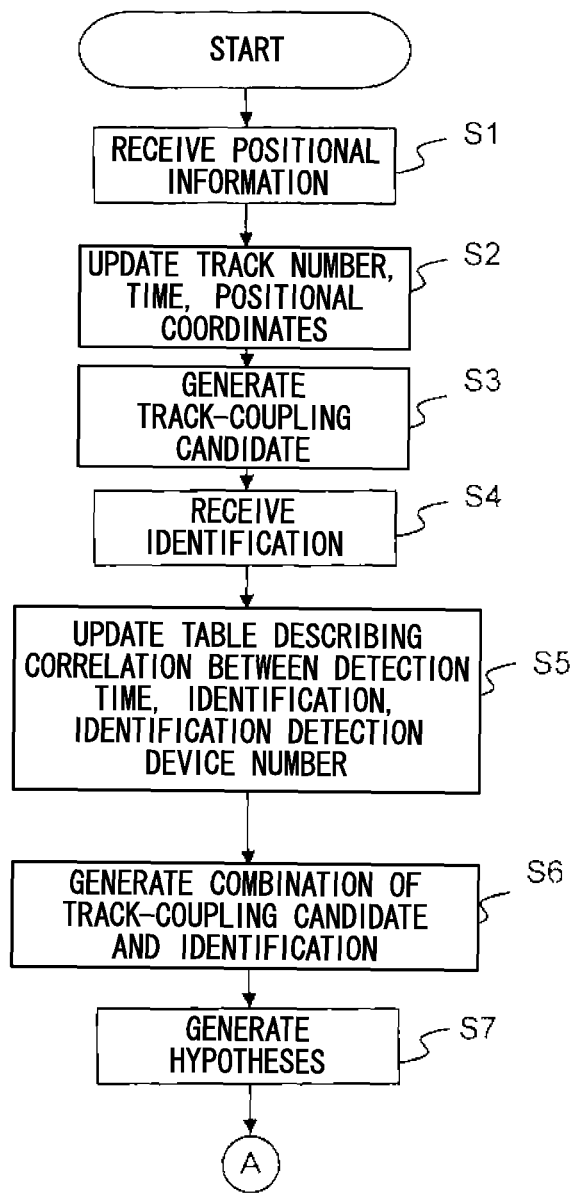
FIG. 4 A flowchart showing the operation of the mobile body track identification device.

Next, the operation of the mobile body track identification device 3 will be described in detail with reference to the flowcharts of FIGS. 4 and 5 and concrete examples of FIGS. 6 to 14.

Figure 6:
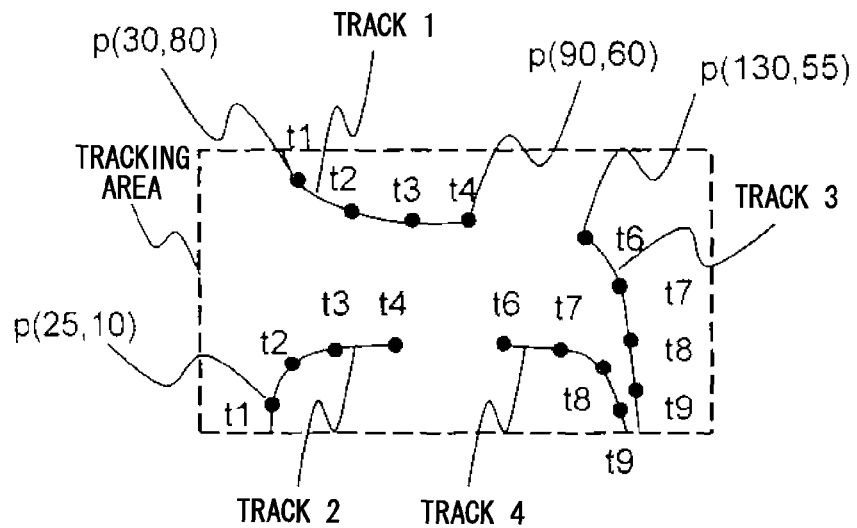
FIG. 6 An illustration of examples of detected tracks of mobile bodies at prescribed times in a tracking area.

FIG. 6 shows positions and track numbers at times t1 to t9 in connection with a mobile body A and a mobile body B which moves in the tracking area 50. Herein, the mobile body A corresponds to tracks 1, 3 while the mobile body B corresponds to tracks 2, 4. Additionally, the identification of the mobile body A is solely detectable whilst the identification of the mobile body B has not been registered yet so that its identification does not exist.

Figures 7, 8, 9:
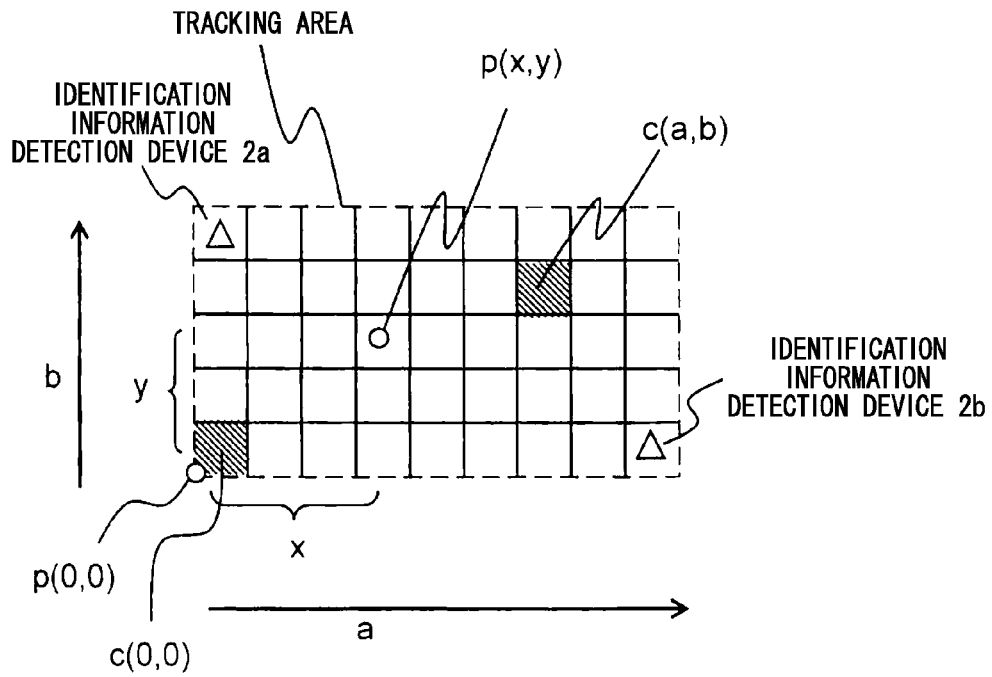
FIG. 7 An illustration of the tracking area which is grid-divided into a plurality of cells, thus setting identification probability maps with two identification information detection devices $2a$, $2b$.
FIG. 8 An illustration of an identification probability map of the identification information detection device $2a$.
FIG. 9 An illustration of an identification probability map of the identification information detection device $2b$.

FIG. 7 shows the positions of an identification information detection device 2a and an identification information detection device 2b, arranged in the tracking area 50, as well as grid divisions which are used to define an identification probability map, wherein the lower-left corner indicates an origin (0,0) so that p(x,y) may represent arbitrary positional coordinates. Additionally, c(a,b) represents coordinates of an arbitrary cell on the identification probability map. It is possible to arbitrarily set the number of divisions corresponding to cells, whereas FIG. 7 shows the setting with a range of 0 to 8 in a direction a and a range of 0 to 4 in a direction b. That is, the identification information detection devices 2a, 2b are positioned at cell coordinates c(0,4) and c(8,0).

A probability ranging from 0 to 1 according to the property of each identification information detection device is defined in each cell on the identification probability map of FIG. 7. Herein, detection probabilities of identifications are defined in cells with respect to the two identification information detection devices 2a, 2b. FIG. 8 shows an identification probability map of the identification information detection device 2a, whilst FIG. 9 shows an identification probability map of the identification information detection device 2b.

Figures 10, 11:
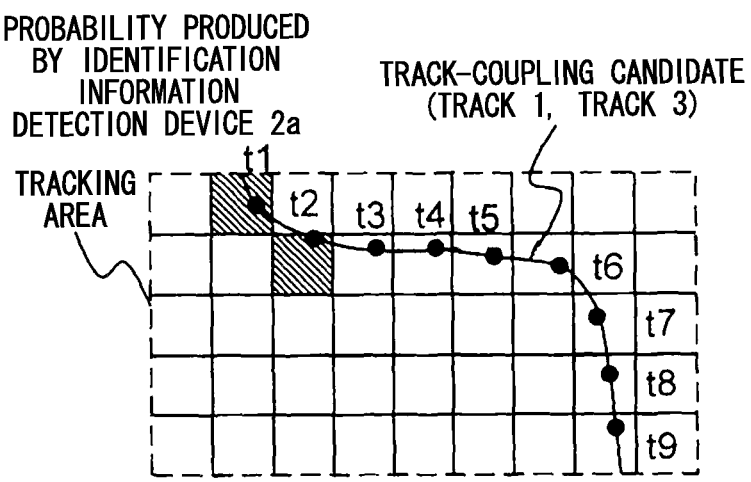
FIG. 10 A table showing the correlation between the numbers of identification information detection devices, identifications, and detection times.
FIG. 11 An illustration of an estimation procedure of tracks 1, 3 based on probabilities produced by the identification information detection device $2a$ in the tracking area.

The hypothesis generation part 32 receives identifications, detection times, and identification detection device numbers from the identification information detection devices 2a, 2b, thus holding their correlations. FIG. 10 shows a table describing these correlations. This table describes which identification information detection device, specified by its identification detection device number, detects identification. Herein, the existence/nonexistence of a detected identification per each identification information detection device is shown in connection with times t1 to t9. For instance, the identification information detection device 2a detects an identification ID1 at times t1, t2 whilst the identification information detection device 2b detects an identification ID1 at times t8, t9. Blanks in the table of FIG. 10 indicate that the identification information detection devices 2a, 2b do not detect identifications.

FIGS. 11, 12, 13, and 14 are illustrations depicting the procedure for retrieving detection probabilities of identifications on the identification probability map of the tracking area 50.

Next, the operation of the mobile body track identification device 3 will be described in detail.

First, the track-coupling candidate generation part 31 receives combinations of track numbers, detection times, positional coordinates from the positional information detection device 1 (step S1). As shown in FIG. 6 in which a plurality of coordinates is detected in a time sequence, the positional information detection device 1 sends a pair of {1, t1, p(30,80)} and {2, t1, p(25,10)} at time t1, for example, to the track-coupling candidate generation part 31 of the mobile body track identification device 3 as combinations of track numbers, detection times, and positional coordinates. The track-coupling candidate generation part 31 is provided with combinations of track numbers, detection times, and positional coordinates at times t2, t3, . . . after time t1 as well.

The track-coupling candidate generation part 31 holds positional information which is sent from the positional information detection device 1 in a time range from a predetermined time in the past to the current time (i.e. the latest time for receiving information). Upon receiving the current combinations of track numbers, detection times, and positional coordinates in step S1, the track-coupling candidate generation part 31 additionally stores them as current positional information while deleting the oldest positional information, thus updating the history of positional information (step S2). When the track-coupling candidate generation part 31 receives combinations of track numbers, detection times, and positional coordinates at time to while holding combinations of track numbers, detection times, and positional coordinates at times t1 to tn-1, for example, it newly stores positional information at time to while discarding combinations of track numbers, detection times, and positional coordinates at time t1.

In positional information which the track-coupling candidate generation part 31 receives in a time range from a predetermined time in the past to the current time, a set of positional coordinates paired with the same track number represents a single track. After step S2, the track-coupling candidate generation part 31 combines positional information by using the track number as a key, thus generating and sending track-coupling candidates to the hypothesis generation part 32 (step S3). Upon detecting tracks 1 to 4 shown in FIG. 6, the track-coupling candidate generation part 31 generates track-coupling candidate 1=(track 1, track 3), track-coupling candidate 2=(track 2, track 4), track-coupling candidate 3=(track 1, track 4), . . . . Provided N as the number of tracks, the track-coupling candidate generation part 31 generates all track-coupling candidates including a track-coupling candidate with a single track and a track-coupling candidate with N tracks. That is, the track-coupling candidate generation part 31 generates not only the foregoing track-coupling candidates each including two tracks, but also track-coupling candidates each including a single track such as (track 1), (track 2), . . . , track-coupling candidates each including three tracks such as (track 1, track 2, track 3), (track 1, track 2, track 4), . . . , and a track-coupling candidate including four tracks such as (track 1, track 2, track 3, track 4). Additionally, it generates track-coupling candidates combining tracks which are detected at the same time.

Upon generating track-coupling candidates with positional coordinates of different tracks which are detected at the same time, the track-coupling candidate generation part 31 calculates positional coordinates of a median point among them as well.

Additionally, the track-coupling candidate generation part 31 does not only store combinations of track numbers, detection times, and positional coordinates (i.e. combinations of track numbers, detection times, and positional coordinates produced by the updating process of step S2) detected in a predetermined time in the past by itself but also sends them to the likelihood calculation part 33. Upon calculating a median point of positional information with positional coordinates of different tracks which are detected at the same time, it sends the median point to the likelihood calculation part 33 as well. The track-coupling candidate generation part 31 sends these pieces of information to the likelihood calculation part 33 via the hypothesis generation part 32.

The hypothesis generation part 32 receives combinations of detection times, identifications, and identification detection device numbers from the identification information detection device 2 (step S4). That is, upon detecting the identification of a mobile body, the identification information detection device 2 sends the identification with its relevant information to the hypothesis generation part 32. The hypothesis generation part 32 stores the correlations between detection times, identifications, and identification detection device numbers in the table of FIG. 10.

The hypothesis generation part 32 holds identifications which are received from the identification information detection device 2 in a time range from a predetermined time in the past to the current time (i.e. the time of receiving current information). Upon receiving identifications and identification detection device numbers at the current detection time, the hypothesis generation part 32 additionally registers them with the table of FIG. 10 while deleting the oldest identification (step S5). Upon receiving combinations of detection times, identifications, and identification detection device numbers at the current time tn while holding combinations of detection times, identifications, and identification detection device numbers at times t1 to tn-1, for example, the hypothesis generation part 32 registers the received identifications at time tn with the table of FIG. 10 while discarding identifications at time t1.

The hypothesis generation part 32 stores the updated table content by itself while sending it to the likelihood calculation part 33.

Using identifications stored in the table which is updated in step S5 and track-coupling candidates received from the track-coupling candidate generation part 31 in step S3, the hypothesis generation part 32 generates track-coupling candidate/identification pairs combining them (step S6). In examples shown in FIGS. 6 and 10, the hypothesis generation part 32 generates track-coupling candidate/identification pairs of {(track 1, track 3), ID1}, {(track 2, track 4), ID1}, . . . . Herein, each track-coupling candidate/identification pair includes two tracks, but the number of tracks included in each track-coupling candidate/identification pair is not limited to two. Additionally, the hypothesis generation part 32 generates track-coupling candidate/identification pairs including "unknown" indicating nonexistence of counterparts in step S6. Therefore, it generates track-coupling candidate/identification pairs of {(track 1, track 3), unknown}, {(track 2, track 4), unknown}, {(track 1, track 4), unknown}, etc.

After step S6, the hypothesis generation part 32 generates all the sets of track-coupling candidate/identification pairs satisfying the first to third conditions (step S7). In this connection, a single set of track-coupling candidate/identification pairs constitutes a hypothesis. The hypothesis generation part 32 sends hypotheses to the likelihood calculation part 33.

The likelihood calculation part 33 makes a decision as to whether or not any hypothesis with uncalculated likelihoods exists in hypotheses which are produced in step S7 (step S8). If there exist hypotheses without calculations of likelihoods (specifically, the process from step S9 to step S11) (i.e. a decision result "Yes" in step S8), the likelihood calculation control part 330 sends one of hypotheses with uncalculated likelihoods to the track-coupling likelihood calculation part 331 and the identification likelihood calculation part 332.

Upon receiving hypotheses with uncalculated likelihoods, the track-coupling likelihood calculation part 331 calculates track-coupling likelihoods per each track-coupling candidate/identification pair ascribed to each of these hypotheses (step S9).

In order to calculate a track-coupling likelihood between track 1 and track 3 shown in FIG. 6, a mobility between the disappearance of track 1 and the appearance of track 3 is calculated based on the disappearance time t4 of track 1 and the appearance time t6 of track 3 as well as positional coordinates of disappearance p(90,60) of track 1 and positional coordinates of appearance p(130,55) of track 3. An error between the mobility and the pre-defined mobility is calculated and used as a parameter for a likelihood function, thus producing a track-coupling likelihood. In this connection, the calculation method of track-coupling likelihoods is not limited to this method; hence, it is possible to employ other methods.

Since the calculation method of track-coupling likelihoods regarding tracks which are detected at the same time and the calculation method of track-coupling likelihoods regarding three or more tracks have been already described, their descriptions will be omitted in this paragraph. In the calculation of step S9, the track-coupling candidate generation part 31 may refer to combinations of positional information, detection times, and track numbers, which are detected in a predetermined time in the past, provided by the track-coupling candidate generation part 331.

In step S9, the track-coupling likelihood calculation part 331 calculates track-coupling likelihoods, the number of which corresponds to the number of track-coupling candidate/identification pairs ascribed to each hypothesis, since it calculates track-coupling likelihoods per each track-coupling candidate/identification pair ascribed to a hypothesis.

Upon receiving hypotheses with uncalculated likelihoods, the identification likelihood calculation part 332 calculates identification likelihoods with respect to these hypotheses (step S10). In step S10, the identification likelihood calculation part 332 calculates identification likelihoods per each track-coupling candidate/identification pair ascribed to a hypothesis and then normalizes the multiplication result, thus providing its normalization value as an identification likelihood. However, the identification likelihood calculation part 332 does not calculate identification likelihoods with respect to track-coupling candidate/identification pairs with track-coupling candidates or identifications indicating "unknown"; hence, it solely multiplies and normalizes identification likelihoods, which are calculated with respect to other track-coupling candidate/identification pairs.

The operation of the identification likelihood calculation part 332 calculating identification likelihoods of hypotheses will be described with regard to an example of [{(track 1, track 3), ID1}, {(track 2, track 4), unknown}]. Herein, it is presumed that the relationship between identifications, detection times, and identification detection device numbers shown in FIG. 10 has already been produced. The identification likelihood calculation part 332 extracts track-coupling candidate/identification pairs from a hypothesis so as to implement the following procedure on track-coupling candidate/identification pairs without including "unknown".

First, the identification likelihood calculation part 332 extracts identifications from track-coupling candidate/identification pairs. For instance, the identification likelihood calculation part 332 extracts ID1 from {(track 1, track 3), ID1}. Next, the identification likelihood calculation part 332 reads a detection probability of the extracted identification from an identification probability map. As shown in FIG. 10, it can be understood that the identification information detection device 2a has detected the identification ID1 at times t1, t2. Therefore, the identification likelihood calculation part 332 reads probabilities from the identification probability map of the identification information detection device 2a (see FIG. 8) at times t1, t2. As shown in FIG. 11, a mobile body exists at cells c(1,4), c(2,3) at times t1, t2 in connection with a track-coupling candidate (track 1, track 3). As a probability at time t1, the identification likelihood calculation part 332 reads a value "0.8" of the cell c(1,4) from the identification probability map shown in FIG. 8. As a probability at time t2, it reads a value "0.5" of the cell c(2,3). To implement this procedure, the identification likelihood calculation part 332 may refer to combinations of positional information, detection times, and track numbers, which are detected in a predetermined time in the past, provided by the track-coupling candidate generation part 31 as well as the table (i.e. the table after updating in step S5) provided by the hypothesis generation part 32.

Figure 12:
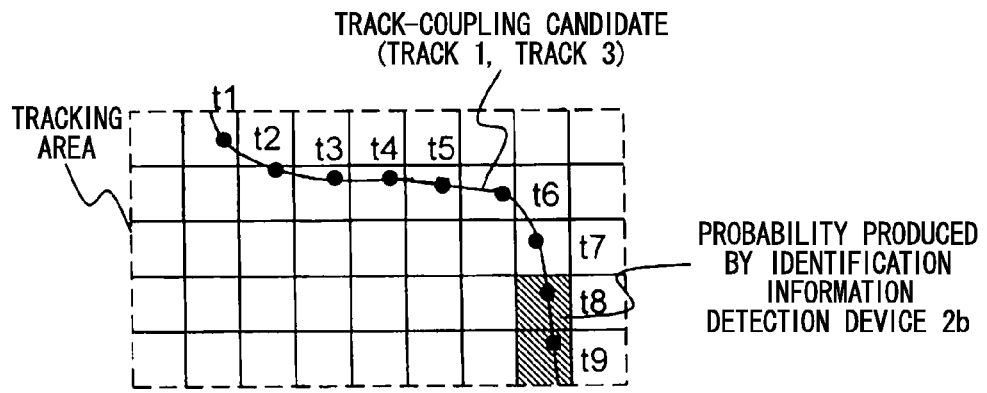
FIG. 12 An illustration of an estimation procedure of tracks 1, 3 based on probabilities produced by the identification information detection device $2b$ in the tracking area.

With reference to FIG. 10, it is understood that the identification information detection device 2b has detected the identification ID1 at times t8, t9. The identification likelihood calculation part 332 reads probabilities at times t8, t9 from the identification probability map of the identification information detection device 2b (see FIG. 9). As shown in FIG. 12, a mobile body exists in cells c(7,1), c(7,0) a times t8, t9. Therefore, the identification likelihood calculation part 332 reads a value "0.7 of the cell c(7,1) from the identification probability map of FIG. 9 as a probability at time t8. Additionally, it reads a value "0.8" of the cell c(7,0) as a probability at time t9.

As described above, the identification likelihood calculation part 332 determines a detection probability of a mobile body at each time of detecting its identification based on positional information specified by a track-coupling candidate and an identification probability map specified by the identification detection device number. In this connection, it is unnecessary to determine detection probabilities of a mobile body at timings of detecting no identifications and at times when the position of a mobile body, located outside the tracking area, cannot be detected.

The identification likelihood calculation part 332 multiplies detection probabilities of a mobile body, which are determined based on positional information specified by track-coupling candidates and identification probability maps specified by identification detection device numbers at their times, thus producing an identification likelihood with respect to a track-coupling candidate/identification pair which is currently being processed. It multiplies the foregoing probabilities 0.8, 0.5, 0.7, and 0.8 with respect to {(track 1, track 3), ID1}. That is, it produces 0.8×0.5×0.7×0.8=0.224 as an identification likelihood for {(track 1, track 3), ID1}. Additionally, the identification likelihood calculation part 332 accumulates the numbers of probabilities used for multiplication per each track-coupling candidate/identification pair, thus producing an accumulation result M.

In the foregoing hypothesis [{(track 1, track 3), ID1}, {(track 2, track 4), unknown}], an identification of "unknown" is included in {(track 2, track 4), unknown}, in which its track-coupling candidate is not correlated to its identification. Therefore, the identification likelihood calculation part 332 does not calculate an identification likelihood with respect to {(track 2, track 4), unknown}.

The identification likelihood calculation part 332 normalizes the multiplication result of probabilities which are calculated per each track-coupling candidate/identification pair ascribed to a hypothesis, thus providing a normalization value as an identification likelihood for the hypothesis. The foregoing hypothesis produces an identification "0.224" with respect to {(track 1, track 3), ID1}; hence, this identification should be normalized. Normalization produces an Mth root of the multiplication result of identification likelihoods which are calculated per each track-coupling candidate/identification pair. Herein, M indicates an accumulating value of probabilities (i.e. their total number) used for calculating identification likelihoods per each track-coupling candidate/ identification pair. Since four probabilities are used to calculate an identification likelihood of "0.224" with respect to {(track 1, track 3), ID1}, the identification likelihood calculation part 332 carries out normalization to calculate a quadruple root of "0.224", thus determining the normalization result as an identification likelihood representing the entirety of the hypothesis [{(track 1, track 3), ID1}, {(track 2, track 4), unknown}].

Next, normalization regarding an identification likelihood for another hypothesis [{(track1), ID1}, {(track 2, track 3, track 4), unknown}] will be described with reference to FIGS. 6 and 10. Two probabilities are read from coordinates of track 1 at times t1, t2 with respect to {(track 1), ID1}. No identification likelihood is calculated with respect to {(track 2, track 3, track 4), unknown}. That is, the identification likelihood calculation part 332 calculates an identification likelihood of {(track 1), ID1} and then carries out normalization to calculate its square root. Additionally, no identification likelihood is calculated with respect to {(track 1), unknown} including "unknown" in another hypothesis [{(track 1), unknown}, {(track 2, track 3, track 4), ID1}]. On the other hand, two probabilities are read from coordinates of track 2 at times t1, t2 with respect to {(track 2, track 3, track 4), ID1}. A single probability is read from coordinates of a median point between track 3 and track 4 at time t8. A single probability is read from coordinates of a median point between track 3 and track 4 at time t9. That is, it is possible to obtain four probabilities in total. Therefore, the identification likelihood calculation part 332 calculates an identification likelihood with respect to {(track 2, track 3, track 4), ID1} and then carries out normalization to calculate its quadruple root.

Figure 13:
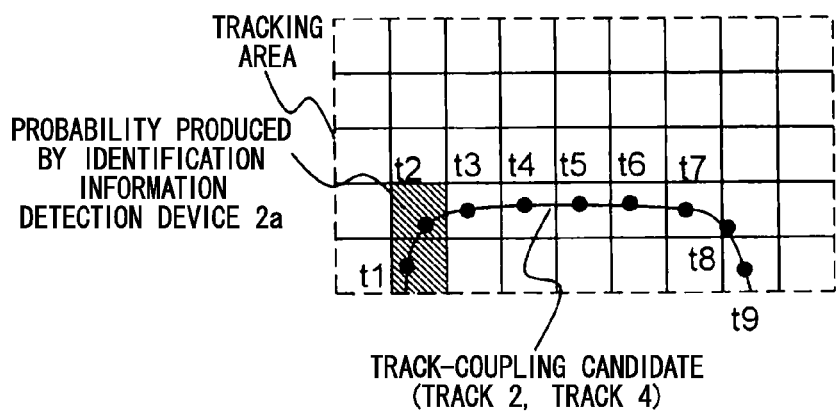
FIG. 13 An illustration of an estimation procedure of tracks 2, 4 based on probabilities produced by the identification information detection device $2a$ in the tracking area.

Next, a calculation process regarding an identification likelihood of a hypothesis [{(track 1, track 3), unknown}, {(track 2, track 4), ID1}] will be described. Herein, no identification likelihood is calculated with respect to {(track 1, track 3), unknown} including "unknown". On the other hand, the identification likelihood calculation part 332 extracts an identification ID1 from {(track 2, track 4), ID1}. The identification information detection device 2a has detected the identification ID1 at times t1, t2 (see FIG. 10). The identification likelihood calculation part 332 reads probabilities at times t1, t2 from the identification probability map of the identification information detection device 2a (see FIG. 8). As shown in FIG. 13, a mobile body exists in cells c(1,0), c(1,1) at times t1, t2 in connection with a track-coupling candidate (track 2, track 4). Therefore, the identification likelihood calculation part 332 reads a value "0.1" of the cell c(1,0) from the identification probability map of FIG. 8 as a probability at time t1. Additionally, it reads a value "0.3" of the cell c(1,1) as a probability at time t2.

Figure 14:
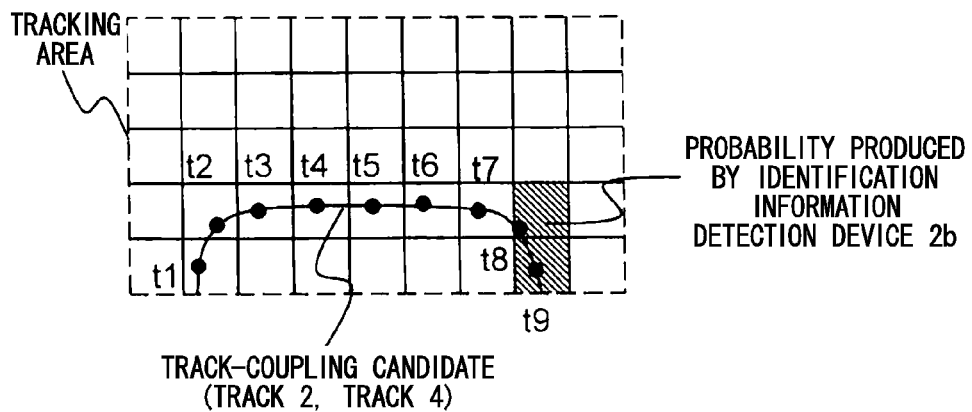
FIG. 14 An illustration of an estimation procedure of tracks 2, 4 based on probabilities produced by the identification information detection device $2b$ in the tracking area.

The identification information detection device 2b has detected the identification ID1 at times t8, t9 (see FIG. 10). The identification likelihood calculation part 332 reads probabilities at times t8, t9 from the identification probability map of the identification information detection device 2b (see FIG. 9). On the other hand, a mobile body exists in the cells c(7,1), c(7,0) at times t8, t9 in connection with a track-coupling candidate (track 2, track 4) as shown in FIG. 14. Therefore, the identification likelihood calculation part 332 reads a value "0.7" of the cell c(7,1) from the identification probability map of FIG. 9 as a probability at time t8. Additionally, it reads a value "0.8" of the cell c(7,0) as a probability at time t9.

The identification likelihood calculation part 332 determines the multiplication result of probabilities 0.1, 0.3, 0.7, and 0.8, which are calculated with respect to {(track 2, track 4), ID1}, as an identification likelihood. That is, the identification likelihood of {(track 2, track 4), ID1} is 0.1×0.3×0.7× 0.8=0.0168. This calculation uses four probabilities. Since no identification likelihood is calculated with respect to {(track 1, track 3), unknown} including "unknown", the identification likelihood calculation part 332 carries out normalization to calculate a quadruple root of 0.0168. The normalization result is determined as the identification likelihood of the hypothesis [{(track 1, track 3), unknown}, {(track 2, track 4), ID1}].

After step S10 for calculating the identification likelihood of a hypothesis, the identification likelihood calculation part 332 integrates the track-coupling likelihood (i.e. the track-coupling likelihood per each track-coupling candidate/identification pair ascribed to a hypothesis), calculated in step S9, and the identification likelihood calculated in step S10 (step S11). Herein, the identification likelihood calculation part 332 integrates likelihoods by multiplying the track-coupling likelihood and the identification likelihood. That is, the multiplication result of the track-coupling likelihood and the identification likelihood is used as an integrated result of likelihoods. In this case, the identification likelihood calculation part 332 may perform a weighted calculation on the track-coupling likelihood and the identification likelihood. For instance, the track-coupling likelihood and the identification likelihood can be multiplied by weight coefficients and then multiplied together. The identification likelihood calculation part 332 stores a pair of a hypothesis and an integrated result of likelihoods. When X denotes an integrated result of likelihoods as [{(track 1, track 3), ID1}, {(track 2, track 4), unknown}], for example, a pair of <[{(track 1, track 3), ID1}, {(track 2, track 4), unknown}], X> is stored.

In step S9, it is possible to produce a plurality of track-coupling likelihoods, the number of which corresponds to the number of track-coupling candidate/identification pairs ascribed to a hypothesis. Herein, it is possible to integrate a plurality of track-coupling likelihoods which are calculated by the track-coupling likelihood calculation part 331. That is, the track-coupling likelihood calculation part 331 multiplies a plurality of track-coupling likelihoods. In step S11, the multiplication result of track-coupling likelihoods is multiplied by an identification likelihood. That is, multiplication of track-coupling likelihoods can be carried out in step S9, or it can be carried out in step S11 together with integration with an identification likelihood. In either case, step S11 finally produces the same integration result of likelihoods.

After step S11, the likelihood calculation part 33 repeatedly executes a loop consisting of steps S8 to S11. Upon determining nonexistence of hypotheses with uncalculated likelihoods in step S8 (i.e. a decision result "No" of step S8), the identification likelihood calculation part 332 specifies a hypothesis providing the maximum integration result of the track-coupling likelihood and the identification likelihood (step S12). That is, the identification likelihood calculation part 332 refers to pairs of hypotheses and integration results of likelihoods stored in step S11 so as to specify a hypothesis providing the maximum integration result of likelihoods. The identification likelihood calculation part 332 sends the most-probable hypothesis to the identification result output device 4.

Upon receiving the most-probable hypothesis specified in step S12, the identification result output device 4 determines which mobile body matches which track based on track-coupling candidate/identification pairs ascribed to the most-probable hypothesis. For instance, the relationship between tracks and mobile bodies are displayed (step S13). At this time, the identification result output device 4 may specifically displays the position or track of a mobile body.

The operation of Embodiment can be summarized such that the track-coupling candidate generation part 31 generates track-coupling candidates combining tracks which are detected in a predetermined time in the past while the hypothesis generation part 32 generates hypotheses representing sets of pairs of track-coupling candidates and identifications. With reference to pairs of positional information and identifications which are detected at the same time, the likelihood calculation part 33 calculates similarities of positional information per each hypothesis, based on positional information and identifications which are detected in a predetermined time in the past, as likelihoods. Pairs of positional information and identifications which are detected at the same time may indicate identity information with many mobile bodies which are detected in a predetermined time in the past. This makes it possible to identify and track a mobile body without solely depending on the position which is confirmed as the existence of a mobile body; hence, it is possible to robustly estimate the correlation between tracks and identifications irrespective of interruption of tracking. That is, it is possible to robustly estimate which mobile body matches which track.

The technologies disclosed in Patent Documents 1, 2 are designed to resume tracking based on newly reacquired features and identifications when interruption frequently occurs in tracking mobile bodies; in other words, correlating and tracking of mobile bodies are resumed based on a small amount of information which is newly acquired after interruption of tracking. For this reason, they do not expect high-precision tracking of mobile bodies. In contrast, Embodiment 1 is designed to generate track-coupling candidates connecting fragmented tracks irrespective of interruption in tracking mobile bodies, thus estimating the correlations between tracks and identifications based on the information which is detected in a predetermined time in the past (i.e. information determined in step S2, and information shown in FIG. 10). As described above, Embodiment 1 utilizes not only the information recognized at the present time but also the information which is collected in a time range retroactive to the past by a predetermined time; hence, it is possible to estimate the correlations between tracks and identifications with a high precision.

Next, the mobile body track identification method of Embodiment 1 is compared with the conventional mobile body track identification method which utilizes only the information after resuming tracking without using the information before occurrence of interruption when interruption occurs in tracking mobile bodies.

According to the conventional mobile body track identification method, when interruption of tracking occurs at times t4 to t6 as shown in FIGS. 1 to 14, it is impossible to establish the correlation between tracks and identifications with respect to track 3 and track 4, which are detected thereafter, until a new identification is detected at time t8. As shown in FIGS. 11 to 14, track 3 and track 4 are positioned in the same cell at times t8, t9. In this case, it is difficult to determine which of track 3 and track 4 should be correlated to the identification detected at time t8.

In contrast, the mobile body track identification method of Embodiment 1 connects tracks by use of the information detected at times t1 to t9, and calculates identification likelihoods based on detection probabilities of identifications at detection times in a predetermined time in the past, thus estimating most-probable hypotheses.

Next, a variation of Embodiment 1 will be described. Herein, the identification likelihood calculation part 332 calculates integration results of track-coupling likelihoods and identification likelihoods in step S11 so as to store pairs of hypotheses and integration results of likelihoods. Additionally, the identification likelihood calculation part 332 estimates a hypothesis having the highest integration result of likelihoods as a most-probable hypothesis in step S12. That is, it is possible to specify hypotheses solely based on identification likelihoods without calculating integration results of track-coupling likelihoods and identification likelihoods. According to this variation, the likelihood calculation part 33 does not need to include the track-coupling likelihood calculation part 331; hence, it is unnecessary to calculate track-coupling likelihoods (step S9). Since track-coupling likelihoods need not be calculated, it is unnecessary to integrate track-coupling likelihoods and identification likelihoods (step S11). According to this variation, when the existence of hypotheses with uncalculated likelihoods is determined (i.e. a decision result "Yes" of step S8) so that the identification likelihood calculation part 332 calculates identification likelihoods of hypotheses in step S10, it is necessary to store pairs of hypotheses and identification likelihoods. Subsequently, the identification likelihood calculation part 332 may specify a hypothesis having the highest identification likelihood in step S12. Other processes are similar to those of Embodiment 1.

However, it is preferable that the most-probable hypothesis be estimated based on integration results of track-coupling likelihoods and identification likelihoods because this may improve a precision in estimating the correlation between tracks and identifications.

Embodiment 2

Figure 15:
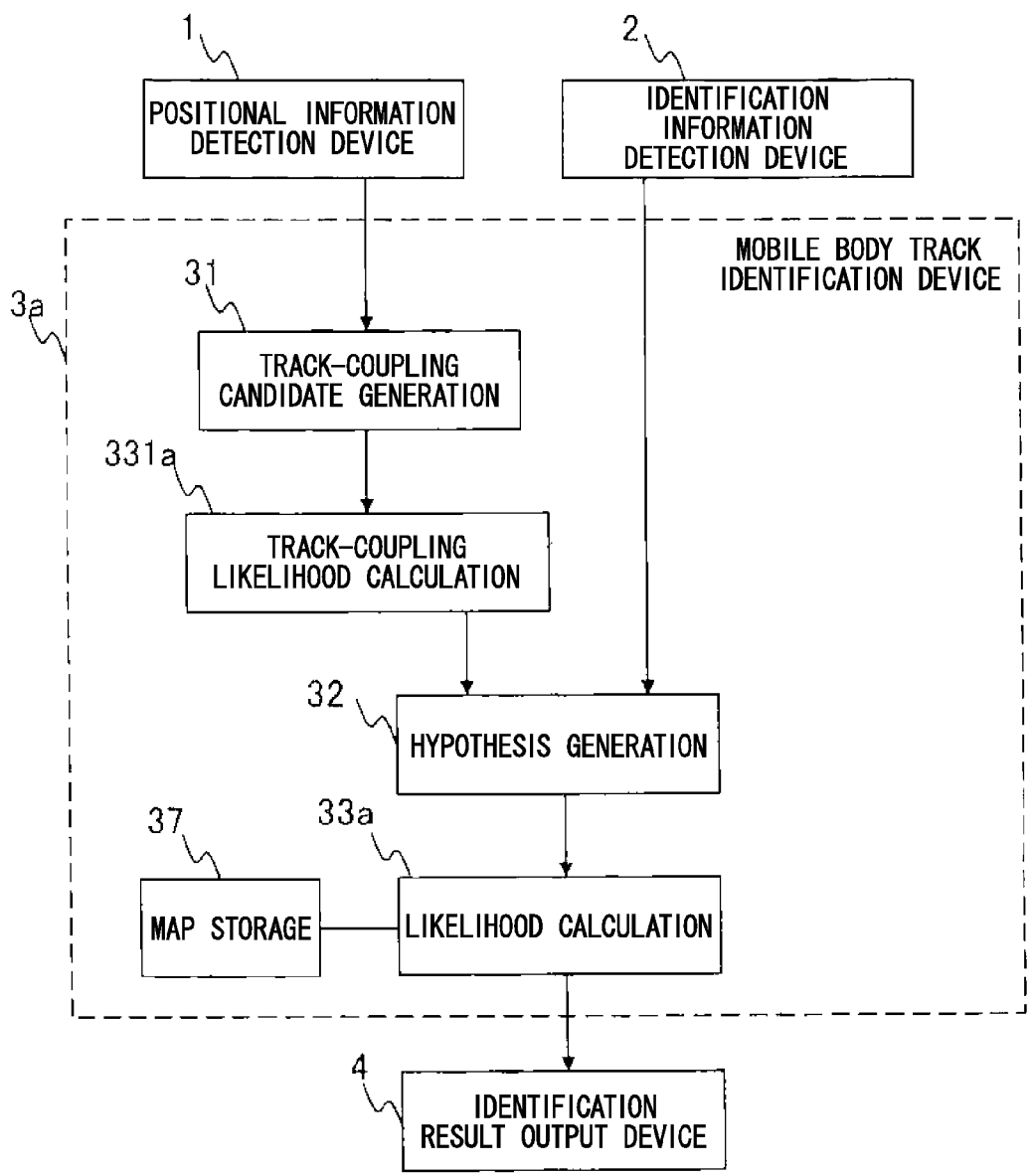
FIG. 15 A block diagram showing the constitution of a mobile body track identification device in a mobile body track identification system according to Embodiment 2 of the present invention.

FIG. 15 is a block diagram of a mobile body track identification system according to Embodiment 2 of the present invention. Herein, the same constituent elements as the constituent elements of Embodiment 1 (see FIG. 2) are designated by the same reference numerals; hence, detailed descriptions thereof will be omitted. The mobile body track identification system of Embodiment 2 includes the positional information detection device 1, the identification information detection device 2, a mobile body track identification device 3a, and the identification result output device 4. The mobile body track identification device 3a includes the track-coupling candidate generation part 31, the hypothesis generation part 32, and the map storage 37. Additionally, the mobile body track identification device 3a includes a likelihood calculation part 33a and a track-coupling likelihood calculation part 331a.

The track-coupling likelihood calculation part 331a calculates a track-coupling likelihood per each track-coupling candidate generated by the track-coupling candidate generation part 31. The calculation method of track-coupling likelihoods of the track-coupling likelihood calculation part 331a is identical to that of the track-coupling likelihood calculation part 331 of Embodiment 1. That is, the track-coupling likelihood calculation part 331a of Embodiment 2 solely performs calculation on track-coupling candidates including tracks which are detected at different times irrespective of track-coupling candidates including tracks which are detected at the same time. Additionally, the track-coupling likelihood calculation part 331a of Embodiment 2 performs calculations on track-coupling candidates each including two tracks and track-coupling candidates each including three or more tracks. Moreover, the track-coupling likelihood calculation part 331a of Embodiment 2 sets a constant (e.g. "1") to track-coupling likelihoods of track-coupling candidates each including a single track.

The track-coupling likelihood calculation part 331a solely sends track-coupling candidates whose track-coupling likelihoods, calculated by the track-coupling likelihood calculation part 331a, are above or equal to a threshold to the hypothesis generation part 32. Therefore, it precludes track-coupling candidates with track-coupling likelihoods below the threshold from processing. Herein, the threshold for track-coupling likelihoods is determined in advance. Additionally, the track-coupling likelihood calculation part 331a may solely send track-coupling candidates whose track-coupling likelihoods exceed the threshold to the hypothesis generation part 32.

The hypothesis generation part 32 generates hypotheses by use of track-coupling candidates received from the track-coupling likelihood calculation part 331a. Other processes of the hypothesis generation part 32 are identical to those of Embodiment 1.

Figure 16:
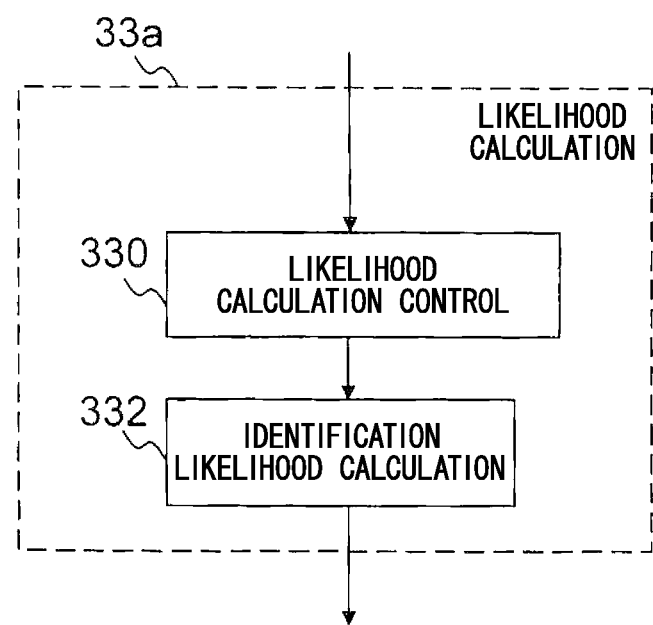
FIG. 16 A block diagram showing the constitution of a likelihood calculation part of the mobile body track identification device.

The likelihood calculation part 33a of Embodiment 2 calculates identification likelihoods per each hypothesis generated by the hypothesis generation part 32, thus sending a hypothesis with the highest identification likelihood to the identification result output device 4. FIG. 16 is a block diagram showing the constitution of the likelihood calculation part 33a. Herein, the same constituent parts as the constituent parts of the likelihood calculation part 33 of Embodiment 1 (see FIG. 3) are designated by the same reference numerals. The likelihood calculation part 33a includes the likelihood calculation control part 330 and the identification likelihood calculation part 332 but does not include the track-coupling likelihood calculation part 331 used in Embodiment 1. That is, the likelihood calculation part 33a of Embodiment 2 differs from the likelihood calculation part 33 of Embodiment 1 in that it does not calculate track-coupling likelihoods.

In the likelihood calculation part 33a of Embodiment 2, the likelihood calculation control part 330 sends hypotheses with uncalculated identification likelihoods to the identification likelihood calculation part 332.

Similar to Embodiment 1, the identification likelihood calculation part 332 calculates identification likelihoods of track-coupling candidate/identification pairs per each hypothesis. In Embodiment 2, however, the identification likelihood calculation part 332 sends a hypothesis with the highest identification likelihood to the identification result output device 4. In Embodiment 2, the identification likelihood calculation part 332 specifies a hypothesis to be sent to the identification result output device 4 based on identification likelihoods rather than the integration result of track-coupling likelihoods and identification likelihoods.

For instance, the track-coupling candidate generation part 31, the track-coupling likelihood calculation part 331a, the hypothesis generation part 32, and the likelihood calculation part 33a (including the likelihood calculation control part 330 and the identification likelihood calculation part 332) are realized using a computer which operates according to a mobile body track identification program. That is, a program memory of a computer (not shown) stores the mobile body track identification program so that a CPU loads the program, thus realizing the functions of the track-coupling candidate generation part 31, the track-coupling likelihood calculation part 331a, the hypothesis generation part 32, and the likelihood calculation part 33a. Alternatively, it is possible to realize the track-coupling candidate generation part 31, the track-coupling candidate calculation part 331a, the hypothesis generation part 32, and the likelihood calculation part 33a by use of individual hardware elements. Additionally, the likelihood calculation control part 330 and the identification likelihood calculation part 332 can be realized by use of individual hardware elements.

Next, the operation of the mobile body track identification device 3a of the mobile body track identification system of Embodiment 2 will be described.

Figure 17:
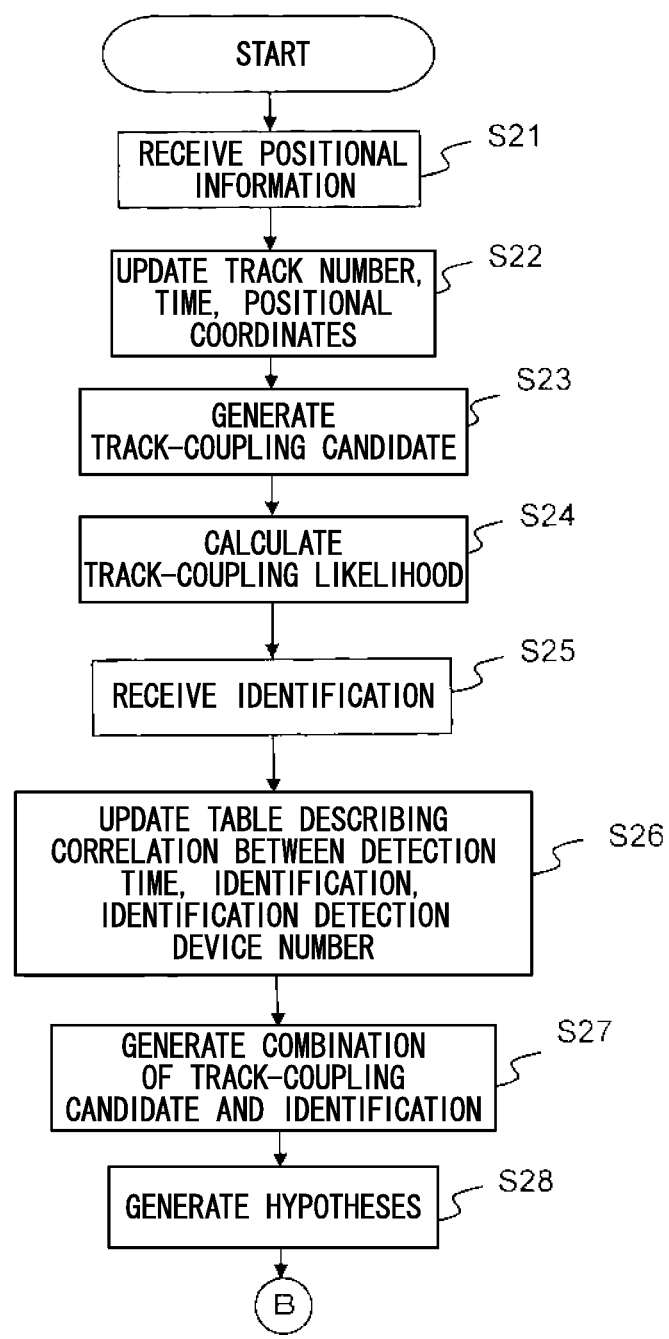
FIG. 17 A flowchart showing the operation of the mobile body track identification device according to Embodiment 2.
Figure 18:
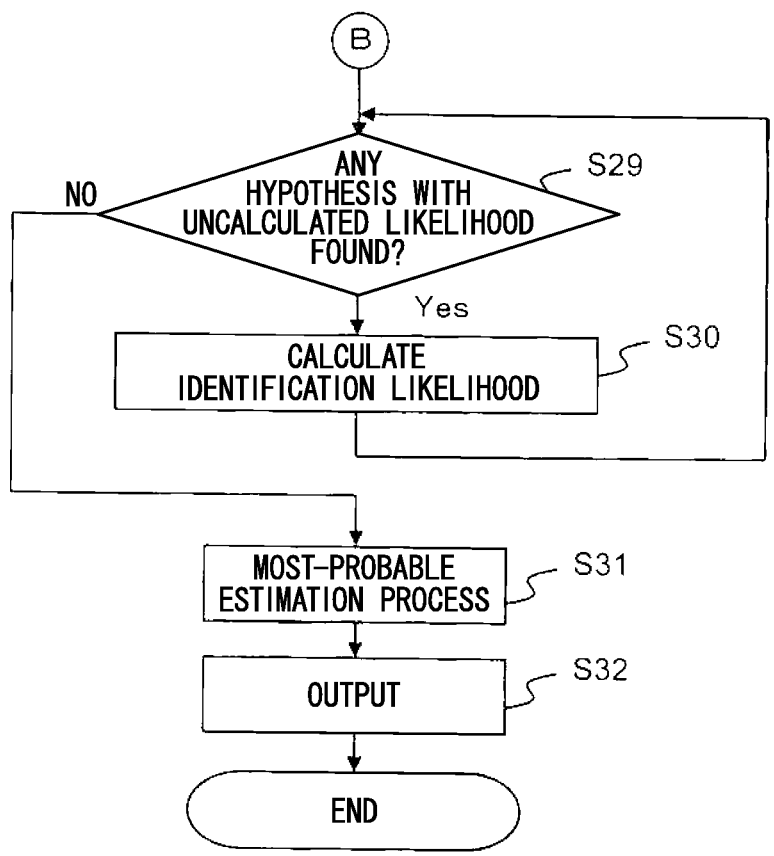
FIG. 18 A flowchart showing the operation of the mobile body track identification device according to Embodiment 2.

FIGS. 17 and 18 are flowcharts showing the processing of the mobile body track identification device 3a of Embodiment 2. First, the track-coupling candidate generation part 31 retrieves combinations of track numbers, detection times, and positional coordinates from the positional information detection device 2 (step S21).

Upon receiving the current combination of positional information, detection times, and track numbers in step S21, the track-coupling candidate generation part 31 additionally store it therein while deleting the oldest positional information, thus updating the positional information (step S22). As a result, the track-coupling candidate generation part 31 holds a plurality of positional information which is detected in a predetermined time in the past from the current time. The processes of steps S21 and S22 of Embodiment 2 are identical to those of Embodiment 1.

Next, the track-coupling candidate generation part 31 generates and sends track-coupling candidate, combining track numbers held therein, to the track-coupling likelihood generation part 331a (step S23). The track-coupling candidate generation part 31 calculates positional coordinates of a median point among different positional coordinates of tracks which are detected at the same time with respect to each track-coupling candidate. Calculations of track-coupling candidates and positional coordinates of median points in Embodiment 3 are identical to those of step S3 in Embodiment 1.

The track-coupling candidate generation part 31 does not only store combinations of positional information, detection times, and track numbers (i.e. combinations of positional information, detection times, and track numbers determined by an updating process of step S22), which are detected in a predetermined time in the past, by itself but also sends them to the track-coupling likelihood calculation part 331a and the likelihood calculation part 33a. It calculates and sends a median point of different positional coordinates of tracks, which are detected at the same time, to the likelihood calculation part 33a as well. These pieces of information can be supplied to the likelihood calculation part 33a via the track-coupling likelihood calculation part 331a and the hypothesis generation part 32.

The track-coupling likelihood calculation part 331a calculates a track-coupling likelihood per each track-coupling candidate received in step S23 (step S24). In Embodiment 2, the process of calculating track-coupling likelihoods for individual track-coupling candidates is identical to the calculation process of track-coupling likelihoods of the track-coupling likelihood calculation part 331 of Embodiment 1. In step S24, the track-coupling likelihood calculation part 331a compares track-coupling likelihoods with a predetermined threshold so as to solely send track-coupling candidates whose track-coupling likelihoods are above or equal to the threshold to the hypothesis generation part 32.

The hypothesis generation part 32 retrieves combinations of a detection times, identifications, and identification detection device numbers from the identification information detection device 2 (step S25). The hypothesis generation part 32 additionally registers combinations of detection times, identifications, and identification detection device numbers with the table of FIG. 10 while deleting the oldest identification (step S26). The hypothesis generation part 32 does not only store the updated table content by itself but also sends it to the likelihood calculation part 33a. In this connection, steps S25, 26 of Embodiment 2 are identical to steps S4, S5 of Embodiment 1 (see FIG. 4).

The hypothesis generation part 32 generates all the sets of track-coupling candidate/identification pairs by use of identifications stored in the table updated in step S26 and track-coupling candidates received from the track-coupling likelihood calculation part 331a in step S24 (step S27). Step S27 of Embodiment 2 is similar to step S26 of Embodiment 1 except that it uses track-coupling candidates received from track-coupling candidates received from the track-coupling likelihood calculation part 331a.

Next, the hypothesis generation part 32 generates all the sets of track-coupling candidate/identification pairs (i.e. hypotheses) satisfying the first to third conditions (step S28). Step S28 of Embodiment 2 is identical to step S7 of Embodiment 1. The hypothesis generation part 32 sends hypotheses, generated therein, to the likelihood calculation part 33a.

The likelihood calculation control part 330 of the likelihood calculation part 33a makes a decision as to whether or not any hypothesis with uncalculated likelihoods (i.e. non-execution of step S30) exists in hypotheses received in step S28 (step S29). When hypotheses with uncalculated likelihoods exists (i.e. a decision result "Yes" of step S29), the identification likelihood calculation part 332 sends one of hypotheses with uncalculated likelihoods to the identification likelihood calculation part 332.

The identification likelihood calculation part 332 calculates an identification likelihood of the received hypothesis (step S30). The calculation process of identification likelihoods of hypotheses in Embodiment 2 is identical to Embodiment 1. That is, the identification likelihood calculation part 332 calculates identification likelihoods per each track-coupling candidate/identification pair ascribed to a hypothesis, multiplies and normalizes identification likelihoods per each track-coupling candidate/identification pair, thus determining an identification likelihood of a hypothesis. In step S30 of Embodiment 2, the identification likelihood calculation part 332 stores identification likelihoods in connection with hypotheses.

After step S30, the likelihood calculation part 33a repeatedly executes steps S29 and S30. Upon determining nonexistence of hypotheses with uncalculated likelihoods in step S29 (i.e. a decision result "No" of step S29), the identification likelihood calculation part 332 estimates a hypothesis having the highest identification likelihood as a most-probable hypothesis (step S31). The identification likelihood calculation part 332 sends the most-probable hypothesis to the identification result output device 4.

Upon receiving the most-probable hypothesis in step S31, the identification result output part 4 determines and presents which mobile body matches which track based on track-coupling candidate/identification pairs ascribed to the most-probable hypothesis (step S32). Herein, the identification result output device 4 may specifically display the position or track of a mobile body. In this connection, step S32 of Embodiment 2 is identical to step S13 of Embodiment 1 (see FIG. 5).

Similar to Embodiment 1, Embodiment 2 is able to robustly estimate the correlation between tracks and identifications.

In Embodiment 2, the track-coupling likelihood calculation part 331a calculates track-coupling likelihoods of track-coupling candidates so as not to provide the hypothesis generation part 32 with track-coupling candidates whose track-coupling likelihoods are less than the threshold, thus precluding those track-coupling candidates from being used for hypothesis generation. Thus, it is possible to reduce workloads of the hypothesis generation part 32 in terms of the process of generating track-coupling candidate/identification pairs (step S27) and the process of generating hypotheses (step S28). As a result, it is possible to establish the correlation between tracks and identifications at a high speed. That is, it is possible to determine which mobile body matches which track at a high speed.

Embodiment 3

Figure 19:
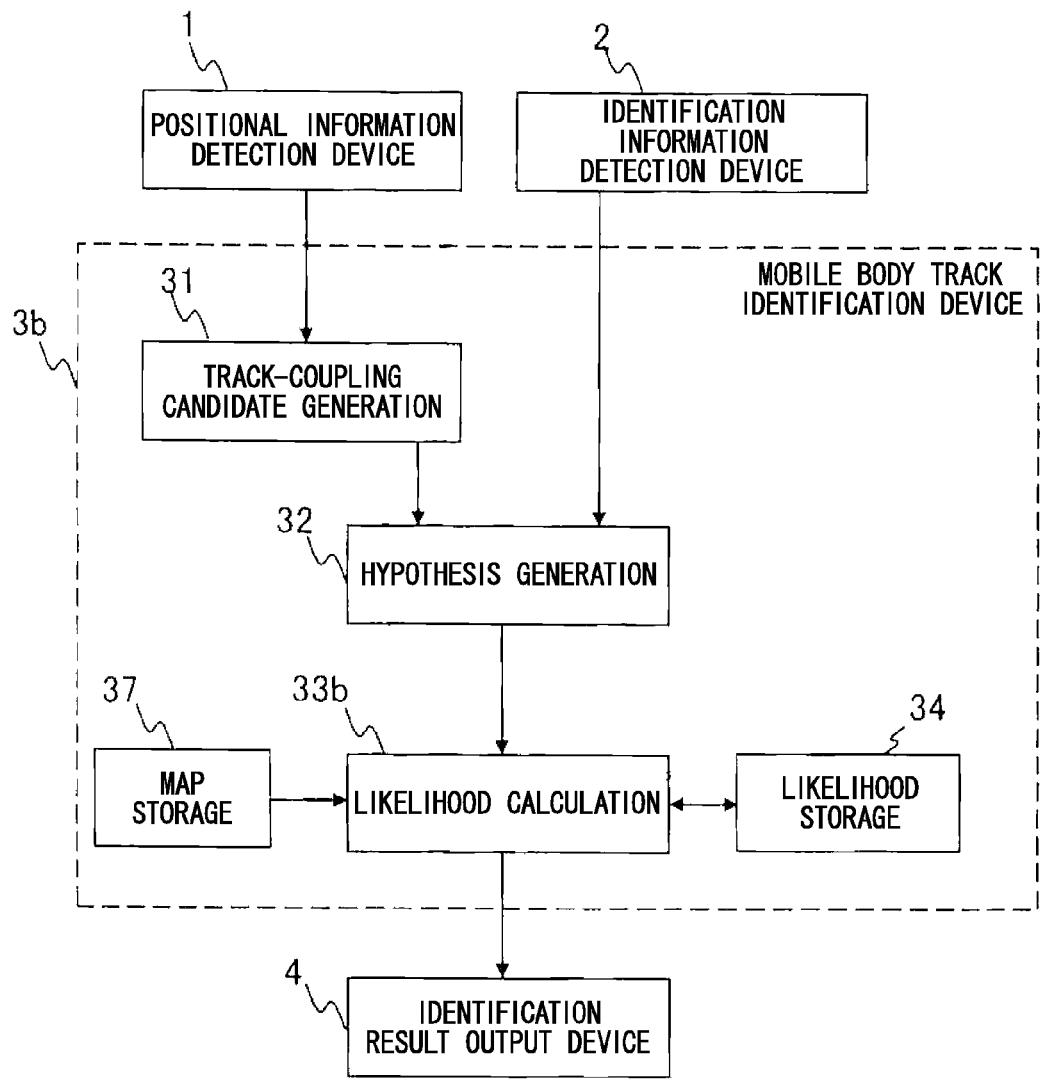
FIG. 19 A block diagram showing the constitution of a mobile body track identification device in a mobile body track identification system according to Embodiment 3 of the present invention.

FIG. 19 is a block diagram of a mobile body track identification system according to Embodiment 3 of the present invention. Herein, the same constituent parts as the constituent parts of Embodiment 1 are designated by the same reference numerals; hence, detailed descriptions thereof will be omitted. The mobile body track identification system of Embodiment 3 includes the positional information detection device 1, the identification information detection device 2, a mobile body track identification device 3b, and the identification result output device 4. The mobile body track identification device 3b of Embodiment 3 includes the track-coupling candidate generation part 31, the hypothesis generation part 32, and the map storage 37. Additionally, the mobile body track identification device 3b includes a likelihood calculation part 33b and a likelihood storage 24.

The likelihood storage 34 stores a likelihood of correlating tracks and identifications (hereinafter, referred to as a "track/identification correlation likelihood") per each pair of an identification and a track number representing a track to be followed. The likelihood storage 34 stores a track/identification correlation likelihood per each pair of a track number and an identification. The likelihood calculation part 33b calculates track/identification correlation likelihoods, which are stored in the likelihood storage 34.

The likelihood calculation part 33b calculates and integrates track-coupling likelihoods and identification likelihoods per each hypothesis. Additionally, the likelihood calculation part 33b estimates a hypothesis with the highest integration value of track-coupling likelihoods and identification likelihoods as a most-probable hypothesis, thus sending it to the identification result output device 4.

In order to calculate identification likelihoods of track-coupling candidate/identification pairs ascribed to a hypothesis, the likelihood calculation part 33b calculates identification likelihoods in a similar way of Embodiment 1, and integrates them with track/identification correlation likelihoods stored in the likelihood storage 34, thus determining their integration values as identification likelihoods of track-coupling candidate/identification pairs. Specifically, the likelihood calculation part 33b reads a track/identification correlation likelihood, stored in the likelihood storage 34, with respect to the current combination of a track (a track number) and its identification, corresponding to a track-coupling candidate of a track-coupling candidate/identification pair, thus providing it to the above integration process. The likelihood calculation part 33b multiplies and normalizes identification likelihoods of track-coupling candidate/identification pairs, thus calculating identification likelihoods of hypotheses.

The likelihood calculation part 33b calculates a track/identification correlation likelihood based on an identification likelihood per each track-coupling candidate/identification pair ascribed to each hypothesis, thus storing it in the likelihood storage 34. Specifically, an identification likelihood (called Q) is stored as a track/identification correlation likelihood in the likelihood storage 34 in connection with a combination of an identification (called a) of a track-coupling candidate/identification pair and a current track (a track number β) of its track-coupling candidate. This indicates that a mobile body having the identification α is correlated to a track having the track number β with the probability Q. As described above, a track/identification correlation likelihood stored in the likelihood storage 34 is read in a next cycle of the likelihood calculation 33b that calculates an identification likelihood of a track-coupling candidate/identification pair ascribed to a hypothesis.

Figure 20:
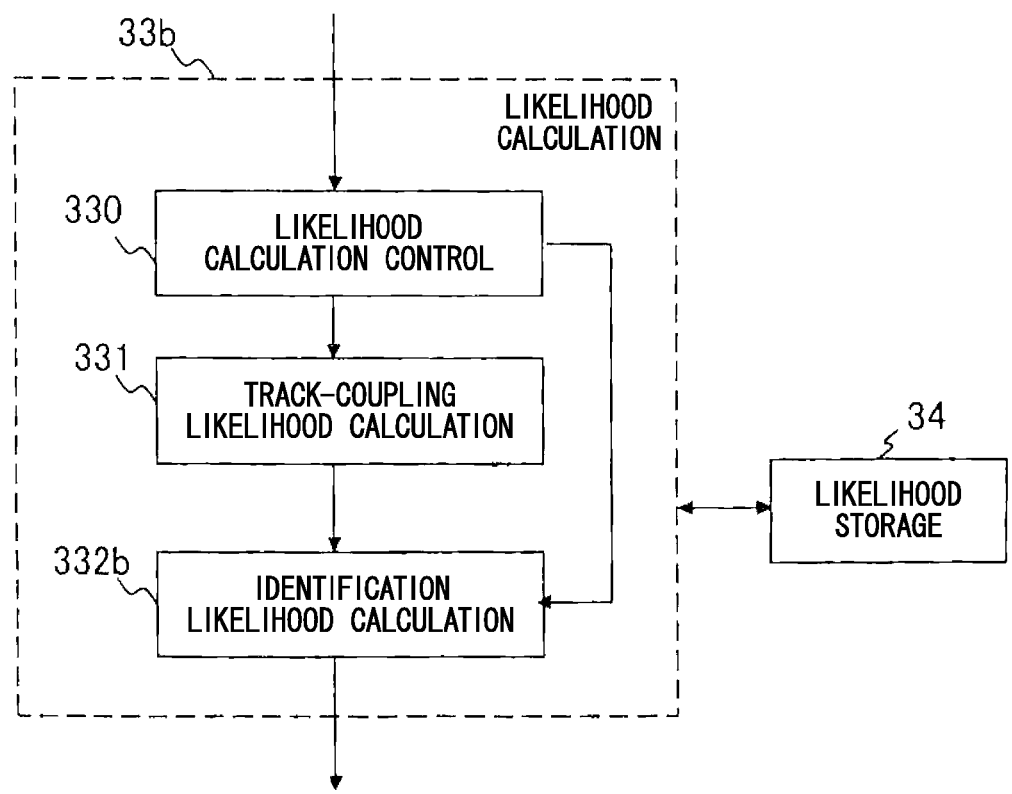
FIG. 20 A block diagram showing the constitution of a likelihood calculation part of the mobile body track identification device.

FIG. 20 is a block diagram showing the constitution of the likelihood calculation part 33b of Embodiment 3. The likelihood calculation part 33b includes the likelihood calculation control part 330, the track-coupling likelihood calculation part 331, and an identification likelihood calculation part 332b. The likelihood calculation control part 330 and the track-coupling likelihood calculation part 331 of Embodiment 3 are identical to those of Embodiment 1; hence, their descriptions will be omitted.

The identification likelihood calculation part 332b calculates identification likelihoods per each hypothesis. Before calculating an identification likelihood per each track-coupling candidate/identification pair ascribed to a hypothesis, the identification likelihood calculation part 332b temporarily calculates an identification likelihood according to the same calculation method of Embodiment 1 at first. For the sake of convenience, this identification likelihood will be referred to as a temporary identification likelihood. The identification likelihood calculation part 332b reads a track/identification correlation likelihood from the likelihood storage 34 with respect to a combination of the current track and the identification of a track-coupling candidate/identification par which is currently focused on. When track 2 represents the current track in {(track 1, track 2), ID1}, for example, a track/identification correlation likelihood regarding "track 2, ID1" is read from the likelihood storage 34. The identification likelihood calculation part 332b determines the integration result of the temporary identification likelihood and the track/identification correlation likelihood as an identification likelihood of the track-coupling candidate/identification pair which is currently focused on.

The identification likelihood calculation part 332b performs the following integration process with the temporary identification likelihood and the track/identification correlation likelihood. That is, the identification likelihood calculation part 332b multiplies the temporary identification likelihood and the track/identification correlation likelihood so as to determine the multiplication result as an identification likelihood of the track-coupling candidate/identification pair. Alternatively, the identification likelihood calculation part 332b multiplies the temporary identification likelihood and the track/identification correlation likelihood by weight coefficients and then multiplies them together, thus determining the multiplication result as an identification likelihood of the track-coupling candidate/identification pair. Alternatively, the identification likelihood calculation part 332b multiplies the temporary identification likelihood and the track/identification correlation likelihood by weight coefficients and the adds them together, thus determining the addition result as an identification likelihood of the track-coupling candidate/identification pair.

The identification likelihood calculation part 332b multiples and normalizes identification likelihoods of track-coupling candidate/identification pairs so as to calculate an identification likelihood representing the entirety of a hypothesis, thus integrating it with the track-coupling likelihood. The foregoing process of Embodiment 3 is identical to that of Embodiment 1. The identification likelihood calculation part 332b estimates a hypothesis with the highest integration value as a most-probable hypothesis so as to send it to the identification result output device 4.

The integration likelihood calculation part 332b calculates integration values of track-coupling likelihoods and identification likelihoods with respect to all the hypotheses, thus estimating a most-probable hypothesis. Thereafter, it calculates track/identification correlation likelihoods with respect to track-coupling candidate/identification pairs ascribed to individual hypotheses, thus storing them in the likelihood storage 34.

In Embodiment 3, the track-coupling candidate generation part 31, the hypothesis generation part 32, and the likelihood calculation part 33b (including the likelihood calculation control part 330, the track-coupling likelihood calculation part 331, and the identification likelihood calculation part 332b) can be realized by means of a CPU of a computer that operates according to a mobile body track identification program. In this case, a program memory of a computer (not shown) stores the mobile body track identification program so that the CPU loads the program so as to realize the functions of the track-coupling candidate generation part 31, the hypothesis generation part 32, and the likelihood calculation part 33b. Alternatively, the track-coupling candidate generation part 31, the hypothesis generation part 32, and the likelihood calculation part 33b can be realized using individual hardware elements. Similarly, the likelihood calculation control part 330, the track-coupling likelihood calculation part 331, and the identification likelihood calculation part 332b can be realized using individual hardware elements.

Next, the operation of the mobile body track identification device 3b of Embodiment 3 will be described.

Figure 21:
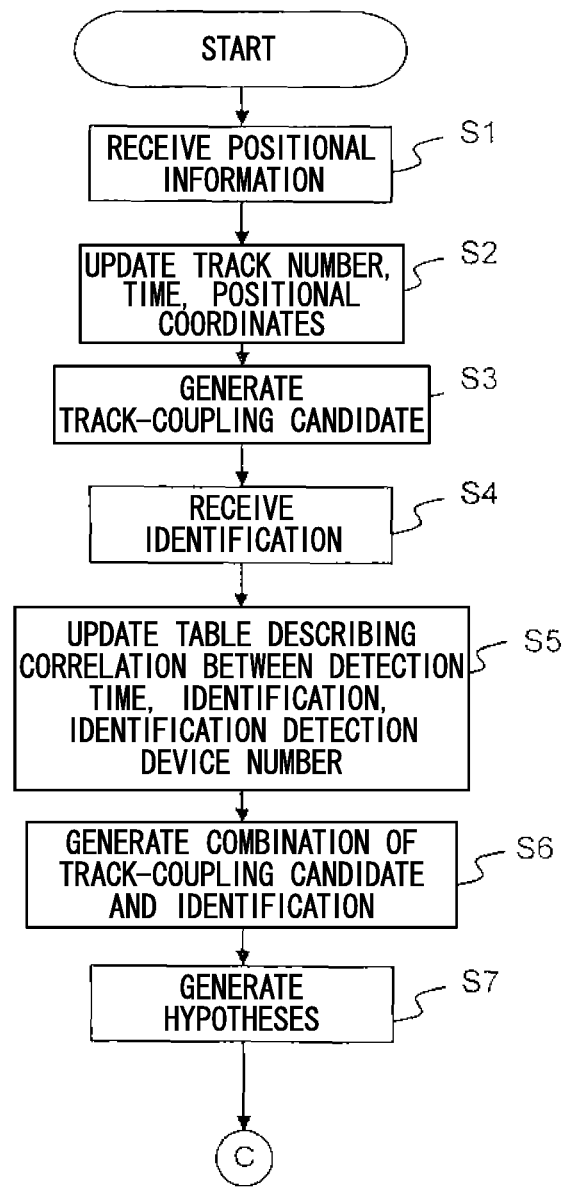
FIG. 21 A flowchart showing the operation of the mobile body track identification device according to Embodiment 3.
Figure 22:
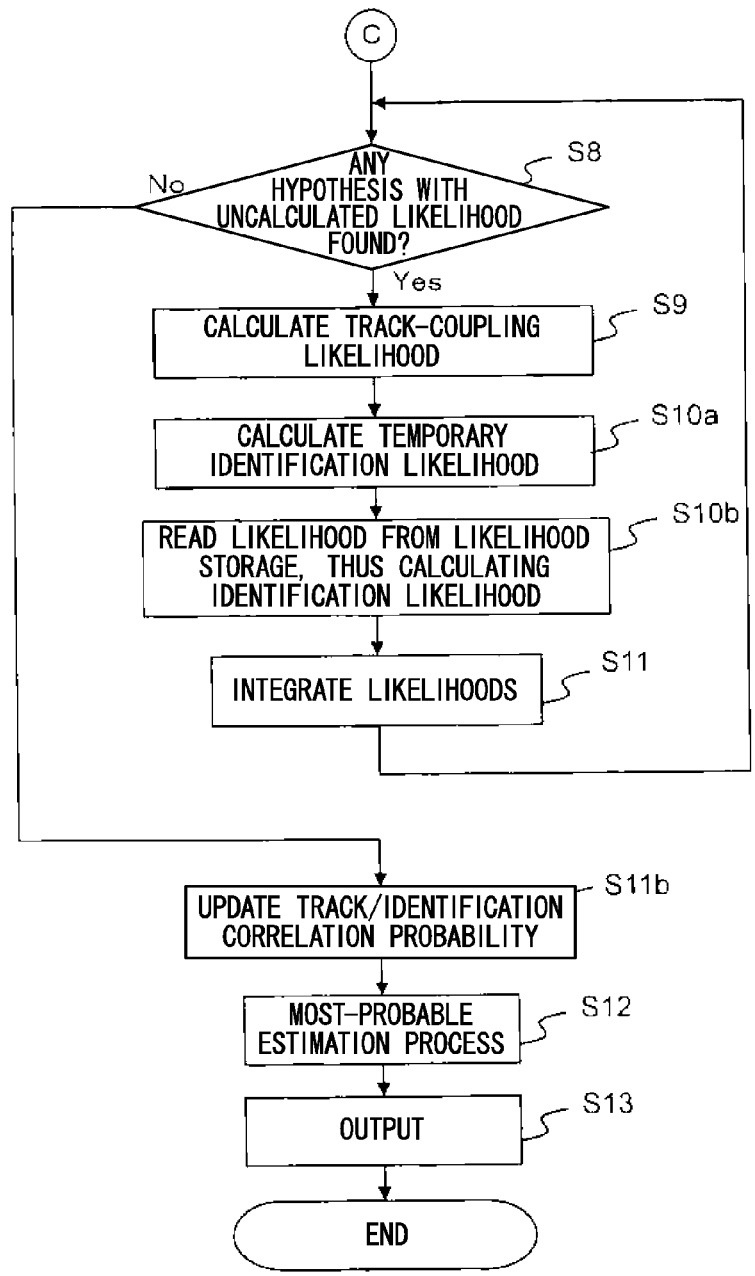
FIG. 22 A flowchart showing the operation of the mobile body track identification device according to Embodiment 3.

FIGS. 21 and 22 are flowcharts showing the processing of the mobile body track identification device 3b of Embodiment 3. Herein, the same steps as the steps of the mobile body track identification device 3 of Embodiment 1 are designated by the same reference numerals shown in the flowcharts of FIGS. 4 and 5; hence, descriptions thereof will be omitted. The process for generating hypotheses in steps S1 to S7 in FIG. 21 is identical to that in steps S1 to S7 in FIG. 4. In step S7, however, it is possible to generate hypotheses satisfying the first to third conditions described in Embodiment 1. This is because identification likelihoods are not calculated with respect to hypotheses not satisfying the third condition, whereas Embodiment 3 is able to calculate likelihoods of hypotheses with reference to track/identification correlation likelihoods stored in the likelihood storage 34.

The hypothesis generation part 32 sends all the generated hypotheses to the likelihood calculation part 33b. The likelihood calculation control part 330 of the likelihood calculation part 33b makes a decision as to whether or not any hypothesis with uncalculated likelihoods exists in the received hypotheses (step S8). When hypotheses with uncalculated likelihoods (i.e. hypotheses without execution of steps S9 to S11) exist (i.e. a decision result "Yes" of step S8), the likelihood calculation control part 330 sends one of hypotheses with uncalculated likelihoods to the track-coupling likelihood calculation part 331 and the identification likelihood calculation part 332b.

Upon receiving a hypothesis without uncalculated likelihoods, the track-coupling likelihood calculation part 331 calculates a track-coupling likelihood per each track-coupling candidate/identification pair ascribed to the hypothesis (step S9). The step S9 of Embodiment 3 are identical to step S9 of Embodiment 1.

The identification likelihood calculation part 332b calculates a temporary identification likelihood per each track-coupling candidate/identification pair ascribed to a hypothesis with uncalculated likelihoods (step S10a). The method for calculating a temporary identification likelihood per each track-coupling candidate/identification pair in Embodiment 3 is identical to the method for calculating a temporary identification likelihood per each track-coupling candidate/identification pair in step S10 of Embodiment 1 (see FIG. 5). Since Embodiment 3 performs further calculation on the calculation result of step S10a so as to produce an identification likelihood per each track-coupling candidate/identification pair; hence, the calculated value of step S10a is called a "temporary identification likelihood".

Next, the identification likelihood calculation part 332b reads a track/identification correlation likelihood per each track-coupling candidate/identification pair from the likelihood storage 34. This track/identification correlation likelihood is a probability value which is stored in connection with a pair of a track number and an identification corresponding to the current track per each tack-coupling candidate/identification pair. Then, the track/identification correlation likelihood is integrated with the temporary identification likelihood which is calculated in step S10a per each track-coupling candidate/identification pair (step S10b). This integration method has been already described; hence, the description thereof will be omitted. The integration result is used as an identification likelihood per each track-coupling candidate/identification pair.

In step S10b, the identification likelihood calculation part 332b multiplies and normalizes identification likelihoods of track-coupling candidate/identification pairs, thus calculating an identification likelihood representing the entirety of a hypothesis. This calculation process of Embodiment 3 is identical to that of Embodiment 1.

Next, the identification likelihood calculation part 332 integrates a track-coupling likelihood per each track-coupling candidate/identification pair, calculated in step S9, and an identification likelihood of a hypothesis calculated in step S10b (step S11). This integration method of Embodiment 3 is identical to that of Embodiment 1. As described in Embodiment 1, it is possible to multiply track-coupling likelihoods of track-coupling candidate/identification pairs ascribed to a hypothesis in step S9, whereby the multiplication result can be integrated with identification likelihoods in step S11.

In step S11, the identification likelihood calculation part 332b stores combinations of hypotheses and integration results of likelihoods.

After step S11, the likelihood calculation part 33b repeatedly executes steps S8 to S11. Upon determining nonexistence of hypotheses with uncalculated likelihoods in step S8 (i.e. a decision result "No" of step S8), the identification likelihood calculation part 332b stores a track/identification correlation likelihood, reflecting the current result of the likelihood calculation process (a loop consisting of steps S8 to S11) based on all the track-coupling candidate/identification pairs of hypotheses, in the likelihood storage 34 (step S11b). The identification likelihood calculation part 332b stores an identification likelihood of a track-coupling candidate/identification pair in the likelihood storage 34 as an identification correlation probability in connection with a combination of an identification of the track-coupling candidate/identification pair and the current track of the track-coupling candidate. However, it is necessary to consider the situation in which the track-coupling candidate/identification pair possessing a combination of the current track and its identification is included in a plurality of hypotheses in common. Suppose the situation in which a hypothesis includes {(track 1, track 4), ID1}; another hypothesis includes {(track 2, track 4), ID1}; and a further hypothesis includes {(track 3, track 4), ID1}, wherein track 4 indicates the current track. All the three track-coupling candidate/identification pairs include a combination "track 4, ID1" consisting of the current track and its identification. When a plurality of track-coupling candidate/ identification pairs commonly possessing a combination of the current track and its identification exists, it is possible to add identification likelihoods, which are calculated with respect to a plurality of track-coupling candidate/identification pairs, so that the addition result is stored as a track/identification correlation likelihood regarding a combination of the current track and its identification.

Moreover, the identification likelihood calculation part 332b normalizes track/identification correlation likelihoods such that the sum of track/identification correlation likelihoods per each track becomes equal to "1", so that the normalization result is stored in the likelihood storage 34. With respect to two identifications ID1, ID2, for example, X represents an identification likelihood regarding a combination of track 4 and ID1 while Y represents an identification likelihood regarding a combination of track 4 and ID2. Herein, X, Y are not directly regarded as track/identification correlation likelihoods, but X, Y are normalized such that the sum of a track/identification correlation likelihood regarding a combination of track 4 and ID1 and a track/identification correlation likelihood regarding a combination of track 4 and ID2 becomes equal to "1". Herein, the identification likelihood calculation part 332b performs the following calculation using x, y representing normalized track/identification correlation likelihoods.

$$x = \frac{X \times 1}{X+Y}$$
$$y = \frac{Y \times 1}{X+Y}$$

[Equation 3]

That is, the identification likelihood calculation part 332b performs normalization by individually multiplying identification likelihoods X, Y, prior to normalization, by the reciprocal of its sum "1/(X+Y)".

In step S11b, it is possible to solely perform a process of storing track/identification correlation likelihoods in the likelihood storage 34. Alternatively, it is possible to perform a process of storing track/identification correlation likelihoods in the likelihood storage 34 while performing a process of deleting track/identification correlation likelihoods, irrelevant to the current track of a track-coupling candidate of a track-coupling candidate/identification pair, from track/identification correlation likelihoods stored in the likelihood storage 34.

Track/identification correlation likelihoods stored in the likelihood storage 34 in step S11b are used for execution of a loop consisting of steps S8 to S11.

After step S11b, the identification likelihood calculation part 332b estimates a most-probable hypothesis with the highest integration value of likelihoods calculated in step S11, thus sending it to the identification result output device 4 (step S12). The identification result output device 4 determines and presents which mobile body matches which track (step S13). The steps S12, S13 of Embodiment 3 are identical to those of Embodiment 1.

Figure 23:
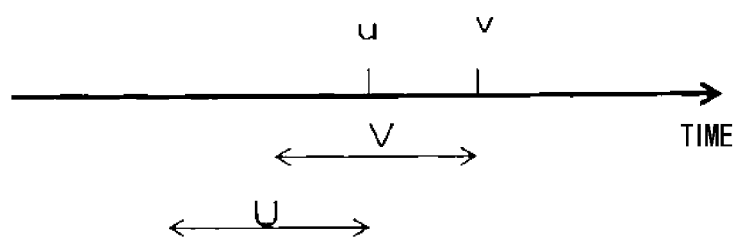
FIG. 23 An illustration explaining an effect of likelihood integration in Embodiment 3.

Embodiment 3 is able to demonstrate the same effect as Embodiment 1. Additionally, Embodiment 3 is designed to calculate likelihoods in consideration of not only the information detected in a predetermined time in the past from the current time but also the information detected in its previous time; hence, it is possible to estimate the correlation between tracks and identifications with a high precision. FIG. 23 is a schematic illustration of the effect of Embodiment 3. Herein, a process for calculating likelihoods per each hypothesis at time u (i.e. a loop consisting of steps S8 to S11) is performed using data collected in a time range U which is a predetermined time in the past from time u. A track/identification correlation likelihood, which is determined by executing a loop consisting of steps S8 to S11 per each hypothesis, reflects data collected in the time range U (strictly speaking, its previous time). A process for calculating likelihoods per each hypothesis at time v is performed using data collected in a time range V which is a predetermined time in the past from time v. Additionally, the integration result of likelihoods in step S11 is calculated incorporating the track/identification correlation likelihood calculated at time u. The integration result of likelihoods reflects not only the date of the time range V but also the data of its previous time range U. Since Embodiment 3 calculates likelihoods per each hypothesis by incorporating the previous information in the past, it is possible to determine the correlation between track and identifications with a higher precision.

Embodiment 4

Figure 24:
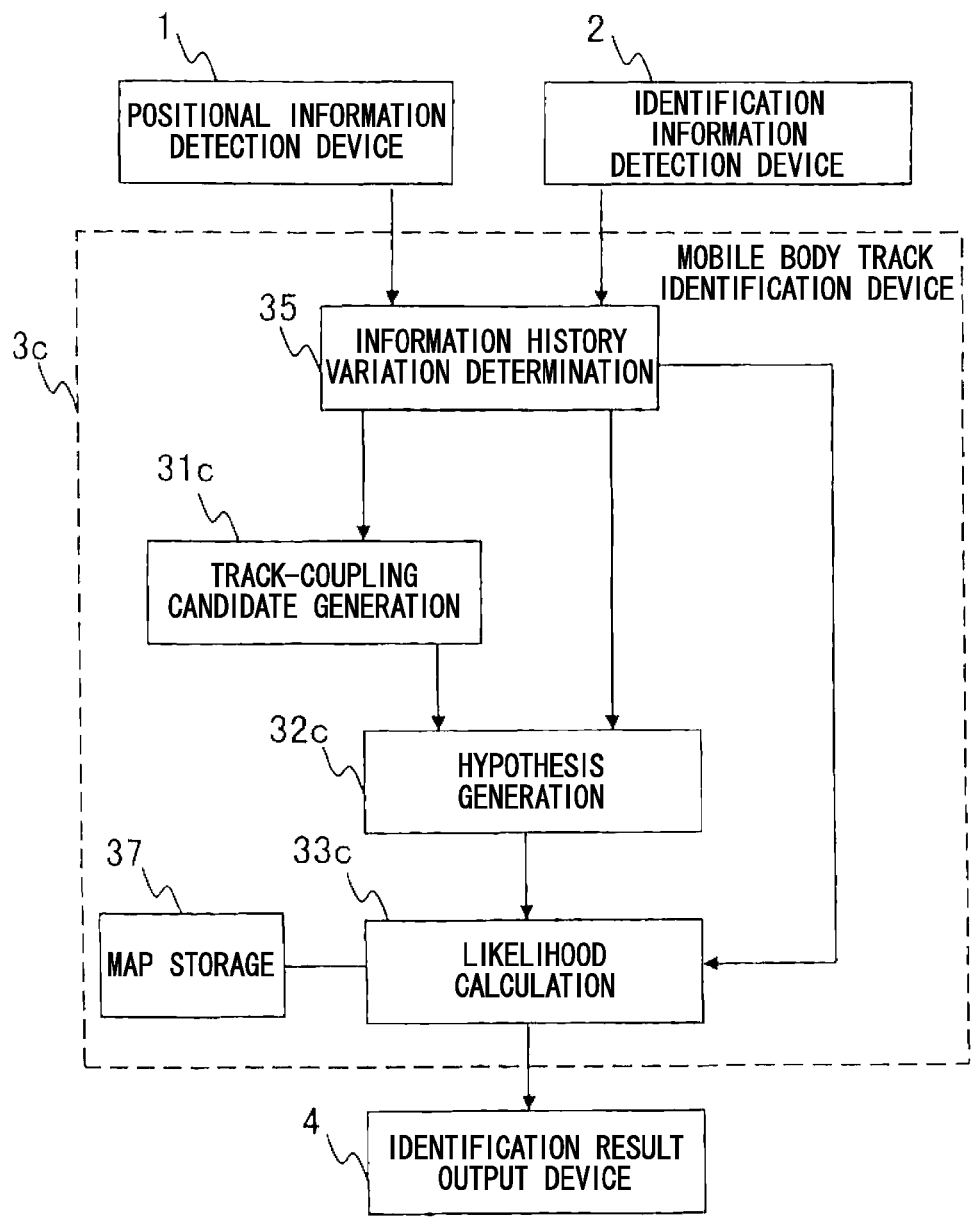
FIG. 24 A block diagram showing the constitution of a mobile body track identification device in a mobile body track identification system according to Embodiment 4 of the present invention.

FIG. 24 is a block diagram of a mobile body track identification system according to Embodiment 4 of the present invention. Herein, the same constituent elements as the constituent elements of Embodiment 1 are designated by the same reference numerals; hence, descriptions thereof will be omitted. The mobile body track identification system of Embodiment 4 includes the positional information detection device 1, the identification detection information 2, a mobile body track identification device 3, an information history variation determination part 35, a track-coupling candidate generation part 31c, a hypothesis generation part 32c, a likelihood calculation part 33c, and the map storage 37.

The information history variation determination part 35 retrieves combinations of track numbers, detection times, and positional coordinates from the positional information detection device 1 while retrieving combinations of detection times, identifications, and identification detection device numbers from the identification information detection device 2. The information history variation determination part 35 holds positional coordinates, detection times, and track numbers, which are collected in a predetermined time in the past from the current time, from the positional information detection device 1. Additionally, the information history variation determination part 35 holds the correlation between identifications, detection times, and identification detection device numbers, which are collected in a predetermined time in the past from the current time, from the identification information detection device 2. At this time, they are held in a table form shown in FIG. 10.

As described above, the information history variation determination part 35 selectively holds data, ascribed to the predetermined time in the past, from among positional information and identifications retrieved from the positional information detection device 1 and the identification information detection device 2, wherein it deletes the oldest positional information/identification upon receiving the positional information identification at the current time, thus updating its information held therein. Upon receiving the current positional information, its detection time, and its track number from the positional information detection device 1, for example, it stores them while deleting the positional information at the oldest time. Similarly, upon receiving the current identification, its detection time, and its identification detection device number from the identification information detection device 2, it additionally registers them in the table of FIG. 10 while deleting the identification at the oldest time from the table. The updating process of the information history variation determination part 35 is identical to steps S1, S2 of the track-coupling candidate generation part 31 and steps S4, S5 of the hypothesis generation part 32.

The information history variation determination part 35 sends positional information/identification held therein to the likelihood calculation part 33c. That is, the likelihood calculation part 33c receives a combination of positional coordinates, its track number, and its detection time as well as the table content of FIG. 10 (i.e. updated identifications).

Upon updating using newly retrieved positional information/identification from the positional information detection device 1 and the identification information detection device 2, the information history variation determination part 35 makes a decision as to whether or not any variation occurs in the track number and the identification before and after updating. When no variation occurs in both the track number and the identification, it can be said that the same hypotheses may be repeatedly generated irrespective of reproduction of hypotheses. In this case, the information history variation determination part 35 instructs the likelihood calculation part 33c to estimate a most-probable hypothesis based on hypotheses which are used in previous calculation of likelihoods. In this case, no information is supplied to the track-coupling candidate generation part 31c and the hypothesis generation part 32c.

In this connection, the same most-probable hypothesis as the previous one should be unnecessarily estimated using the same hypotheses as previous ones due to the occurrence of variations in positional coordinates after updating or due to a change of the identification detection device number correlated to identifications.

Additionally, hypotheses themselves are changed due to variations of track numbers or identifications. In an event of adding or discarding track numbers, for example, track-coupling candidates are changed so that generated hypotheses may be changed as well. This can be similarly applied to another event of adding or discarding identifications. Due to variations of track numbers or identifications, the information history variation determination part 35 of Embodiment 4 provides the track-coupling candidate generation part 31c with combinations of positional coordinates, detection times, and track numbers after updating while providing the hypothesis generation part 32c with the table content representing the correlation between identifications, detection times, and information detection device numbers.

The track-coupling candidate generation part 31c generates track-coupling candidates based on positional information and identifications supplied from the information history variation determination part 35. To generate track-coupling candidates including positional coordinates of different tracks which are detected at the same time, the track-coupling candidate generation part 31c calculates positional coordinates of a median point as well. Subsequently, the track-coupling candidate generation part 31c sends track-coupling candidates to the hypothesis generation part 32c. Upon calculating positional coordinates of a median point, the calculated positional coordinates are sent to the hypothesis generation part 32c. The foregoing process of Embodiment 4 is identical to that of the track-coupling candidate generation part 31 of Embodiment 1.

The hypothesis generation part 32c generates and sends all the hypotheses to the likelihood calculation part 33c based on track-coupling candidates received from the track-coupling candidate generation part 31c and the updated table content received from the information history variation determination part 35.

In this connection, the track-coupling candidate generation part 31c and the hypothesis generation part 32c of Embodiment 4 differ from the track-coupling candidate generation part 31 and the hypothesis generation part 32 in that they do not perform updating to hold positional information and identifications collected in a predetermined time in the past.

Upon receiving an instruction to estimate a most-probable hypothesis based on hypotheses which are used in previous calculation of likelihoods from the information history variation determination part 35, the likelihood calculation part 33c calculates track-coupling likelihoods and identification likelihoods with respect to those hypotheses, thus calculating their integration value. The likelihood calculation part 33c estimates a hypothesis with the highest integration value of track-coupling likelihoods and identification likelihoods as a most-probable hypothesis, thus sending it to the identification result output device 4.

Upon receiving hypotheses from the hypothesis generation part 32c, the likelihood calculation part 33c calculates track-coupling likelihoods and identification likelihoods with respect to those hypotheses, thus calculating their integration value. The likelihood calculation part 33c estimates a hypothesis with the highest integration value of track-coupling likelihoods and integration likelihoods as a most-probable hypothesis, thus sending it to the identification result output device 4.

The likelihood calculation part 33c receives combinations of detection times, positional coordinates, and track numbers as well as the updated table content (see FIG. 10) from the information history variation determination part 35. To calculate track-coupling likelihoods and identification likelihoods, the likelihood calculation part 33c utilizes the information updated by the information history variation determination part 35.

Figure 25:
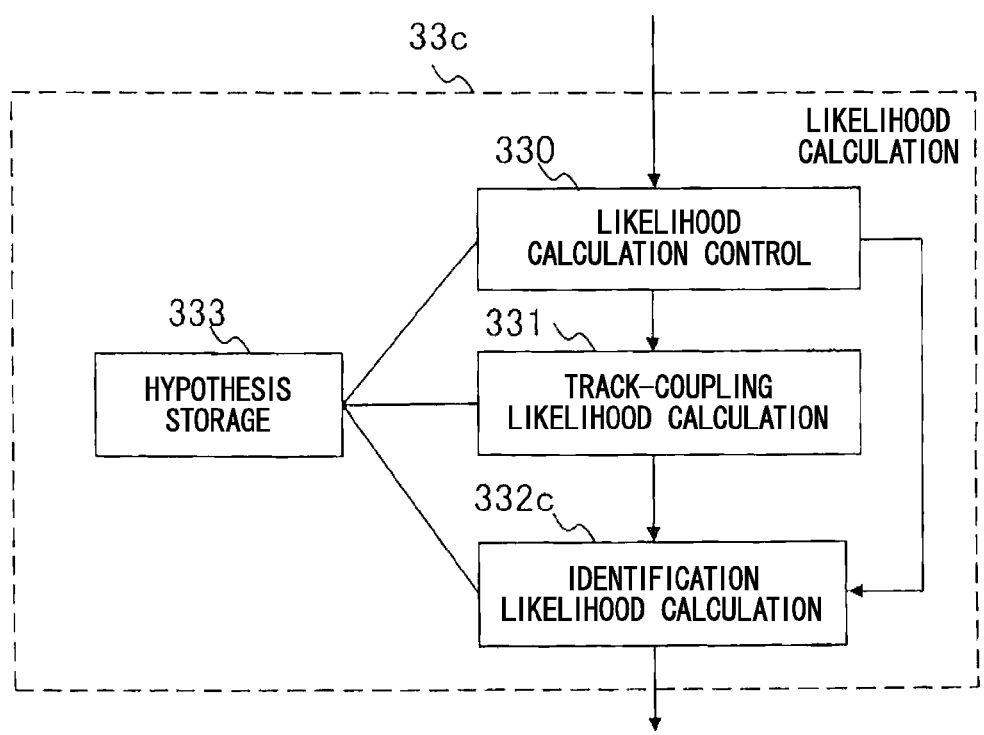
FIG. 25 A block diagram showing the constitution of a likelihood calculation part of the mobile body track identification device.

FIG. 25 is a block diagram showing the constitution of the likelihood calculation part 33c of Embodiment 4. The likelihood calculation part 33c includes the likelihood calculation control part 330, the track-coupling likelihood calculation part 331, an identification likelihood calculation part 332c, and a hypothesis storage 333. The hypothesis storage 333 is a memory that stores hypotheses among which the most-probable hypothesis has been already estimated.

The likelihood calculation control part 330, the track-coupling likelihood calculation part 331, and the identification likelihood calculation part 332c of Embodiment 4 perform the same processes as those of the likelihood calculation control part 330, the track-coupling likelihood calculation part 331, and the identification likelihood calculation part 332 of Embodiment 1. When the information history variation determination part 35 issues an instruction to estimate a most-probable hypothesis among previous hypotheses, the likelihood calculation control part 330, the track-coupling likelihood calculation part 331, and the identification likelihood calculation part 332c refer to hypotheses stored in the hypothesis storage 333 for use in their processing. On the other hand, upon receiving hypotheses from the hypothesis generation part 32c, they refer to the received hypotheses for use in their processing.

Upon receiving an instruction to estimate a most-probable hypothesis based on previous hypotheses in which track-coupling candidates include different positional coordinates, which are detected at the same time but whose median point has not been calculated yet, the identification likelihood calculation part 332c calculates coordinates of a median point.

The information history variation determination part 35, the track-coupling candidate generation part 31c, the hypothesis generation part 32c, and the likelihood calculation part 33c (including the likelihood calculation control part 330, the track-coupling likelihood calculation part 331, the identification likelihood calculation part 332c, and the hypothesis storage 333) can be realized by way of a CPU of a computer which operates according to a mobile body track identification program. In this case, a program memory of a computer (not shown) stores a mobile body track identification program so that the CPU loads the program to thereby realize the functions of the information history variation determination part 35, the track-coupling candidate generation part 31c, the hypothesis generation part 32c, and the likelihood calculation part 33c. Alternatively, it is possible to configure the information history variation determination part 35, the track-coupling candidate generation part 31c, the hypothesis generation part 32c, and the likelihood calculation part 33c by use of individual hardware elements. Similarly, it is possible to configure the likelihood calculation control part 330, the track-coupling likelihood calculation part 331, the identification likelihood calculation part 332c, and the hypothesis storage 333 by use of individual hardware elements. In this connection, it is possible to arrange the hypothesis storage 333 outside the likelihood calculation part 33c.

Next, the operation of the mobile body track identification device 3c of Embodiment 4 will be described.

Figure 26:
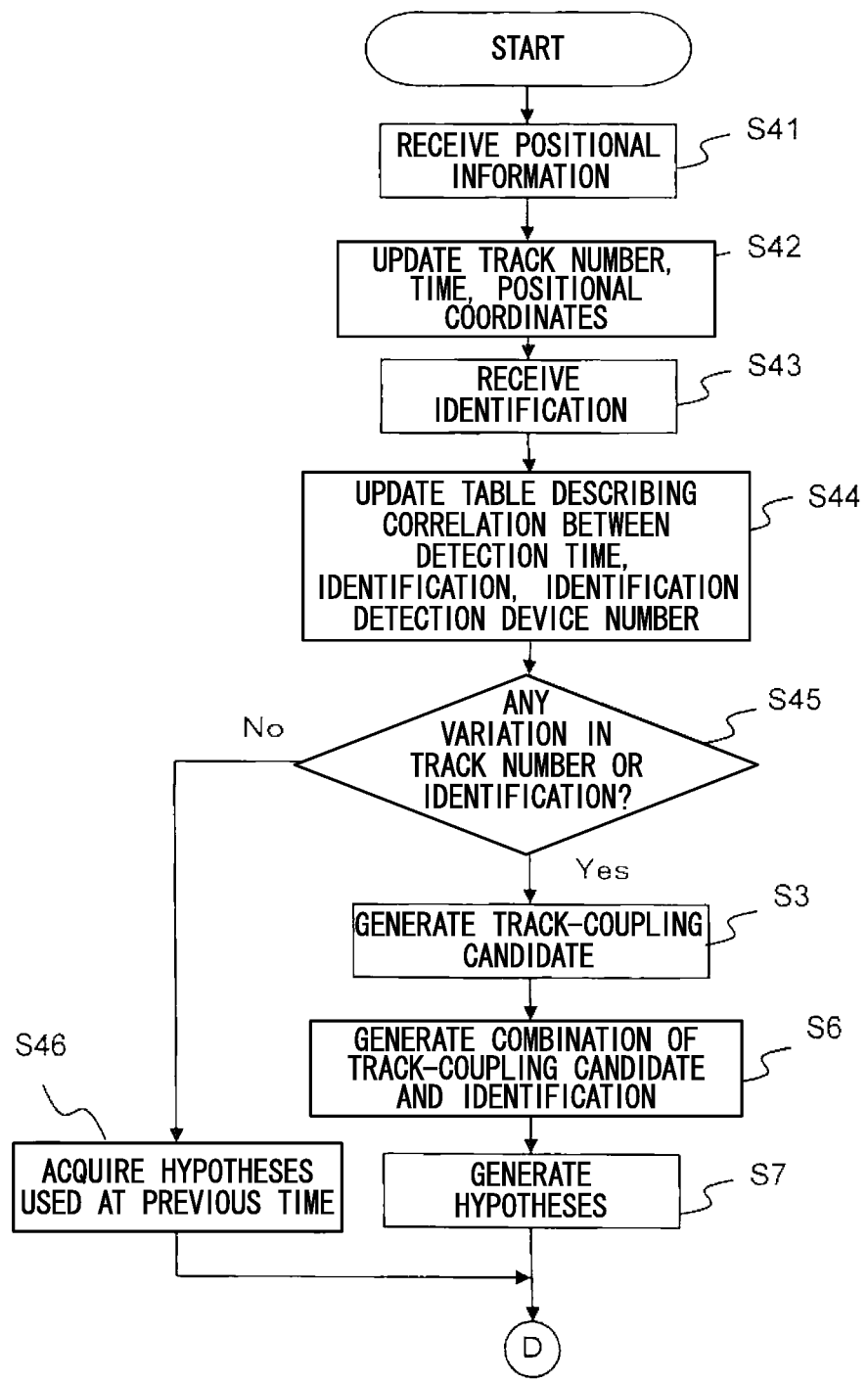
FIG. 26 A flowchart showing the operation of the mobile body track identification device according to Embodiment 4.
Figure 27:
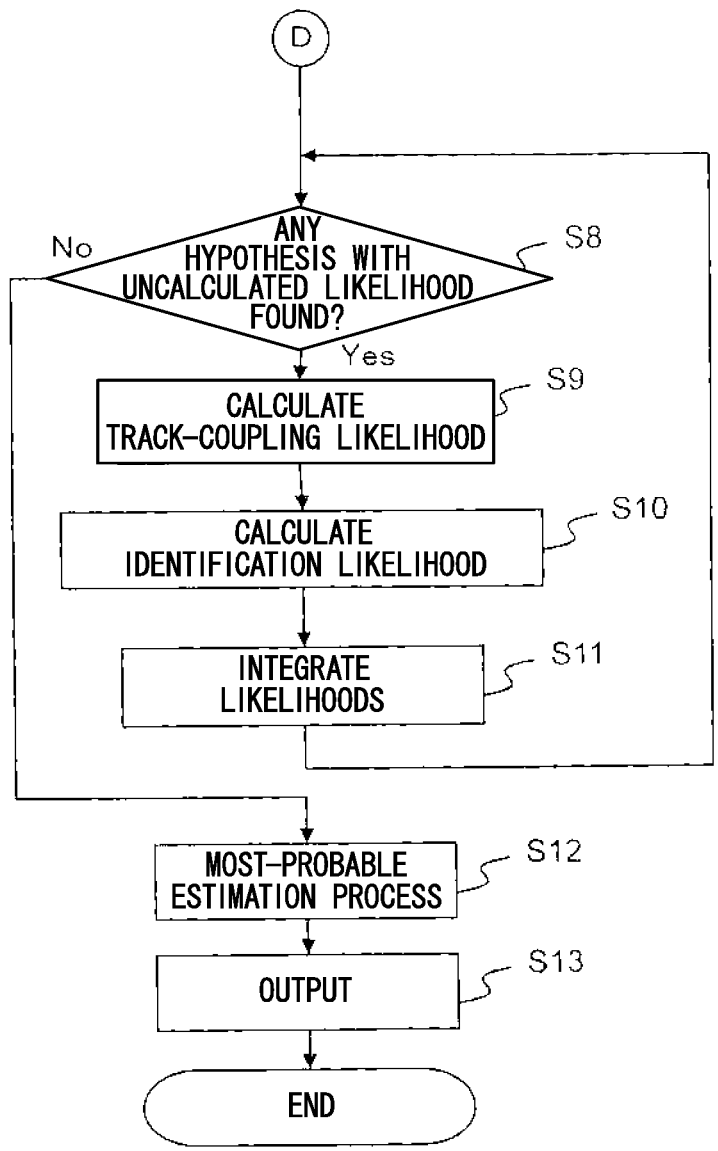
FIG. 27 A flowchart showing the operation of the mobile body track identification device according to Embodiment 4.

FIGS. 26 and 27 are flowcharts showing the processing of the mobile body track identification device 3c. Herein, the same steps as those of Embodiment 1 (see FIGS. 4 and 5) are designated by the same reference numerals; hence, descriptions thereof will be omitted.

The information history variation determination part 35 retrieves combinations of track numbers, detection times, and positional information from the positional information detection device 1 (step S41). The information history variation determination part 35 receives and additionally stores the current combination of positional information, its detection time, and its track number while deleting the oldest positional information, thus updating a positional information history (step S42). The steps S41, S42 of Embodiment 4 are identical to steps S1, S2 of Embodiment 1. In Embodiment 4, however, the information history variation determination part 35 sends combinations of positional information, detection times, and track numbers, which are updated in step S42, to the likelihood calculation part 33c.

The information history variation determination part 35 retrieves combinations of identification detecting times, identifications, and identification detection device numbers from the identification information detection device 2 (step S43). Upon receiving the current combination of a detection time, an identification, and an identification detection device number, the information history variation determination part 35 additionally registers it with the table of FIG. 10 while deleting the oldest identification (step S44). The steps S43, S44 of Embodiment 4 are identical to steps S4, S5 of Embodiment 1. However, the information history variation determination part 35 sends the table content, which is updated in step S44, to the likelihood calculation part 33c.

The information history variation determination part 35 makes a decision as to whether or not any track number is changed before and after updating in step S42 and a decision as to whether or not any identification registered with the table is changed after updating in step S44 (step S45). Herein, variations of track numbers/identifications occur due to addition or discarding of track numbers/identifications.

In step S45 when at least one of track numbers and identifications is changed (i.e. a decision result "Yes"), the information history variation determination part 35 sends updated combinations of positional information, detection times, and track numbers to the track-coupling candidate generation part 31c while sending the updated table content (representing the relationship between detection times, identifications, and identification detection device numbers) to the hypothesis generation part 32c.

The track-coupling candidate generation part 31c generates all the track-coupling candidates based on combinations of positional information, detection times, and track numbers, thus sending them to the hypothesis generation part 32c (step S3). With respect to track-coupling candidates including positional coordinates of different tracks which are detected at the same time, the track-coupling candidate generation part 31c calculates coordinates of a median point so as to send them to the likelihood calculation part 33c.

The hypothesis generation part 32c generates all combinations of track-coupling candidate/identification pairs by use of identifications stored in the updated table received from the information history variation determination part 35 and track-coupling candidates received from the track-coupling candidate generation part 31c in step S3 (step S6). Next, the hypothesis generation part 32c generates all the hypotheses satisfying the first to third conditions described in Embodiment 1 (step S7). The hypothesis generation part 32c sends hypotheses, generated in step S7, to the likelihood calculation part 33c. The steps S3, S6, and S7 of Embodiment 4 are identical to those of Embodiment 1.

When the hypothesis generation part 32c generates hypotheses, the likelihood calculation part 33c retrieves those hypotheses for use in its processing so as to perform a series of steps S8 to S12 identical to those of Embodiment 1. Specifically, the likelihood calculation control part 330 makes a decision as to whether or not any hypothesis with uncalculated likelihoods exists in hypotheses received in step S7 (step S8). When hypotheses with uncalculated likelihoods exist (i.e. a decision result "Yes" of step S8), the likelihood calculation control part 330 selectively sends one of hypotheses with uncalculated likelihoods to the track-coupling likelihood calculation part 331 and the identification likelihood calculation part 332c.

The track-coupling likelihood calculation part 331 calculates a tack-coupling likelihood per each track-coupling candidate/identification pair ascribed to the received hypothesis (step S9). Herein, positional coordinates and its detection time used for track-coupling likelihood calculation has been provided by the information history variation determination part 35 as an updated combination of positional coordinates, its detection time, and its track number.

The identification likelihood calculation part 332c calculates an identification likelihood with respect to the received hypothesis (step S10). Herein, positional coordinates and its detection time has been provided by the information history variation determination part 35. Additionally, the updated table content representing the correlation between an identification, its detection time, and its identification detection device number has been provided by the information history variation determination part 35. Therefore, the identification likelihood calculation part 332c of Embodiment 4 uses the positional information and identification to calculate an identification likelihood of a hypothesis as similar to Embodiment 1.

Next, the identification likelihood calculation part 332c integrates a track-coupling likelihood of a hypothesis, calculated in step S9, and an identification likelihood of the hypothesis, calculated in step S10, so as to store the correlation between the integration result and the hypothesis (step S11). After step S11, a loop consisting of steps S8 to S11 is repeated.

When hypotheses with uncalculated likelihoods disappear, the identification likelihood calculation part 332c estimates a hypothesis with the highest integration value of a track-coupling likelihood and an identification likelihood, calculated in step S11, as a most-probable hypothesis, thus sending it to the identification result output device 4 (step S12). Herein, the identification likelihood calculation part 332c of Embodiment 4 stores all the hypotheses, correlated to integration results of track-coupling likelihoods and identification likelihoods, (i.e. hypotheses generated by the hypothesis generation part 32c) in the hypothesis storage 333, thus updating the stored content.

When no change occurs in any of track numbers and identifications in step S45 (i.e. a decision result "No"), the information history variation determination part 35 instructs the likelihood calculation part 33c to estimate a most-probable hypothesis based on hypotheses used for previous likelihood calculation (i.e. hypotheses stored in the hypothesis storage 333). In response to this instruction, the likelihood calculation control part 330 reads hypotheses stored in the hypothesis storage 333 (step S46). The likelihood calculation part 33c executes steps S8 to S12 on those hypotheses similar to Embodiment 1. First, the likelihood calculation control part 330 makes a decision as to whether or not any hypothesis with uncalculated likelihoods exists in the read hypotheses from the hypothesis storage 333 (step S8). When hypotheses with uncalculated likelihoods exist (i.e. a decision result "Yes" of step S8), the likelihood calculation control part 330 selectively sends one of those hypotheses with uncalculated likelihoods to the track-coupling likelihood calculation part 331 and the identification likelihood calculation part 332c.

The track-coupling likelihood calculation part 331 calculates a track-coupling likelihood per each track-coupling candidate/identification pair ascribed to the received hypothesis (step S9). Herein, positional coordinates and its detection time, used for calculating a track-coupling likelihood, has been provided by the information history variation determination part 35 as an updated combination of positional coordinates, its detection time, and its track number.

The identification likelihood calculation part 332c calculates an identification likelihood of the received hypothesis (step S10). As described above, the information history variation determination part 35 has provided an updated identification so that it is possible to calculate an identification likelihood of the hypothesis similar to Embodiment 1. When the newly registered detection time refers to different positional coordinates which are detected at the same time, however, coordinates of a median point has not be calculated yet; hence, the identification likelihood calculation part 332c calculates positional coordinates of a median point so as to provide them for used in calculation of an identification likelihood.

Next, the identification likelihood calculation part 332c integrates the track-coupling likelihood, calculated in step S9, and the identification likelihood, calculated in step S10, thus storing the integration result in connection with its hypothesis (step S11). After step S11, a loop consisting of steps S8 to S11 is repeated. When hypotheses with uncalculated likelihoods disappear, the identification likelihood calculation part 332c estimates a hypothesis with the highest integration value of the track-coupling likelihood and the identification likelihood, calculated in step S11, as a most-probable hypothesis, thus sending it to the identification result output device 4 (step S12). These steps S11, S12 are identical to the foregoing steps in which the hypothesis generation part 32c generates new hypotheses. When hypotheses stored in the hypothesis storage 33 are used for processing, the identification likelihood calculation part 332c does not update the stored content of the hypothesis storage 333.

The identification result output device 4 determines and presents which mobile body corresponds to which track based on track-coupling candidate/identification pairs ascribed to the most-probable hypothesis estimated in step S12 (step S13). At this time, the identification result output device 4 may specifically display the position or track of a mobile body. The step S13 of Embodiment 4 is identical to that of Embodiment 1.

Embodiment 4 estimates a most-probable hypothesis based on hypotheses used for previous calculation of likelihoods when no changes occur in track numbers and identifications irrespective of variations of positional coordinates and variations of detection times of positional coordinates/identifications. When no changes occur in track numbers and identifications, the same track-coupling candidates and hypotheses as those provided by previous calculation are calculated. This eliminates a repetitive process for repetitively generating the same hypotheses by the hypothesis generation part 32c, thus reducing the amount of calculation in determining the correlation between tracks and identifications.

In Embodiment 4, it is possible for the mobile body track identification device 3c to start step S41 and its following steps upon a trigger of an external instruction without using a trigger input from the positional information detection device 1 or the identification information detection device 2. In this case, information is not updated in steps S42, S44 without a new input from the positional information detection device 1 and the identification information detection device 2 after previous estimation of a most-probable hypothesis. For this reason, no changes occur in track numbers and identifications (i.e. a decision result "No" of step S45). This allows the flow to proceed to step S46, whereas if no input comes from the positional information detection device 1 and the identification information detection device 2 after previous estimation of a most-probable hypothesis, the same most-probable hypothesis will be estimated. Therefore, when the mobile body track identification device 3c receives a processing start instruction without an input from the positional information detection device 1 and the identification information detection device 2 after previous estimation of a most-probable hypothesis, the mobile body track identification device 3c may directly send the previously estimated most-probable hypothesis to the identification result output device 4.

Similar to the foregoing variation of Embodiment 1, it is possible for the likelihood calculation parts 33b and 33c of Embodiments 3 and 4 not to adopt the track-coupling likelihood calculation part 331, thus precluding calculation of track-coupling likelihoods. In this case, the identification likelihood calculation parts 332b, 332c do not necessarily integrate track-coupling likelihoods and identification likelihoods, thus estimating hypotheses with maximum identification likelihoods as most-probable hypotheses.

In Embodiment 4, when the likelihood calculation part 33c precludes the track-coupling likelihood calculation part 331 so as not to calculate track-coupling likelihoods, the information history variation determination part 35 makes a decision as to whether or not any change occurs in identifications in step S45. The flow proceeds to step S3 when any change occurs (a decision result "Yes" of step S45), whilst the flow proceeds to step S46 when any change does not occur (a decision result "No" of step S45).

It is possible for the likelihood calculation parts 33b, 33c of Embodiments 3, 4 to preclude the track-coupling likelihood calculation part 331, wherein it is possible for the mobile body track identification devices 3b, 3c to include the track-coupling likelihood calculation part 331a similar to Embodiment 2. In this case, the identification likelihood calculation parts 332b, 332c estimate hypotheses with the highest identification likelihoods as most-probable hypotheses. This constitution demonstrates the same effect as Embodiment 2. Moreover, it is possible to combine Embodiments 3 and 4 together.

Embodiment 5

Figure 28:
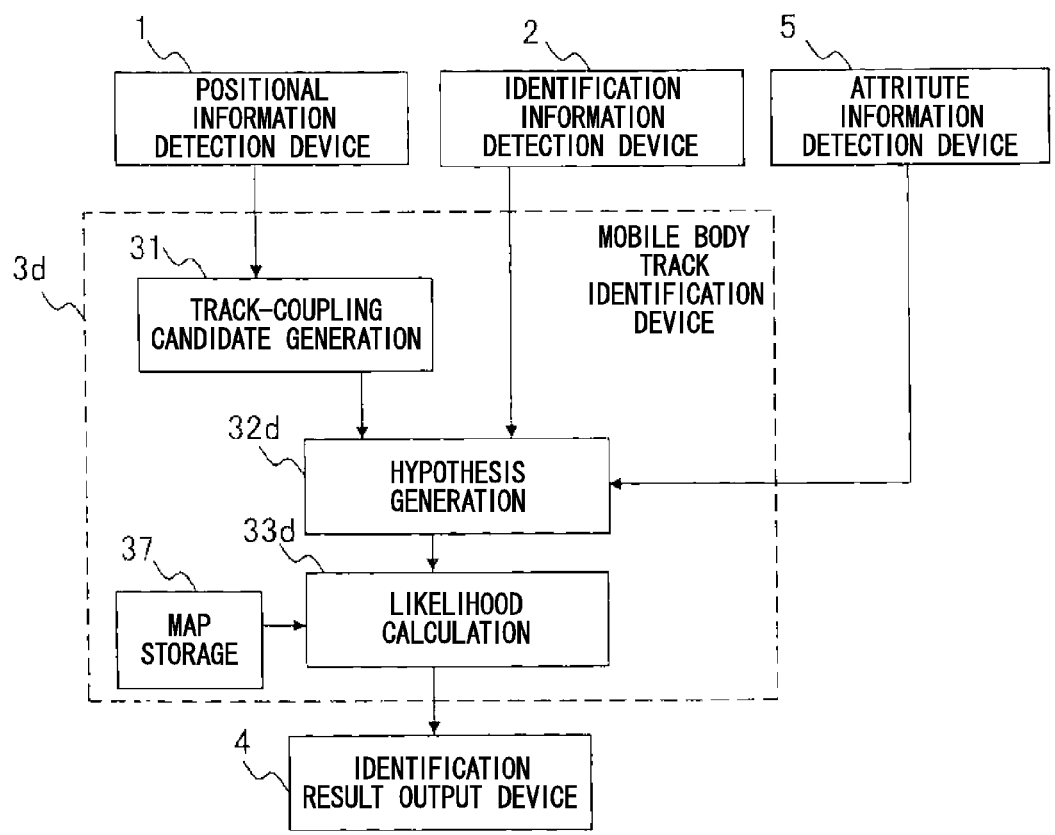
FIG. 28 A block diagram showing the constitution of a mobile body track identification device in a mobile body track identification system according to Embodiment 5 of the present invention.

FIG. 28 is a block diagram of a mobile body track identification system according to Embodiment 5 of the present invention. Herein, the same constituent elements as the constituent elements of Embodiment 1 are designated by the same reference numerals; hence, descriptions thereof will be omitted. The mobile body track identification system of Embodiment 5 includes the positional information detection device 1, the identification information detection device 2, a mobile body track identification device 3d, the identification result output device 4, and an attribute detection device 5. The mobile body track identification device 3d includes a track-coupling candidate generation part 31, a hypothesis generation part 32d, a likelihood calculation part 33d, and the map storage 37.

The mobile body track identification system of Embodiment 5 does not necessarily include a single attribute detection device 5; hence, it is possible to include a plurality of attribute detection devices 5. Herein, an attribute detection device ID is allocated to the attribute detection device 5 in order to univocally specify it in advance. Embodiment 5 adopts a number as an attribute detection device ID, which will be referred to as an attribute detection device number.

The attribute detection device 5 detects an attribute of a mobile body in the tracking area 50 (see FIG. 1). The attribute represents an attribute or a feature of a mobile body, for example, wherein it is possible to use the color, size, weight, and temperature of a mobile body. With respect to a mobile body representing a person, it is possible to use the sex and age of the person as his/her attribute. The attribute may represents an attribute of a mobile body such as information (e.g. color, shape, etc.) which can be discriminated from an image produced by shooting a mobile body. Alternatively, it is possible to use information (e.g. weight, etc.) which can be detected using a sensor or a measuring instrument without shooting an image of a mobile body.

The attribute detection device 5 can be realized using a device which is able to detect an attribute of a mobile body in the tracking area 50 so as to specify its detection time and positional coordinates. For instance, it is possible to realize the attribute detection device 5 by use of a camera, a pressure sensor, a temperature sensor, and a thermography.

A plurality of attribute detection devices 5 can be arranged in such a way that their detection areas overlap with each other. Alternatively, they can be arranged in such a way that their detection areas do not overlap with each other. Moreover, it is possible to simultaneously use a plurality of attribute detection devices 5 ascribed to different types.

The attribute detection device 5 may not always detect an attribute of a mobile body which actually exists; hence, a decision as to whether or not an attribute is detected depends on the installed condition of the attribute detection device 5. When the attribute detection device 5 is arranged in the tracking area 50, for example, the attribute detection device 5 may easily detect the attribute of a mobile body which exists close to it, whilst the attribute detection device 5 may hardly detect the attribute of a mobile body which is distanced from it.

The attribute detection device 5 sends an attribute of a detected mobile body, an attribute type univocally representing the type of an attribute, an attribute detection time, positional coordinates, and an attribute detection device number to the mobile body track identification device 3d. When the attribute detection device 5 operates to detect an attribute of a mobile body but fails to do so, it may send a detection time and an attribute detection device number to the mobile body track identification device 3d together with an attribute, an attribute type, and positional coordinates, all of which are described as "null". Alternatively, the attribute detection device 5 may not necessarily send any attribute to the mobile body track identification device 3d, thus allowing the mobile body track identification device 3d to determine that no attribute is detected at that time.

When the attribute detection device 5 has a narrow detection area so that positional coordinates of the installed position thereof are deemed equivalent to positional coordinates of a mobile body at the time of detecting its attribute, the attribute detection device 5 sends positional coordinates of the installed position thereof to the mobile body track identification device 3d as positional coordinates of a mobile body. A pressure sensor may exemplify the attribute detection device 5. In this case, the attribute detection device 5 needs to hold positional coordinates of its own installed position in the tracking area 50 in advance.

When the attribute detection device 5 discriminates an attribute from an image which is shot using a camera or the like so that the scope of a shot image is broad, the installed position thereof does not necessarily match with the position of a mobile body at the time of shooting its image and extracting its attribute. In this case, the attribute detection device 5 stores a conversion table for converting an arbitrary position of a shot image into positional coordinates of the tracking area 50 in advance, whereby the position of a mobile body in the shot image is converted into positional coordinates in the tracking area 50 with reference to the conversion table. It is possible to preset a conversion equation, instead of the conversion table, for converting arbitrary positional coordinates in a shot image into positional coordinates in the tracking area 50, whereby the position of a mobile body in the shot image is put into the conversion equation and converted into positional coordinates in the tracking area 50.

As described above, positional coordinates of a mobile body at the time of detecting its attribute can be calculated by way of a method suited to the type of the attribute detection device 5 (i.e. the attribute type).

It is necessary to establish synchronization between positional information of the positional information detection device 1, an identification of the identification information detection device 2, and an attribute of the attribute detection device 5. In other words, the positional information detection device 1 detects positional information of a mobile body; the identification information detection device 2 detects its identification; and the attribute detection device 5 detects its attribute at the same time. When the positional information detection device 1, the identification information detection device 2, and the attribute detection device 5 detect positional information, its identification, and its attribute in an asynchronous manner, the mobile body track identification device 3d may save the positional information, identification, and attribute for a predetermined time in a buffer, so that the positional information, identification, and attribute accumulated in the buffer are read out every predetermined time. Alternatively, when no timing synchronization is established between the positional information detection device 1, the identification information detection device 2, and the attribute detection device 5, it is possible to apply the same detection time to the positional information, its identification, and its attribute, which the mobile body track identification device 3*d* receives simultaneously.

Similar to Embodiment 1, the hypothesis generation part 32*d* of Embodiment 5 receives track-coupling candidates from the track-coupling candidate generation part 31 while receiving identifications from the identification information detection device 2. Additionally, the hypothesis generation part 32*d* receives attributes, attribute types, detection times, positional coordinates, and attribute detection device numbers from the attribute detection device 5, thus holding their correlations.

The hypothesis generation part 32*d* generates all the hypotheses based on track-coupling candidates of the track-coupling candidate generation part 31, identifications of the identification information detection device 2, and attributes of the attribute detection device 5, thus sending those hypotheses to the likelihood calculation part 33*d*.

Next, a hypothesis generating procedure of Embodiment 5 will be described in detail. First, the hypothesis generation part 32*d* generates combinations of track-coupling candidates and attributes by use of track-coupling candidates received from the track-coupling candidate generation part 31, and attributes which the attribute detection device 5 detects in a time range from a predetermined time in the past to the current time. Hereinafter, those combinations will be referred to as attribute-attached track-coupling candidates.

The hypothesis generation part 32*d* selects track-coupling candidates, correlated to attributes, in accordance with the following procedure, thus generating attribute-attached track-coupling candidates. The hypothesis generation part 32*d* selects one of attributes received from the attribute detection device 5 so as to calculate a euclidean distance between positional coordinates regarding the selected attribute and positional coordinates of a track-coupling candidate at its detection time with respect to all the combinations of track-coupling candidates combined with the selected attribute. The hypothesis generation part 32*d* specify a combination with the shortest euclidean distance among combinations of track-coupling candidates and attributes so as to store the correlation between the track-coupling candidate and the attribute ascribed to the specified combination. This process is performed once with respect to all the received attributes. When a track-coupling candidate includes interruption between tracks so that positional coordinates at the detection time of the selected attribute cannot be directly obtained from the track-coupling candidate, the hypothesis generation part 32*d* performs interpolation between interrupted tracks, based on positional coordinates of disappearance and its disappearance time and positional coordinates of appearance and its appearance time which are included in the track-coupling candidate, so as to calculate positional coordinates at the attribute detection time, thus calculating a euclidean distance with positional coordinates of the attribute. When a track-coupling candidate includes a plurality of tracks which are detected at the attribute detection time and a plurality of positional coordinates of a mobile body at the attribute detection time, it is necessary to calculate a euclidean distance between a median point and positional coordinates of the attribute.

The result of the foregoing process may allow for existence of any track-coupling candidate correlated with no attribute. Of course, it may allow for existence of any track-coupling candidate correlated with a plurality of attributes. Suppose an example in which the track-coupling candidate generation part 31 generates track-coupling candidates T1, T2, ..., Tn while the attribute detection device 5 detects attributes A1, A2, ..., Am. Herein, nonexistence of any attribute correlated to each track-coupling candidate can be represented using a character string "no attribute". In this case, for example, the hypothesis generation part 32*d* generates combinations of (T1, A1), (T2, A2), ..., (Tn, Am) or combinations of (T1, no attribute), (T2, T1), (T3, A2, A3), ..., (Tn, Am-2, Am-1, Am), which are stored as attribute-attached track-coupling candidates.

The hypothesis generation part 32*d* may generate attribute-attached track-coupling candidates such that in such a way that all the received attributes are each certainly correlated to any one of track-coupling candidates. With respect to a track-coupling candidate having the shortest euclidean distance, with positional coordinates regarding a certain attribute, which exceeds a predetermined threshold, the hypothesis generation part 32*d* may determine that none of track-coupling candidates is correlated to the attribute.

The hypothesis generation part 32*d* generates all the combinations of attribute-attached track-coupling candidates and identifications by use of attribute-attached track-coupling candidates, which are produced according to the foregoing procedure, and identifications which are detected by the identification information detection device 2 in a time range from a predetermined time in the past to the current time. The hypothesis generation part 32*d* may focus on attribute-attached track-coupling candidates so as to recognize them as simple track-coupling candidates, so that the hypothesis generation part 32*d* generates all the combinations of attribute-attached track-coupling candidates and identifications in accordance with the foregoing method of Embodiment 1 for generating track-coupling candidate/identification pairs. Hereinafter, they will be referred to as attribute-attached track-coupling candidate/identification pairs.

Similar to Embodiment 1, the hypothesis generation part 32*d* of Embodiment 5 extracts all the sets of attribute-attached track-coupling candidate/identification pairs, thus determining individual sets as hypotheses.

The likelihood calculation part 33*d* calculates and integrates a track-coupling likelihood, an identification likelihood, and an attribute likelihood per each of hypotheses generated by the hypothesis generation part 32*d*. Subsequently, it estimates a hypothesis with the highest integration value of the track-coupling likelihood, the identification likelihood, and the attribute likelihood as a most-probable hypothesis, thus sending it to the identification result output device 4.

The attribute likelihood is likelihood in which individual attributes, correlated to track-coupling candidates included in attribute-attached track-coupling candidates ascribed to each hypothesis, represent the same mobile body. When an attribute correlated to a track-coupling candidate represents the color of clothes, for example, the attribute likelihood may represent a similarity of color of clothes. Alternatively, the attribute likelihood may represent elements other than colors of clothes, such as a similarity of heights, a similarity of weights, a similarity of ages, and a similarity of sexes, in response to attribute types.

Figure 29:
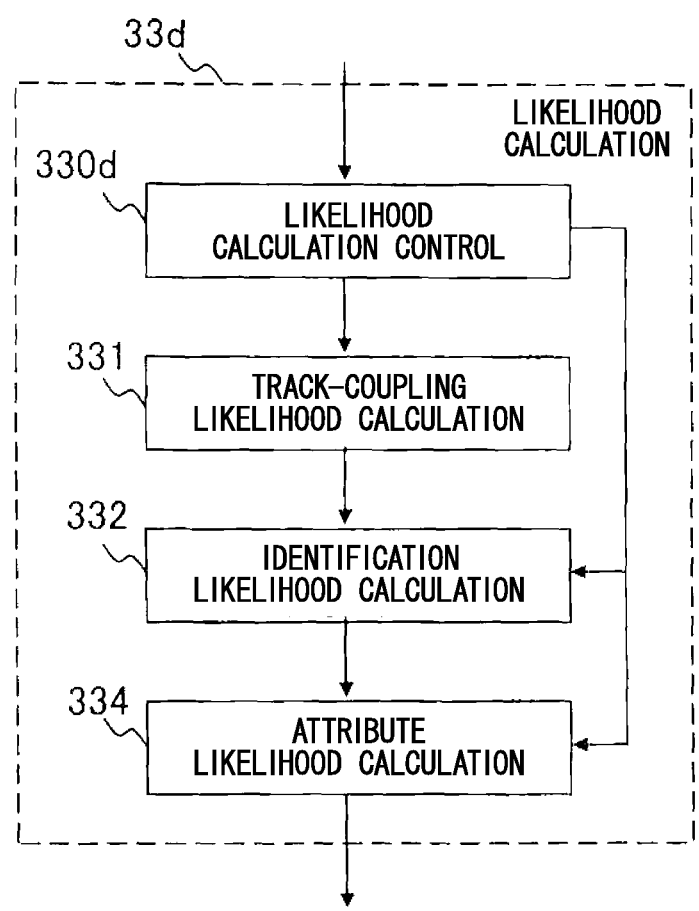
FIG. 29 A block diagram showing the constitution of a likelihood calculation part of the mobile body track identification device.

FIG. 29 is a block diagram showing the constitution of the likelihood calculation part 33*d* of Embodiment 5. The likelihood calculation part 33*d* includes a likelihood calculation control part 330*d*, the track-coupling likelihood calculation part 331, the identification likelihood calculation part 332, and an attribute likelihood calculation part 334. Herein, the track-coupling likelihood calculation part 331 and the identification likelihood calculation part 332 are identical to Embodiment 1; hence, descriptions thereof will be omitted.

The likelihood calculation part 330*d* sends hypotheses with uncalculated likelihoods to the track-coupling likelihood calculation part 331, the identification likelihood calculation part 332, and the attribute likelihood calculation part 334.

The attribute likelihood calculation part 334 receives hypotheses generated by the hypothesis generation part 32*d*, thus calculating attribute likelihoods with respect to hypotheses. To individually calculate attribute likelihoods of hypotheses, the attribute likelihood calculation part 334 calculates attribute likelihoods of track-coupling candidates ascribed to each hypothesis and then multiplies and normalizes attributes likelihoods of track-coupling candidates ascribed to each hypothesis, thus determining an attribute likelihood of each hypothesis.

The attribute likelihood calculation part 334 has determined calculation methods of attribute likelihoods in connection with attribute types, thus determining an appropriate calculation method in response to the attribute type included in each hypothesis. Thus, the attribute likelihood calculation part 334 calculates attribute likelihoods in accordance with a calculation method corresponding to each attribute type.

Additionally, attribute-attached track-coupling candidates included in each hypothesis may include track-coupling candidates ascribed to one attribute type or track-coupling candidates ascribed to plural attribute types.

Next, the operation of the attribute likelihood calculation part 334 for calculating attribute likelihoods with respect to attribute-attached track-coupling candidates will be described. For the sake of simplification of description, the following description refers to a calculation process for calculating track-coupling candidates each correlated to two attributes ascribed to the same attribute type.

Additionally, attributes are represented using histograms, wherein the number of bins (Bin) applied to each histogram is set to "m". Herein, two attributes (histograms) are denoted by h1, h2, wherein the frequencies of bins i of histograms are denoted by $h1(i)$, $h2(i)$. It is possible to name the color of clothes as the attribute type representing these histograms. The color of clothes can be expressed using histograms in the color space. Specifically, the attribute detection device 5 generates histograms each counting the number of pixels, included in an image of shooting a mobile body, per each color type, thus setting those histograms as attributes. When histograms are used to represent attributes, the attribute likelihood calculation part 334 calculates a Bhattacharyya distance D according to Equation 4, thus determining an attribute likelihood such that a shorter Bhattacharyya distance D indicates a higher attribute likelihood whilst a longer Bhattacharyya distance D indicates a lower attribute likelihood.

$$D = \sqrt{1 - \sum_{i=1}^{m} \sqrt{h1(i) \cdot h2(i)}} \qquad \text{[Equation 4]}$$

The above example is designed to determine attribute likelihoods, represented by histograms, based on Bhattacharyya distances; but it is possible to calculate attribute likelihoods in accordance with other methods.

A consideration is made with respect to the case where mobile bodies are classified using attribute types representing sexes so that numerical values or character strings corresponding to classifications are set to attributes. For instance, an attribute "0" is set to a mobile body representing a male whilst an attribute "1" is set to a mobile body representing a female. Alternatively, it is possible to use character strings such as "male" and "female" instead of numerical values "0" and "1". The attribute likelihood calculation part 334 holds definitions of attribute likelihoods suited to combinations of attributes correlated to track-coupling candidates with respect to attribute types. At this time, attributes are defined such that a higher attribute likelihood is calculated with respect to a combination of the same attributes whilst a lower attribute likelihood is calculated with respect to a combination of different attributes. When an attribute correlated to a track-coupling candidate is "male/male" or "female/female", for example, the attribute may have a high likelihood of indicating the same mobile body; hence, it is defined with a high attribute likelihood. On the other hand, an attribute "male/female" correlated to a track-coupling candidate is defined with a low attribute likelihood. The attribute likelihood calculation part 334 holds those definitions of attributes, whereby it is possible to read attribute likelihoods in response to attribute patterns correlated to track-coupling candidates.

A consideration is made with respect to the case where attribute likelihoods are expressed as numerical values representing features of mobile bodies. As this attribute type, it is possible to name height, weight, age, or the like. In this case, the attribute likelihood calculation part 334 calculates a variance between two values correlated to an attribute likelihood of a track-coupling candidate. The attribute likelihood calculation part 334 holds a function (hereinafter, referred to as a "likelihood function"), in which a smaller variance indicates a higher attribute likelihood whilst a larger variance indicates a lower attribute likelihood, in advance. The attribute likelihood calculation part 334 applies a calculated variance to the likelihood function so as to calculate an attribute likelihood. Herein, attribute likelihoods are calculated using variances, but it is possible to calculate attribute likelihoods in accordance with other methods.

The above description refers to the case where two attributes of the same attribute type are correlated to a track-coupling candidate. In the case where three or more attributes of the same attribute type are correlated to a track-coupling candidate, it is possible to calculate attribute likelihoods of track-coupling candidates in accordance with the following procedure.

First, the attribute likelihood calculation part 334 sequences attributes correlated to track-coupling candidates in an order of earlier detection times. Next, the attribute likelihood calculation part 334 calculates an attribute likelihood between adjacent attributes which adjoin together in their places of order. For instance, a likelihood is calculated between a first attribute and a second attribute; similarly, a likelihood is calculated between second and third attributes; subsequently, a likelihood is calculated between third and fourth attributes. Thereafter, attribute likelihoods are sequentially calculated. At this time, a likelihood between two attributes which adjoin together in their places of order is calculated by the foregoing calculation method applied to a track-coupling candidate correlated to two attributes.

The attribute likelihood calculation part 334 calculates a likelihood per each pair of attributes which adjoin together in their places of order; thereafter, the attribute likelihood calculation part 334 multiplies attribute likelihoods and then calculates a radical root of the number of attribute likelihoods subjected to multiplication. It implements normalization on attributes related to attribute-attached track-coupling candidates by way of the radical root calculation.

In the above process of multiplying attribute likelihoods, it is possible to perform weighted calculation on attribute likelihoods in response to the attribute detection device number corresponding to an original attribute and then multiply them. This is a measure considering the property of the attribute detection device 5, wherein the attribute detection device 5 that is able to detect the front portion of a face of a mobile body (herein, a person) is able to detect its attribute such as sex and age with a high precision. On the other hand, the attribute detection device 5 that is able to detect a person's face solely in a slanted direction may include an error in a detected attribute. As described above, attribute likelihoods are subjected to weighting, reflecting a detection precision per each attribute detection device, and then multiplied together. It is unnecessary to receive the attribute detection device number when weighting is not necessarily performed in response to the attribute detection device 5.

Next, a calculation method of attribute likelihoods will be described with respect to track-coupling candidates each correlated to a plurality of attributes of different attribute types. In this case, the attribute likelihood calculation part 334 calculates attribute likelihoods regarding track-coupling candidates in accordance with the following procedure.

First, the attribute likelihood calculation part 334 sequences attributes correlated to track-coupling candidates in an order of earlier detection times. Subsequently, the attribute likelihood calculation part 334 classifies attributes and then calculates attribute likelihoods per each attribute type. To calculate attribute likelihoods with regard to a single attribute type, the attribute likelihood calculation part 334 generates combinations of attributes, which adjoin together in their places of order, with respect to the attribute type which is currently focused on, thus calculating a attribute likelihood per each combination. Herein, attributes which adjoin together in their places of order are attributes which adjoin together in their places of order with respect to the attribute type, which is currently focused on, and between which another attribute of the same attribute type is interposed. In this connection, another attribute of another attribute type may exist between attributes of the same attribute type. Additionally, an attribute likelihood per each combination of attributes of the same attribute type which adjoin together in their places of order can be calculated in a manner similar to the foregoing operation of calculating a likelihood regarding a track-coupling candidate correlated to two attributes. The attribute likelihood calculation part 334 calculates an attribute likelihood per each combination of attributes of the same type which adjoin together in their places of order; thereafter, it multiplies attribute likelihoods and then perform normalization by calculating a radical root of the number of attribute likelihoods subjected to multiplication. As described above, it is possible to calculate attribute likelihoods with regard to the attribute type which is currently focused on. Similarly, the attribute likelihood calculation part 334 calculates attribute likelihoods with regard to another attribute type.

As described above, after calculating attribute likelihoods per each attribute type, the attribute likelihood calculation part 334 multiplies attribute likelihoods and then performs normalization by calculating a radical root of the number of attribute likelihoods subjected to multiplication. Thus, it is possible to calculate attribute likelihoods with respect to attribute-attached track-coupling candidates in which each track-coupling candidate is correlated to a plurality of attributes of different attribute types. To multiply attribute likelihoods which are calculated per each attribute type, it is possible to multiply attribute likelihoods by weight coefficients in response to their types and then multiply them together. It is possible to reflect superiority/inferiority of reliability per each attribute type in attribute likelihoods by multiplying attribute likelihoods by weight coefficients. In the case where a person's sex can be detected with a high precision whilst an error may occur in detecting the color of clothes, for example, an attribute likelihood calculated using a person's sex needs to be multiplied by a high weight coefficient while an attribute likelihood calculated using a color needs to be multiplied by a small weight coefficient.

Next, an example of calculation of attribute likelihoods will be described with reference to the case where track-coupling candidates are each correlated to a plurality of attributes of different attribute types. Herein, track-coupling candidates are each correlated to five attributes. Among attributes sequences in an order of earlier detection times, first, third, and fourth attributes are ascribed to an attribute type of "color" whilst second and fifth attributes are ascribed to an attribute type of "sex". In this case, the attribute likelihood calculation part 334 calculates attribute likelihoods with respect to a pair of first and third attributes and a pair of third and fourth attributes. This produces two attributes likelihoods, wherein the attribute likelihood calculation part 334 multiplies them together and then calculates a square root. This produces an attribute likelihood with respect to the attribute type of "color". Next, an attribute likelihood regarding the attribute type of "sex" is calculated based on second and fifth attributes. Thereafter, the attribute likelihood calculation part 334 multiplies the attribute likelihood regarding "color" and the attribute likelihood regarding "sex" and then calculates a square root. Thus, it is possible to calculate an attribute likelihood per each track-coupling candidate correlated to five attributes.

Additionally, when track-coupling candidates are not correlated to attributes, or when track-coupling candidates are each correlated to a single attribute, the attribute likelihood calculation part 334 sets a constant (e.g. "1") to attribute likelihoods of those track-coupling candidates.

As described above, the attribute likelihood calculation part 334 multiplies and normalizes attribute likelihoods calculated for track-coupling candidates ascribed to the same hypothesis, thus calculating an attribute likelihood of the hypothesis. This normalization is realized by calculating a radical root of the number of track-coupling candidates ascribed to the same hypothesis.

The attribute likelihood calculation part 334 integrates a track-coupling candidate, an identification likelihood, and an attribute likelihood per each hypothesis. This integration process is implemented by multiplying the track-coupling likelihood, the identification likelihood, and the attribute likelihood. In the integration process, the attribute likelihood calculation part 334 may apply weights to the track-coupling likelihood, the identification likelihood, and the attribute likelihood so as to multiply them together.

For instance, the track-coupling candidate generation part 31, the hypothesis generation part 32*d*, and the likelihood calculation part 33*d* (including the likelihood calculation control part 330*d*, the track-coupling likelihood calculation part 331, the identification likelihood calculation part 332, and the attribute likelihood calculation part 334) can be realized by way of a CPU of a computer that operates according to a mobile body track identification program. In this case, a program memory of a computer (not shown) stores a mobile body track identification program so that the CPU loads the program so as to realize the functions of the track-coupling candidate generation part 31, the hypothesis generation part 32*d*, and the likelihood calculation part 33*d*. Alternatively, it is possible to realize the track-coupling candidate generation part 31, the hypothesis generation part 32*d*, and the likelihood calculation part 33d by use of individual hardware elements. Similarly, it is possible to realize the likelihood calculation control part 330d, the track-coupling likelihood calculation part 331, the identification likelihood calculation part 332, and the attribute likelihood calculation part 334 by use of individual hardware elements.

Figure 30:
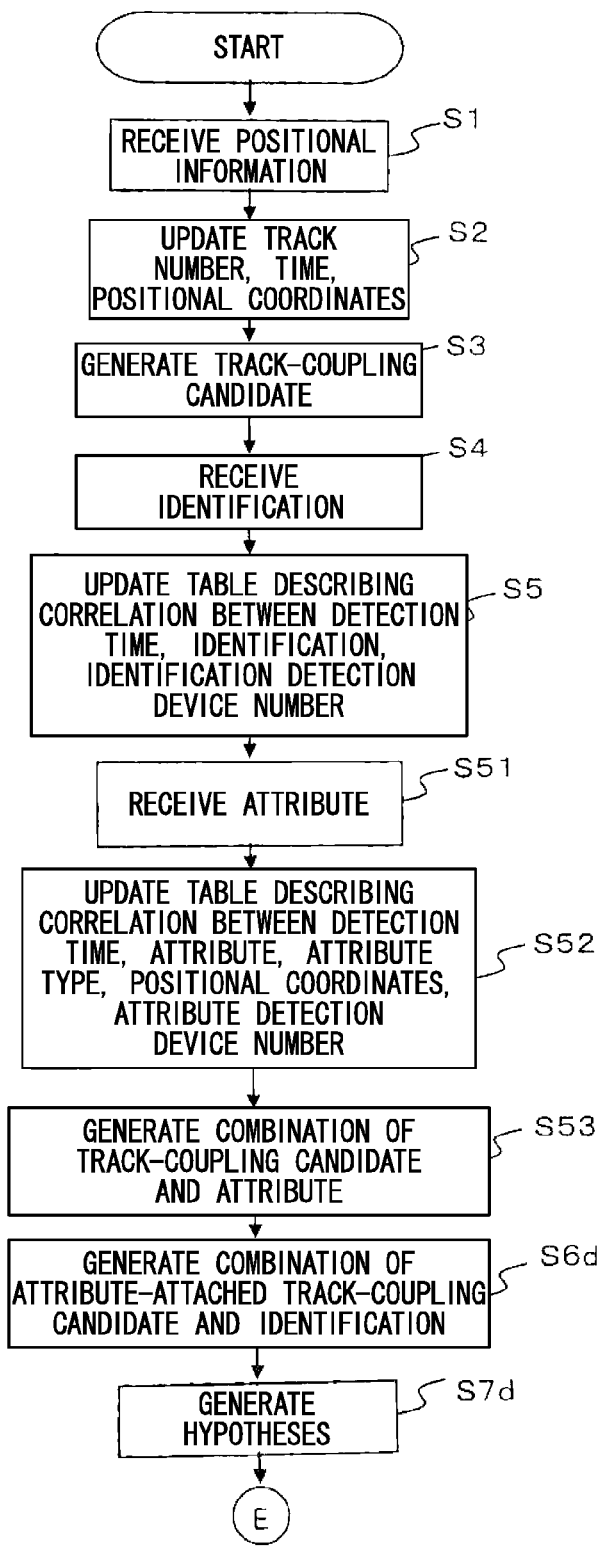
FIG. 30 A flowchart showing the operation of the mobile body track identification device according to Embodiment 5.
Figure 31:
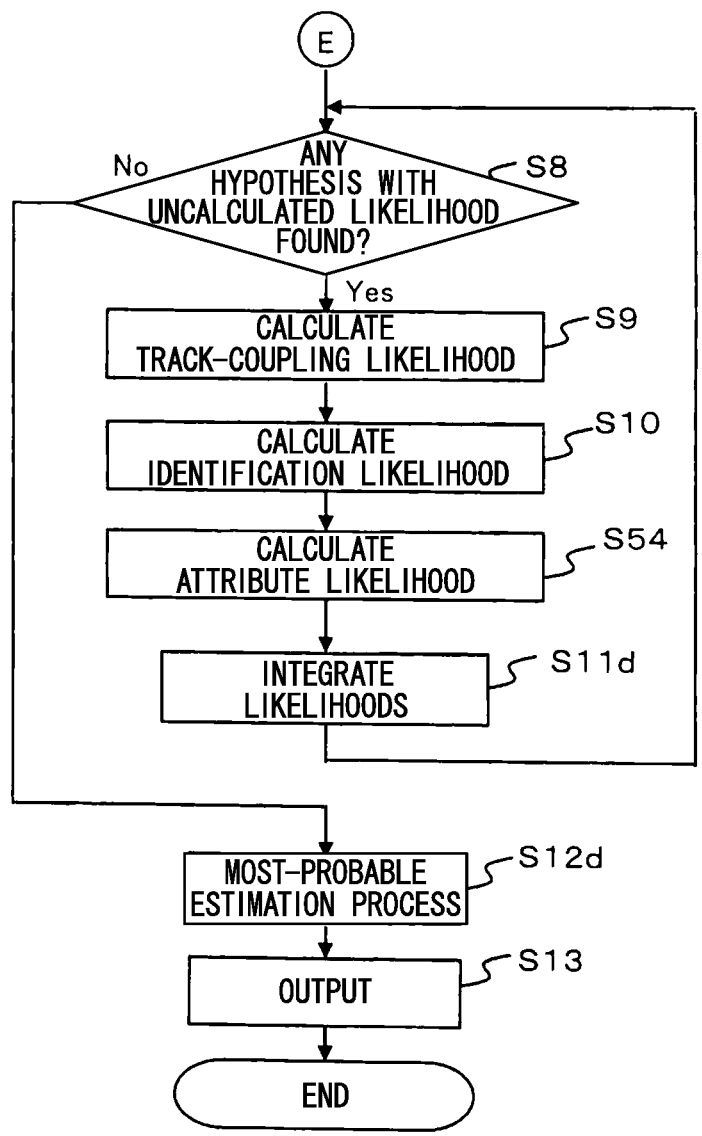
FIG. 31 A flowchart showing the operation of the mobile body track identification device according to Embodiment 5.

Next, the operation of the mobile body track identification device 3d of Embodiment 5 will be described. FIGS. 30 and 31 are flowcharts showing the processing of the mobile body track identification device 3d of Embodiment 5. Herein, the same steps as the steps of Embodiment 1 (see FIGS. 4 and 5) are designated by the same reference numerals; hence, descriptions thereof will be omitted. In FIG. 30, a series of steps (i.e. steps S1 to S5) for updating the table holding retrieved identifications is identical to that of Embodiment 1 (see FIG. 4).

The hypothesis generation part 32d retrieves combinations of detection times, attributes, attribute types, positional coordinates, and attribute detection device numbers from the attribute detection device 5 (step S51). Upon detecting an attribute of a mobile body, the attribute detection device 5 sends it to the hypothesis generation part 32d. The hypothesis generation part 32d holds the correlation between detection times, attributes, attribute types, positional coordinates, and attribute detection device numbers in a table.

The hypothesis generation part 32d holds attributes which have been received from the attribute detection device 5 in a predetermined time in the past from the current time (i.e. the time of retrieving the current attribute). With respect to the current attribute, the hypothesis generation part 32d retrieves a combination of the attribute, its detection time, its attribute type, its positional coordinates and its attribute detection device number so as to additionally register it with the table while deleting the oldest attribute (step S52). For instance, the hypothesis generation part 32d has held the correlation between attributes, detection times, attribute types, positional coordinates, and attribute detection device numbers at times t1 to tn-1. Thereafter, upon receiving a combination of an attribute, its detection time, its attribute type, its positional coordinates, and its attribute detection device number at the current time tn, the hypothesis generation part 32d registers the attribute received at time tn with the table while discarding the attribute received at time t1 from the table.

In this connection, the hypothesis generation part 32d does not only store the updated table by itself but also sends it to the likelihood calculation part 33d.

The hypothesis generation part 32d generates combinations of track-coupling candidates and attributes (i.e. attribute-attached track-coupling candidates) by use of attributes stored in the table updated in step S52 and track-coupling candidates received from the track-coupling candidate generation part 31 in step S3 (step S53). Specifically, the hypothesis generation part 32d selects one of received attributes so as to calculate an euclidean distance between positional coordinates of the selected attribute and positional coordinates of a track-coupling candidate at its detection time with respect to each of combinations of the selected attribute and all the combinations of track-coupling candidates. The hypothesis generation part 32d specifies a combination of the attribute and a track-coupling candidate with the shortest euclidean distance so as to store it as an attribute-attached track-coupling candidate. The hypothesis generation part 32d performs this process once with respect to all the attributes retrieved in step S51. With respect to a track-coupling candidate with interruption of tracks, the hypothesis generation part 32d performs interpolation between interrupted tracks so as to specify positional coordinates of the track-coupling candidate, thus calculating an euclidean distance with positional coordinates of an attribute. When a track-coupling candidate whose attribute includes a plurality of tracks at its detection time so that a plurality of positional coordinates is detected, an euclidean distance is calculated between their median point and positional coordinates of each attribute.

In step S53, a single track-coupling candidate is not necessarily correlated to a single attribute; hence, a single track-coupling candidate may be correlated to two or more attributes. Alternatively, there may exist track-coupling candidates which are not at all correlated to any attribute.

The hypothesis generation part 32d generates all the combinations of identifications and attribute-attached track-coupling candidates (hereinafter, referred to as "attribute-attached track-coupling candidate/identification pairs") by use of identifications stored in the table updated in step S5 and attribute-attached track-coupling candidates generated in step S53 (step S6d). Herein, the hypothesis generation part 32d focuses solely on track-coupling candidates in attribute-attached track-coupling candidates so as to generate all the combinations of attribute-attached track-coupling candidate/identification pairs by way of a method similar to step S6 of Embodiment 1 (see FIG. 4).

Subsequently, the hypothesis generation part 32d generates hypotheses as sets of attribute-attached track-coupling candidate/identification pairs (step S7d). In step S7d, the hypothesis generation part 32d focuses on track-coupling candidates and identifications in attribute-attached track-coupling candidate/identification pairs so as to extract all the sets of attribute-attached track-coupling candidate/identification pairs satisfying the first to third conditions similar to Embodiment 1, thus determining individual sets as hypotheses. The hypothesis generation part 32d sends hypotheses, generated therein, to the likelihood calculation part 33d.

After step S7d, the likelihood generation part 33d performs step S8 and its following steps shown in FIG. 31. Herein, a series of steps (i.e. a loop consisting of steps S8 to S10) for determining existence/nonexistence of hypotheses with uncalculated likelihoods and for calculating track-coupling likelihoods and identification likelihoods is similar to that of Embodiment 1. Upon determining existence of hypotheses without execution of calculation of likelihoods (specifically, steps S9 to S1id) in step S8 (i.e. a decision result "Yes" of step S8), the likelihood calculation control part 330d sends one of hypotheses with uncalculated likelihoods to the track-coupling likelihood calculation part 331, the identification likelihood calculation part 332, and the attribute likelihood calculation part 334. In this connection, calculation of track-coupling likelihoods and identification likelihoods (i.e. steps S9, S10) is identical to that of Embodiment 1; hence, the description thereof will be omitted.

The attribute likelihood calculation part 334 calculates attribute likelihoods with respect to received hypotheses (step S54). In step S54, the attribute likelihood calculation part 334 calculates attribute likelihoods of individual track-coupling candidates ascribed to a hypothesis, multiplies and normalizes attribute likelihoods of track-coupling candidates ascribed to the same hypothesis, thus calculating an attribute likelihood. In this connection, attributes used for calculation of attribute likelihoods are provided from the hypothesis generation part 32 as combinations of attributes, attribute types, and detection times after updating (i.e. after step S52).

After step S54 for calculating attribute likelihoods, the attribute likelihood calculation part 334 integrates track-coupling candidates of hypotheses calculated in step S9, identification likelihoods of hypotheses calculated in step S10, and attribute likelihoods calculated in step S54, thus storing the integration results in connection with hypotheses (step S11d). In step S11d, track-coupling likelihoods, identification likelihoods, and attribute likelihoods calculated in steps S9, S10, and S54 are multiplied and integrated. In the integration process, the attribute likelihood calculation part 334 may applies weights to track-coupling likelihoods, identification likelihoods, and attribute likelihoods.

After step S11d, the likelihood calculation part 33d repeats a loop consisting of steps S8 to S11d. Upon determining nonexistence of hypotheses with uncalculated likelihoods in step S8 (i.e. a decision result "No" of step S8), the attribute calculation part 334 estimates a hypothesis with the highest integration value of a track-coupling likelihood, an identification likelihood, and an attribute likelihood as a most-probable hypothesis (step S12d). The attribute likelihood calculation part 334 sends the estimated most-probable hypothesis to the identification result output device 4.

Upon receiving the most-probable hypothesis estimated in step S12d, the identification result output device 4 determines which mobile body matches which track with reference to attribute-attached track-coupling candidate/identification pairs ascribed to the most-probable hypothesis (step S13). At this time, the identification result output device 4 may specifically display the position or track of a mobile body. In this connection, step S13 is identical to that of Embodiment 1.

In Embodiment 5, the attribute detection device 5 detects features of mobile bodies as attributes so that the mobile body track identification device 3d utilizes attribute likelihoods, in addition to track-coupling likelihoods and identification likelihoods, in calculating likelihoods of hypotheses. When a plurality of mobile bodies moves together along similar paths, a plurality of track-coupling candidate/identification pairs substantially shares the same calculation result of track-coupling likelihoods and identification likelihoods, whereby it is presumed that no differences may occur between likelihoods of hypotheses. Even when a plurality of mobile bodies moves together along similar paths, some differences may occur between likelihoods of hypotheses due to differences between features of mobile bodies since Embodiment 5 utilizes attribute likelihoods in calculating likelihoods of hypotheses; hence, it is possible to estimate which mobile body matches which track. In the integration of likelihoods (step S11d), attribute likelihoods are integrated so as to estimate a most-probable hypothesis according to the integration result; hence, it is possible to estimate which mobile body matches which track with a high precision.

Similar to the foregoing variation of Embodiment 1, it is possible for the likelihood calculation part 33d of Embodiment not to include the track-coupling likelihood calculation part 331, thus precluding calculation of track-coupling likelihoods. In this case, the attribute likelihood calculation part 334 may solely integrate identification likelihoods and attribute likelihoods, thus estimating a hypothesis with the highest integration value as a most-probable hypothesis.

Similar to Embodiment 2, it is possible for the likelihood calculation part 33d of Embodiment 5 not to include the track-coupling likelihood calculation part 331, so that the mobile body track identification device 3d may include the track-coupling likelihood calculation part 331a. In this case, the attribute likelihood calculation part 334 solely integrates identification likelihoods and attribute likelihoods, thus estimating a hypothesis with the highest integration value as a most-probable hypothesis. This constitution may demonstrate the same effect as the effect of Embodiment 2 in Embodiment 5.

Moreover, it is possible to combine Embodiment 3 with Embodiment 5 or its variation. Alternatively, it is possible to combine Embodiment 4 with Embodiment 5 or its variation. Alternatively, it is possible to combine Embodiments 3 and 4 with Embodiment 5 or its variation.

Embodiment 6

Figure 32:
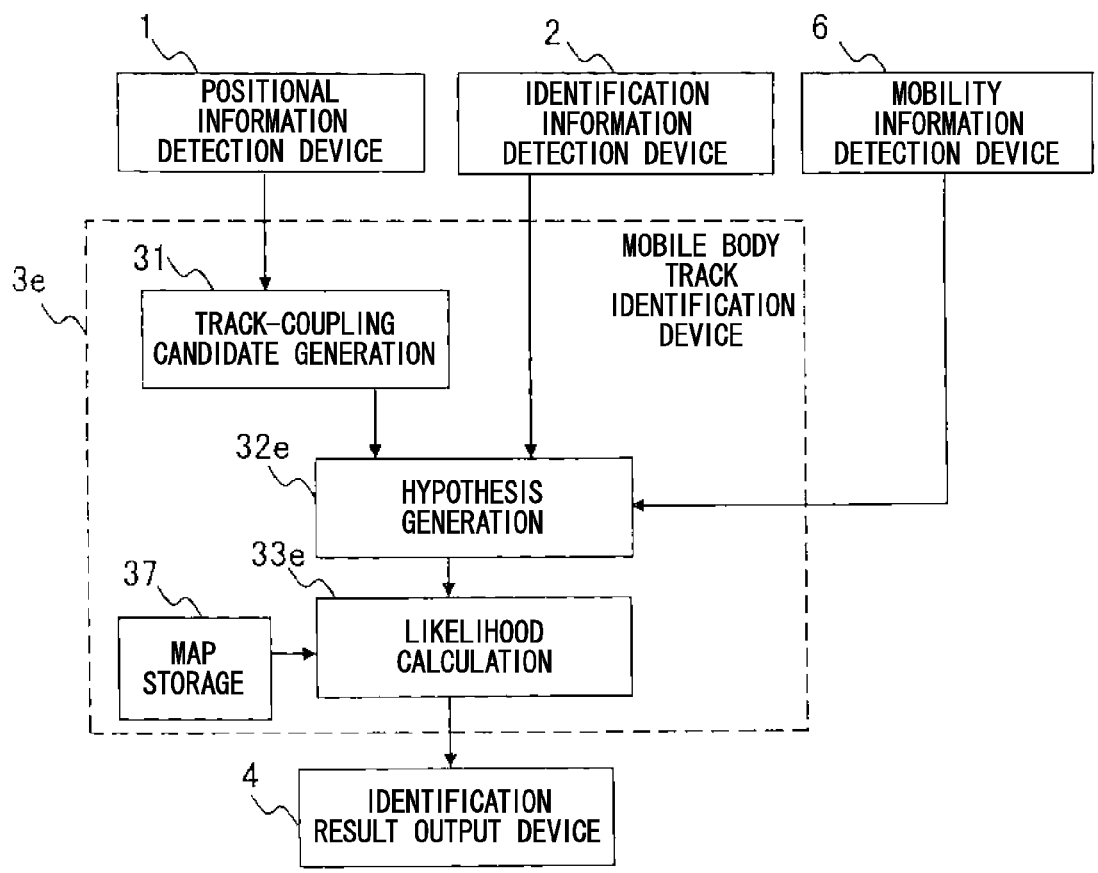
FIG. 32 A block diagram showing the constitution of a mobile body track identification device in a mobile body track identification system according to Embodiment 6 of the present invention.

FIG. 32 is a block diagram of a mobile body track identification system according to Embodiment 6 of the present invention. Herein, the same constituent elements as the constituent elements of Embodiment 1 are designated by the same reference numerals; hence, descriptions thereof will be omitted. The mobile body track identification system of Embodiment 6 includes the positional information detection device 1, the identification information detection device 2, a mobile body track identification device 3e, the identification result output device 4, and a mobility information detection device 6. The mobile body track identification device 3e includes the track-coupling likelihood generation part 31, a hypothesis generation part 32e, a likelihood calculation part 33e, and the map storage 37.

The mobile body track identification system does not necessarily include a single mobility information detection device 6; hence, it is possible to include a plurality of mobility information detection devices 6. A mobility detection device ID is allocated to the mobility information detection device 6 to univocally specify it. In this connection, a specific number is used as the mobility detection device ID; hence, it will be referred to as a mobility detection device number.

The mobility information detection device 6 retrieves mobility of a mobile body in the tracking area 50. The mobility is information representing a moving condition of a mobile body being tracked; hence, it may indicate a moving speed, a moving direction, or the like.

The mobility information detection device 6 is a device that is able to detect mobility of a mobile body in the tracking area 50 so as to specify its detection time, wherein it is realized using a camera, a laser range finder, or an acceleration sensor. The mobility information detection device 6 can be arranged inside the tracking area 50. Alternatively, a mobile body may carry a portable terminal equipped with a sensor with an ability of detecting mobility by itself.

When a plurality of mobility information detection devices 6 is installed in the mobile body track identification system, the mobility information detection devices 6 can be arranged such that their detection ranges overlap with each other. Alternatively, the mobility information detection devices 6 can be arranged such that their detection ranges do not overlap with each other. Additionally, it is possible to use a plurality of mobility information detection devices 6 of different types, such as a camera and an acceleration sensor, in common.

Even when a mobile body actually exists, the mobility information detection device 6 may not always detect its mobility; hence, a decision as to whether or not mobility is detected depends on the installed condition of the mobility information detection device 6. When the mobility information detection device 6 is arranged in the tracking area 50, for example, the mobility information detection device 6 can easily detect mobility of a mobile body positioned close to it, whilst the mobility information detection device 6 may hardly detect mobility of a mobile body distanced from it. When a mobile body carries a portable terminal equipped with an acceleration sensor as the mobility information detection device 6, in other words, when the mobility information detection device 6 accompanies with a mobile body, the mobility information detection device 6 is able to normally detect mobility of a mobile body.

It is presumed that a certain type of the mobility information detection device 6 may not necessarily detect positional coordinates at which mobility is detected. When a portable terminal is equipped with an acceleration sensor as the mobility information detection device 6 so as to detect a moving condition of a mobile body such as "rest", "walk", and "run" or to detect "step count" of a mobile body (a person), for example, the mobility information detection device 6 does not detect positional coordinates at which mobility is detected. In this case, the mobility information detection device 6 sets "null" to positional coordinates at which mobility is detected. In the case where no positional coordinates regarding mobility are detected, those positional coordinates are expressed using a character string of "null" in the following description. In this connection, those positional coordinates can be expressed using other character strings. When positional coordinates regarding mobility are detectable, the mobility information detection device 6 detects mobility of a mobile body while detecting positional coordinates of the mobile body at the detection time of mobility. Mobility with positional coordinates specified by a certain value will be referred to as "positional coordinates-attached mobility".

The mobility information detection device 6 sends the detected mobility, a mobility type univocally indicating its type, a detection time of mobility, positional coordinates of mobility, and its mobility detection device number to the mobile body track identification device 3e. When the mobility information detection device 6 is unable to detect positional coordinates, "null" is set to positional coordinates of mobility. If the mobility information detection device 6 operates to detect mobility but fails to do so, the mobility information detection device 6 may send mobility and its mobility type, which are set to "null", to the mobile body track identification information device 3e together with its time and its mobility detection device number. Alternatively, the mobility information detection device 6 does not send mobility to the mobile body track identification device 3e so as to allow the mobile body track identification device 3e to determine that no mobility is detected at that time.

When the mobility information detection device 6 has a narrow detection range so that positional coordinates of its installed position is deemed equivalent to positional coordinates of a mobile body at the mobility detection time, the mobility information detection device 6 sends positional coordinates thereof to the mobile body track identification device 3e. In this case, the mobility information detection device 6 needs to hold positional coordinates of the installed position thereof inside the tracking area 50 in advance.

When the mobility information detection device 6 detects mobility from an image which is shot using a camera, the installed position of the mobility information detection device 6 may not necessarily match with positional coordinates of a mobile body at the time of extracting mobility from the image due to a broad scope of the shot image. In this case, the mobility information detection device 6 stores a conversion table for converting an arbitrary position, in the shot image, into positional coordinates in the tracking area 50 in advance, so that positional coordinates of a mobile body in its image can be converted into positional coordinates in the tracking area 50 with reference to the conversion table. Alternatively, it is possible to hold a conversion equation, instead of the conversion table, for converting positional coordinates of an arbitrary position in a shot image into positional coordinates in the tracking area 50, wherein positional coordinates of a mobile body in its image are put into the conversion equation and converted into positional coordinates in the tracking area 50.

As described above, it is possible to determine positional coordinates of a mobile body at the mobility detection time in accordance with a method suited to the type of the mobility information detection device 6 (in other words, the mobility type).

It is necessary to establish synchronization between positional information of the positional information detection device 1, identifications of the identification information detection device 2, and mobility of the mobility information detection device 6. That is, the positional information detection device 1 detects positional information of a mobile body; the identification information detection device 2 detects an identification of the mobile body; and the mobility information detection device 6 detects mobility at the same time. When the positional information detection device 1, the identification information detection device 2, and the mobility information detection device 6 detect positional information, identifications, and mobility in an asynchronous manner, the mobile body track identification device 3e saves positional information, identifications, and mobility for a predetermined time by way of buffering, so that positional information, identifications, and mobility accumulated in a buffer are used every predetermined time. When no timing synchronization is established between the positional information detection device 1, the identification information detection device 2, and the mobility information detection device 6, the mobile body track identification device may set the same detection time with respect to positional information, an identification, and mobility which are received simultaneously.

Similar to Embodiment 1, the hypothesis generation part 32e of Embodiment 6 receives track-coupling candidates from the track-coupling candidate generation part 31 while receiving identifications from the identification information detection device 2. Additionally, the hypothesis generation part 32e receives mobility, mobility types, detection times, positional coordinates, and mobility detection device numbers, thus holding the correlation between them.

Additionally, the hypothesis generation part 32e generates all the hypotheses based on track-coupling candidates from the track-coupling candidate generation part 31, identifications from the identification information detection device 2, and mobility from the mobility information detection device 6, thus sending hypotheses, generated therein, to the likelihood calculation part 33e.

Next, a hypothesis generating procedure of Embodiment 6 will be described.

First, the hypothesis generation part 32e generates combinations of track-coupling candidates and mobility values (i.e. mobility-attached track-coupling candidates) by use of track-coupling candidates from the track-coupling candidate generation part 31 and mobility values which the mobility information detection device 6 detects in a time range retroactive to a predetermined time in the past from the current time.

The hypothesis generation part 32e selects track-coupling candidates correlated to mobility in accordance with the following procedure, thus generating mobility-attached track-coupling candidates.

First, the hypothesis generation part 32e correlates mobility values with positional coordinates, among mobility values received from the mobility information detection device 6, to track-coupling candidates. The hypothesis generation part 32e solely extracts mobility values with positional coordinates among mobility values from the mobility information detection device 6, thus selecting one mobility value therefrom. The hypothesis generation part 32e calculates a euclidean distance between positional coordinates of the selected mobility value and positional coordinates of a track-coupling candidate at the detection time of the selected mobility value with respect to all the combinations of track-coupling candidates combined with the selected mobility value. Next, the hypothesis generation part 32e specifies and stores a combination of a track-coupling candidate and the selected mobility value with the shortest euclidean distance. This process is performed once with respect to all the mobility values received from the mobility information detection device 6. Track-coupling candidates correlated to mobility values via this process will be referred to as "temporary mobility-attached track-coupling candidates".

When positional coordinates at the detection time of the selected mobility value cannot be directly detected in connection with a track-coupling candidate with interruption of tracks, the hypothesis generation part 32e performs interpolation between interrupted tracks so as to specify positional coordinates of the track-coupling candidate at the mobility detection time, thus calculating a euclidean distance with positional coordinates of mobility. When a track-coupling candidate includes a plurality of tracks at the mobility detection time so that a plurality of positional coordinates, regarding mobile bodies, exists at the mobility detection time, it is necessary to calculate a euclidean distance between a median point and positional coordinates of mobility. This process is similar to the foregoing process of Embodiment 5 for generating attribute-attached track-coupling candidates.

Next, the hypothesis generation part 32e correlates mobility values with "null" positional coordinates, among the remaining mobility values from the mobility information detection device 6, to temporary mobility-attached track-coupling candidates. Herein, the hypothesis generation part 32e selects only the mobility values with "null" positional coordinates among mobility values from the mobility information detection device 6, thus generating all the combinations of the selected mobility values and temporary mobility-attached track-coupling candidates. That is, combinations between mobility value with "null" positional coordinate and temporary mobility-attached track-coupling candidates are formulized into "mobility-attached track-coupling candidates". This process indicates the operation in which mobility values with "null" positional coordinates are added as mobility values correlated to track-coupling candidates.

When mobility values with "null" positional coordinates do not exist in mobility values from the mobility information detection device 6, temporary mobility-attached track-coupling candidates are formulized into "mobility-attached track-coupling candidates".

The above process may allow for existence of track-coupling candidates each correlated to a single mobility value or existence of track-coupling candidates each correlated to a plurality of mobility values. Moreover, the situation in which mobility values with "null" positional coordinates do not exist may allow for existence of track-coupling candidates which are not correlated to mobility values. For instance, track-coupling candidates T1, T2, . . . , Tn are generated, and mobility values M1, M2, . . . , Mm with positional coordinates are detected, but mobility values with "null" positional coordinates" do not exist. Herein, nonexistence of mobility values correlated to track-coupling candidates will be expressed using a character string "null mobility". In this case, the hypothesis generation part 32e generates combinations of (T1, M1), (T2, M2), . . . , (Tn, Mm) or combinations of (T1, null mobility), (T2, M1), (T3, M2, M3), . . . , (Tn, Mm-2, Mm-1, Mm) (i.e. temporary mobility-attached track-coupling candidates). Due to nonexistence of mobility values with "null positional coordinates", temporary mobility-attached track-coupling candidates are formulized into and held as mobility-attached track-coupling candidates.

The hypothesis generation part 32e may generate mobility-attached track-coupling candidates such that all the received mobility values are each correlated to any one of track-coupling candidates. The hypothesis generation part 32e may generate a temporary mobility-attached track-coupling candidate by determining a track-coupling candidate with the shortest euclidean distance with positional coordinates of mobility, wherein when the euclidean distance exceeds a predetermined threshold, it is possible to determine that the mobility will not be correlated to any one of track-coupling candidates.

The hypothesis generation part 32e generates all the combinations of mobility-attached track-coupling candidates and identifications by use of mobility-attached track-coupling candidates, which are generated according to the foregoing procedure, and identifications which the identification information detection device 2 has detected in a time range retroactive to a predetermined time in the past from the current time. The hypothesis generation part 32e solely focuses on track-coupling candidates among mobility-attached track-coupling candidates, thus generating all the combinations of mobility-attached track-coupling candidates and identifications in accordance with the same process as the foregoing process of generating track-coupling candidate/identification pairs in Embodiment 1. Hereinafter, combinations of mobility-attached track-coupling candidates and identifications will be referred to as mobility-attached track-coupling candidate/identification pairs.

Similar to Embodiment 1, the hypothesis generation part 32e extracts all the sets of mobility-attached track-coupling candidate/identification pairs satisfying the first to third conditions, thus determining individual sets as hypotheses.

The likelihood calculation part 33e calculates and integrates a track-coupling likelihood, an identification likelihood, and a mobility likelihood per each hypothesis. It estimates a hypothesis with the highest integration value as a most-probable, thus sending it to the identification result output device 4.

The mobility likelihood is a likelihood in which the same mobile body may be specified by both the mobility correlated to a track-coupling candidate and the moving condition of a mobile body based on the track-coupling candidate. For instance, the mobility likelihood can be defined as a similarity between the moving speed of a mobile body based on its mobility and the moving speed of a mobile body based on a track-coupling candidate. Alternatively, the mobility likelihood can be defined as a similarity between the moving direction of a mobile body based on its mobility and the moving direction of a mobile body based on a track-coupling candidate.

Figure 33:
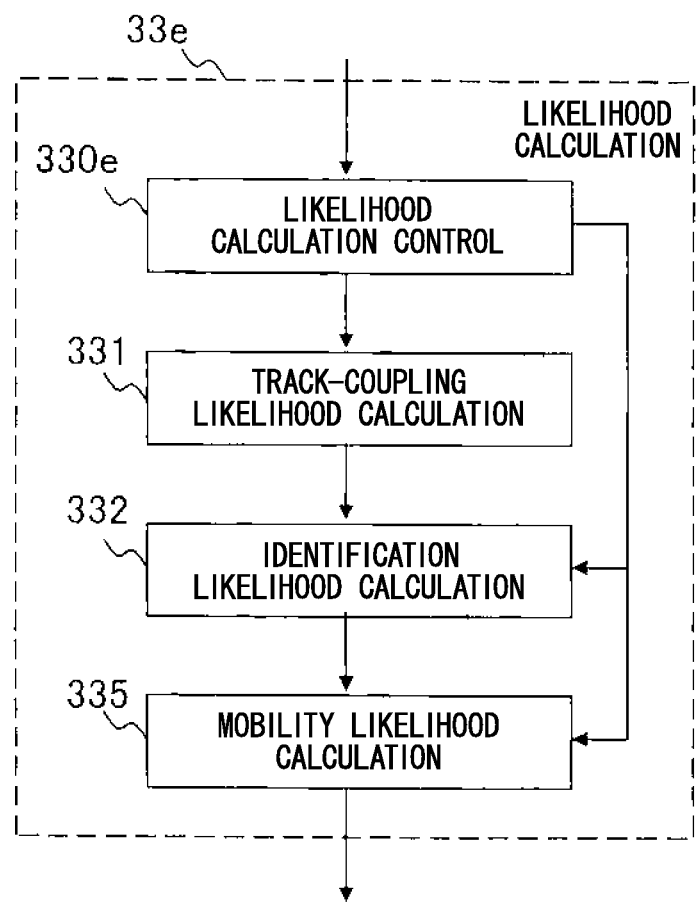
FIG. 33 A block diagram showing the constitution of a likelihood calculation part of the mobile body track identification device.

FIG. 33 is a block diagram showing the constitution of the likelihood calculation part 33e of Embodiment 6. The likelihood calculation part 33e includes a likelihood calculation control part 330e, the track-coupling likelihood calculation part 331, the identification likelihood calculation part 332, and the mobility likelihood calculation part 335. Herein, the track-coupling likelihood calculation part 331 and the identification likelihood calculation part 332 are identical to those of Embodiment 1; hence, descriptions thereof will be omitted.

The likelihood calculation control part 330e sends hypotheses with uncalculated likelihoods to the track-coupling likelihood calculation part 331, the identification likelihood calculation part 332, and the mobility likelihood calculation part 335.

The mobility likelihood calculation part 335 receives hypotheses, generated by the hypothesis generation part 32e, so as to calculate mobility likelihoods with respect to those hypotheses. To calculate individual mobility likelihoods, the mobility likelihood calculation part 335 calculates mobility likelihoods of individual track-coupling candidates ascribed to each hypothesis, and then multiplies and normalizes mobility likelihoods of track-coupling candidates ascribed to the same hypothesis, thus calculating a mobility likelihood per each hypothesis.

The mobility likelihood calculation part 335 holds a likelihood calculation method per each mobility type in advance, thus determining a calculation method of mobility likelihoods based on the mobility type of each hypothesis. Subsequently, the mobility likelihood calculation part 335 calculates mobility likelihoods in accordance with a calculation method suited to each mobility type.

Mobility-attached track-coupling candidates ascribed to a hypothesis may include track-coupling candidates each correlated to a single mobility type or a plurality of mobility types.

Next, the processing of the mobility likelihood calculation part 335 for calculating mobility likelihoods in connection with mobility-attached track-coupling candidates will be described. For the sake of simplification of description, the following description refers to the case where each single track-coupling candidate is correlated to a single mobility type.

With respect to the mobility type representing a moving direction vector, the mobility likelihood calculation part 335 refers to mobility correlated to track-coupling candidates. Herein, mobility may is expressed using vector V1 representing a moving direction of a mobile body. The mobility likelihood calculation part 335 calculates vector V2 representing a moving direction of a mobile body at the mobility detection time based on track-coupling candidates. For instance, the mobility likelihood calculation part 335 may calculate vector V2 based on positional coordinates of a mobile body before and after its mobility detection time. The mobility likelihood calculation part 335 calculates a cosine similarity between two vectors V1, V2, thus producing a mobility likelihood. At this time, the mobility likelihood calculation part 335 performs calculation using two vectors V1, V2 according to Equation 1, thus calculating a cosine similarity "cos θ".

In the above example, a similarity between moving direction vectors is calculated by calculating a cosine similarity, thus calculating a mobility likelihood; but it is possible to calculate a similarity between moving direction vectors according to other calculation methods.

With respect to the mobility type representing speed of a mobile body, the mobility likelihood calculation part 335 refers to speed serving as mobility correlated to track-coupling candidates. The mobility representing speed may be defined using a numerical value representing moving speed. Alternatively, mobility representing speed may be defined using character strings such as "rest" representing a rest condition, "walk" representing walking speed, and "run" representing speed faster than walking. The mobility information detection device 6 sends mobility which is defined using numerical values or character strings. For instance, the mobility likelihood calculation part 335 extracts positional coordinates of a mobile body at its mobility detection time and before and after the mobility detection time from track-coupling candidates, thus calculating speed of a mobile body. With respect to the mobility representing a numerical value of speed, the mobility likelihood calculation part 335 calculates a difference between speed specified by the mobility and speed calculated based on track-coupling candidates. The mobility likelihood calculation part 335 holds a likelihood function which is defined in advance such that a higher mobility likelihood is produced based on a smaller speed difference whilst a smaller mobility likelihood is produced based on a higher speed difference. The mobility likelihood calculation part 335 puts a difference between speed specified by the mobility and speed calculated based on track-coupling candidates into the likelihood function, thus calculating a mobility likelihood.

With respect to the mobility representing speed divisions using character strings such as "rest", "walk", and "run", the mobility likelihood calculation part 335 determines mobility likelihoods according to the following procedure.

First, the mobility likelihood calculation part 335 classifies speed calculated based on track-coupling candidates into any one of speed divisions. A certain speed range is set to each speed division in advance. The mobility likelihood calculation part 335 determines mobility likelihoods based on combinations of speed divisions specified by mobility and speed divisions determined using speed calculated based on track-coupling candidates. In this case, the mobility likelihood calculation part 335 holds mobility likelihoods which are defined in advance with respect to combinations of speed divisions. That is, the mobility likelihood calculation part 335 holds mobility likelihoods which are defined in advance with respect to all the combinations of speed divisions calculated based on track-coupling candidates and speed divisions specified by mobility such as [rest, rest], [rest, walk], [rest, run], [walk, walk], [walk, run], and [run, run]. Herein, a higher mobility likelihood is set in connection with similar content of speed divisions, whilst a lower mobility likelihood is set in connection with difference content of speed divisions. For instance, lower mobility likelihoods are determined with respect to combinations of identical speed divisions such as [rest, rest], [walk, walk], and [run, run]. Intermediate mobility likelihoods can be determined with respect to combinations of speed divisions, such as [rest, walk] and [walk, walk], in which speed divisions are not identical to each other but they do not have a big difference in a combination of [rest, run]. The mobility likelihood calculation part 335 selects mobility likelihoods, corresponding to combinations of speed divisions specified by mobility and speed divisions calculated based on track-coupling candidates, from among predefined mobility likelihoods.

The above example refers to the case where track-coupling candidates are each correlated to a single mobility value. In the case where track-coupling candidates are each correlated to two or more mobility values, the mobility likelihood calculation part 335 calculates mobility likelihoods regarding track-coupling candidates in accordance with the following procedure. First, the case where track-coupling candidates are each correlated to two mobility values of the same type will be described.

The mobility likelihood calculation part 335 sequences mobility values correlated to track-coupling candidates, among mobility-attached track-coupling candidates, in an order of earlier detection times. The mobility likelihood calculation part 335 calculates mobility likelihoods based on mobility values and track-coupling candidates in an order of earlier detection times. The calculation process for calculating mobility likelihoods based on individual mobility values and track-coupling candidates is identical to the foregoing calculation process regarding track-coupling candidates each correlated to a single mobility value.

After calculating mobility likelihoods using track-coupling candidates with respect to all mobility values, the mobility likelihood calculation part 335 multiplies mobility likelihoods and then performs normalization for calculating a radical root of the number of mobility likelihoods, thus calculating mobility likelihoods with respect to mobility-attached track-coupling candidates.

In the above multiplication process of mobility likelihoods, it is possible to perform weighted multiplication on mobility values in response to the mobility detection device number corresponding to the original mobility used for calculating individual mobility likelihoods. That is, it is possible to multiply mobility likelihoods after a higher weight is applied to mobility likelihoods calculated based on mobility values from a mobility information detection device with a high detection precision whilst a lower weight is applied to mobility likelihoods calculated based on mobility values from a mobility information detection device with a low detection decision. In this connection, when weighted calculation is not necessarily performed in response to the mobility detection device number, the mobility information detection device 6 does not necessarily provide its mobility detection device number.

Next, with respect to track-coupling candidates each correlated to mobility of two or more types, the mobility likelihood calculation part 335 calculates mobility values per each mobility type. The calculation process for calculating mobility likelihoods per each single mobility type is identical to the foregoing calculation process regarding track-coupling candidates each correlated to mobility values of the same type. After calculating mobility likelihoods per each mobility type, the mobility likelihood calculation part 335 multiplies mobility likelihoods and then performs normalization for calculating a radical root of the number of mobility likelihoods subjected to multiplication. Thus, it is possible to calculate mobility likelihoods with respect to mobility-attached track-coupling candidates including track-coupling candidates each correlated to two or more types of mobility. In the multiplication of mobility likelihoods calculated per each mobility type, it is possible to apply weight coefficients, corresponding to each mobility type, to mobility likelihoods and then multiply those mobility likelihoods together.

With respect to track-coupling candidates correlated with no mobility, the mobility likelihood calculation part 335 sets a constant (e.g. "1") to mobility likelihoods of those track-coupling candidates.

As described above, the mobility likelihood calculation part 335 multiplies and normalizes mobility likelihoods calculated based on track-coupling candidates ascribed to the same hypothesis, thus determined a mobility likelihood of the hypothesis. The normalization calculates a radical root of the number of track-coupling candidates ascribed to the same hypothesis.

The integration likelihood calculation part 335 integrates a track-coupling likelihood, an identification likelihood, and a mobility likelihood per each hypothesis. This integration process is realizing by multiplying the track-coupling likelihood, the identification likelihood, and the mobility likelihood. In this integration process, the mobility likelihood calculation part 335 may perform weighted multiplication on the track-coupling likelihood, the identification likelihood, and the mobility likelihood.

For instance, the track-coupling candidate generation part 31, the hypothesis generation part 32e, and the likelihood calculation part 33e (including the likelihood calculation control part 330e, the track-coupling likelihood calculation part 331, the identification likelihood calculation part 332, and the mobility likelihood calculation part 335) can be realized using a CPU of a computer that operates according to a mobile body track identification program. In this case, a program memory of a computer (not shown) stores the mobile body track identification program so that the CPU loads the program so as to implement the functions of the track-coupling candidate generation part 31, the hypothesis generation part 32e, and the likelihood calculation part 33e according to the program. Alternatively, it is possible to configure the track-coupling candidate generation part 31, the hypothesis generation part 32e, and the likelihood calculation part 33e by use of individual hardware elements. Additionally, it is possible to configure the likelihood calculation control part 330e, the track-coupling likelihood calculation part 331, the identification likelihood calculation part 332, and the mobility likelihood calculation part 335 by use of individual hardware elements.

Next, the operation of the mobile body track identification device 3e of Embodiment 6 will be described.

Figure 34:
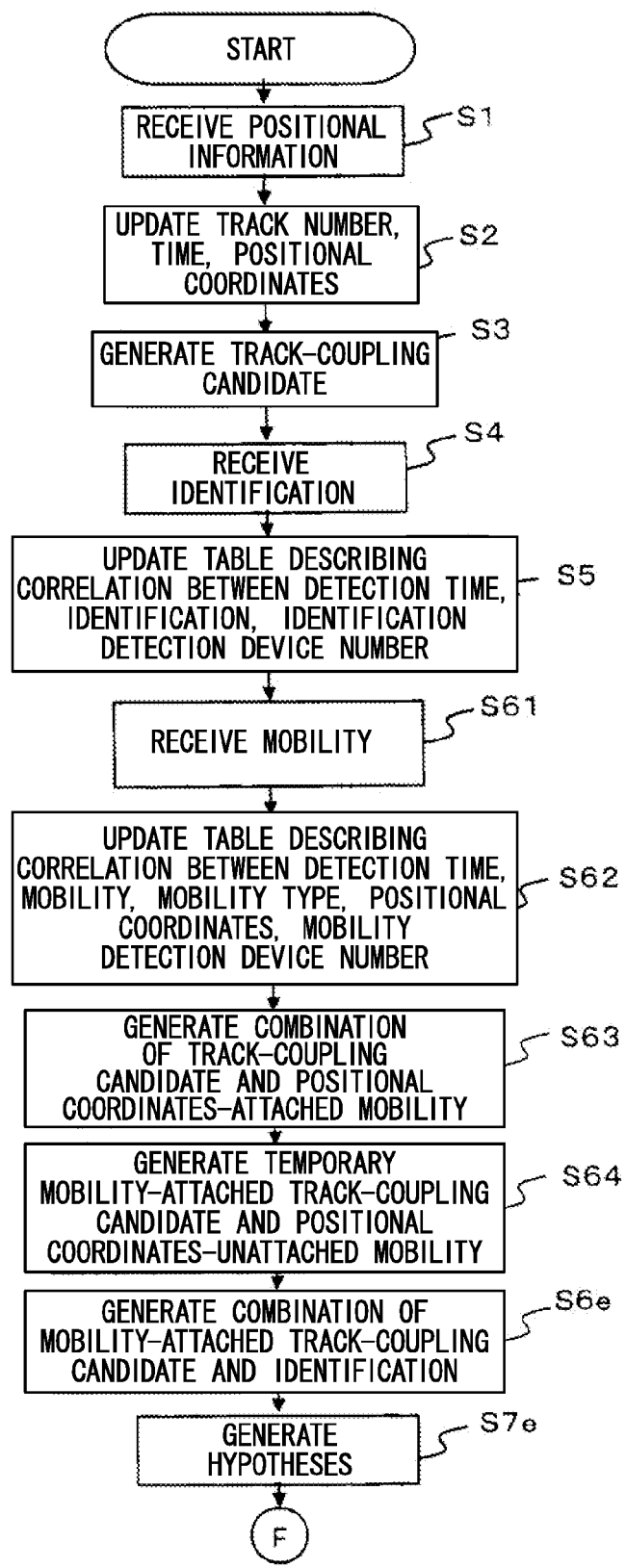
FIG. 34 A flowchart showing the operation of the mobile body track identification device according to Embodiment 6.
Figure 35:
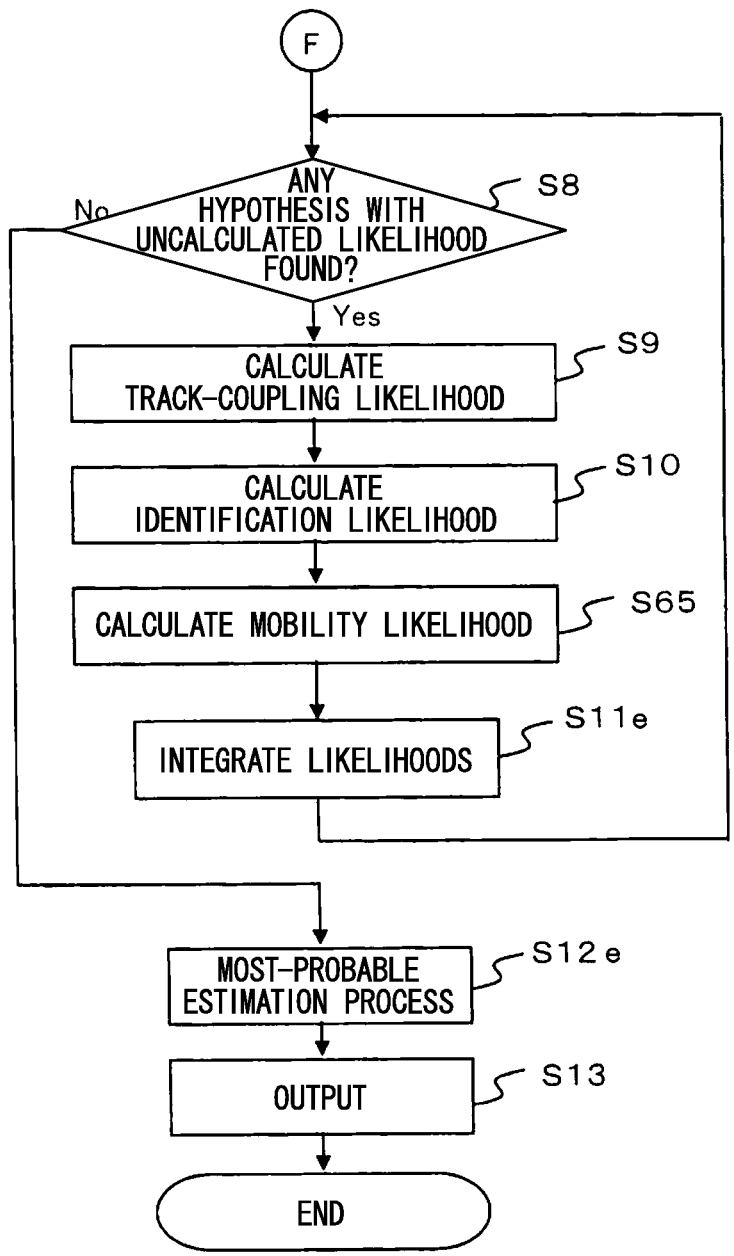
FIG. 35 A flowchart showing the operation of the mobile body track identification device according to Embodiment 6.

FIGS. 34 and 35 are flowcharts showing the processing of the mobile body track identification device 3e of Embodiment 6. Herein, the same steps as the steps of Embodiment 1 are designated by the same reference numerals; hence, descriptions thereof will be omitted. In FIG. 34, the process of updating the table describing identifications (i.e. steps S1 to S5) is identical to that of Embodiment 1.

The hypothesis generation part 32e receives combinations of detection times, mobility, its mobility type, positional coordinates, and mobility detection device numbers from the mobility information detection device 6 (step S61). The mobility information detection device 6 detects mobility of a mobile body so as to send it to the hypothesis generation part 32e. The hypothesis generation part 32e holds the correlation between detection times, mobility, its mobility type, positional coordinates, and mobility detection device numbers in the table.

The hypothesis generation part 32e holds mobility, which has been collected in a predetermined time in the past from the current time (i.e. the current detection time of the received mobility), received from the mobility information detection device 6. The hypothesis generation part 32e receives the current combination of a detection time, mobility, its mobility type, positional coordinates, and its mobility detection device number so as to additionally register it with the table while deleting the oldest mobility (step S62). For instance, the hypothesis generation part 32e has held the correlation between detection times, mobility, its mobility type, positional coordinates, and mobility detection device numbers at times t1 to tn-1. Upon receiving a combination of a detection time, mobility, its mobility type, positional coordinates, and its mobility detection device number at the current time tn, the hypothesis generation part 32e stores the mobility regarding the current time tn in the table while discarding the oldest mobility at time t1 from the table.

The hypothesis generation part 32e does not only store the updated table by itself but also sends it to the likelihood calculation part 33e.

Moreover, the hypothesis generation part 32e generates temporary mobility-attached track-coupling candidates (i.e. combinations of track-coupling candidates and mobility having positional coordinates) by use of mobility stored in the table updated in step S62 and track-coupling candidates received from the track-coupling candidate generation part 31 in step S3 (step S63). Specifically, the hypothesis generation part 32e chooses only the mobility values with positional coordinates from the received mobility values so as to select one mobility value with positional coordinates. Subsequently, the hypothesis generation part 32e calculates a euclidean distance between positional coordinates of the selected mobility value and a track-coupling candidate at the detection time with respect to all the track-coupling candidates combined with the selected mobility value. The hypothesis generation part 32e specifies a combination of the mobility value and a track-coupling candidate with the shortest euclidean distance, thus determining it as a temporary mobility-attached track-coupling candidate. This process is performed once with respect to all the mobility values with positional coordinates. With respect to a track-coupling candidate involving interruption of tracks, as described above, the hypothesis generation part 32e performs interpolation between interrupted tracks so as to specify positional coordinates of the track-coupling candidate, thus calculating a euclidean distance with positional coordinates of mobility. With respect to a track-coupling candidate including a plurality of tracks, which are detected at the mobility detection time, with a plurality of positional coordinates, a euclidean distance is calculated between a median point and positional coordinates of mobility.

In step S63, each of track-coupling candidates is not necessarily correlated to a single mobility value with positional coordinates; hence, each of them can be correlated to two or more mobility values with positional coordinates. Additionally, track-coupling candidates not correlated to mobility values with positional coordinates may exist.

Then, the hypothesis generation part 32e correlate mobility values with "null" positional coordinates (i.e. mobility values which are not selected in step S63) to temporary mobility-attached track-coupling candidates (step S64). In step S64, the hypothesis generation part 32e generates all combinations of mobility values with "null" positional coordinates and temporary mobility-attached track-coupling candidates, thus formulating them into "mobility-attached track-coupling candidates". When mobility values with "null" positional coordinates do not exist, the hypothesis generation part 32e formulates temporary mobility-attached track-coupling candidates into mobility-attached track-coupling candidates.

The hypothesis generation part 32e generates all combinations of mobility-attached track-coupling candidate/identification pairs by use of identifications stored in the table updated in step S5 and mobility-attached track-coupling candidates generated in step S64 (step S6e). The hypothesis generation part 32e solely focuses on track-coupling candidates in mobility-attached track-coupling candidates so as to generate all combinations of mobility-attached track-coupling candidate/identification pairs in the same way as step S6 of Embodiment 1.

Subsequently, the hypothesis generation part 32e generates sets of mobility-attached track-coupling candidate/identification pairs as hypotheses (step S7e). In step S7e, the hypothesis generation part 32e solely focuses on track-coupling candidates and identifications in mobility-attached track-coupling candidate/identification pairs so as to extract all the sets of mobility-attached track-coupling candidate/identification pairs satisfying the first to third conditions as similar to Embodiment 1, thus determining individual sets as hypotheses. The hypothesis generation part 32e sends hypotheses, generated therein, to the likelihood calculation part 33e.

After step S7e, the likelihood calculation part 33e performs a series of steps following step S8 shown in FIG. 35. A series of steps (i.e. steps S8 to S10) for determining the existence/nonexistence of hypotheses with uncalculated likelihoods and for calculating track-coupling likelihoods and identification likelihoods is identical to that of Embodiment 1. Upon determining existence of hypotheses with uncalculated likelihoods (i.e. hypotheses not subjected to a series of steps S9 to S11e) in step S8 (i.e. a decision result "Yes" of step S8), the likelihood calculation control part 330e selectively sends one of hypotheses with uncalculated likelihoods to the track-coupling candidate likelihood calculation part 331, the identification likelihood calculation part 332, and the mobility likelihood calculation part 335. Herein, calculation of track-coupling likelihoods and identification likelihoods (steps S9, S10) is identical to Embodiment 1; hence, descriptions thereof will be omitted.

The mobility likelihood calculation part 335 calculates mobility likelihoods with respect to received hypotheses (step S65). In step S65, the mobility likelihood calculation part 335 calculates mobility likelihoods with respect to individual track-coupling candidates ascribed to a hypothesis, calculates and normalizes mobility likelihoods with respect to track-coupling candidates ascribed to the same hypothesis, thus calculating a mobility likelihood of the hypothesis. Mobility values used for calculation of mobility likelihoods are provided from the hypothesis generation part 33e as combinations of detection times, mobility values, and mobility types after updating (i.e. after step S62).

After step S65 for calculating mobility likelihoods, the mobility likelihood calculation part 335 integrates a track-coupling likelihood of a hypothesis calculated in step S9, an identification likelihood of the hypothesis calculated in step S10, and a mobility likelihood calculated in step S65, thus storing the integration result in connection with the hypothesis (step S11e). In step S11e, the track-coupling likelihood, the identification likelihood, and the mobility likelihood calculated in steps S9, S10, and S65 are integrated by way of multiplication. In the integration process, the mobility likelihood calculation part 335 may apply weights to the track-coupling likelihood, the identification likelihood, and the mobility likelihood.

After step S11e, the likelihood calculation part 33e repeats a loop consisting of steps S8 to S11e. Upon determining nonexistence of hypotheses with uncalculated likelihoods in step S8 (i.e. a decision result "No" of step S8), the mobility likelihood calculation part 335 estimates a hypothesis with the highest integration value between the track-coupling likelihood, the identification likelihood, and the mobility likelihood as a most-probable hypothesis (step S12e). The mobility likelihood calculation part 335 sends the estimated most-probable hypothesis to the identification result output device 4.

Upon receiving the most-probable hypothesis estimated in step S12e, the identification result output device 4 determines which mobile body matches which track based on mobility-attached track-coupling candidate/identification pairs ascribed to the most-probable hypothesis (step S13). The identification result output device 4 may specifically display positional coordinates or track of a mobile body. In this connection, step S13 is identical to that of Embodiment 1.

In Embodiment 6, the mobility information detection device 6 detects mobility of a mobile body, so that the mobile body track identification device 3e utilizes mobility likelihoods, in addition to track-coupling likelihoods and identification likelihoods, for use in calculation of likelihoods of hypotheses. Even when track-coupling likelihoods and identification likelihoods do not solely contribute to determination of superiority/inferiority with respect to likelihoods of hypotheses and do not achieve accurate estimation as to which mobile body matches with track, mobility, which may represent differences of moving conditions of mobile bodies, may cause differences between likelihoods of hypotheses; hence, it is possible to accurately estimate which mobile body matches with track. Since a most-probable hypothesis is estimated based on the integration result of step S11e involving integration of mobility, it is possible to estimate which mobile body matches which track with a high precision.

It is possible to apply the foregoing variation of Embodiment to Embodiment 6, so that the likelihood calculation part 33d is reconfigured not to include the track-coupling likelihood calculation part 331 so as not to calculate track-coupling likelihoods. In this case, the mobility likelihood calculation part 335 solely integrate an identification likelihood and a mobility likelihood, thus estimating a hypothesis with the highest integration value as a most-probable hypothesis.

In Embodiment 6, the likelihood calculation part 33e may not necessarily include the track-coupling likelihood calculation part 331; hence, the mobile body track identification device 3e is reconfigured to include the track-coupling likelihood calculation part 331a as similar to Embodiment 2. In this case, the track-coupling likelihood calculation part 335 solely integrates identification likelihoods and mobility likelihoods so as to estimate a hypothesis with the highest integration value as a most-probable hypothesis. This constitution may demonstrate the same effect as the effect of Embodiment 2.

It is possible to combine Embodiment 5 with Embodiment 6 such that the likelihood calculation part 33e includes the attribute likelihood calculation part 334 (see FIG. 29) in addition to the track-coupling likelihood calculation part 331, the identification likelihood calculation part 332, and the mobility likelihood calculation part 335. In this case, the mobile body track identification system needs to include the attribute detection device 5 as well. In the integration process of likelihoods, it is possible to integrate track-coupling likelihoods, identification likelihoods, mobility likelihoods, and attribute likelihoods, thus estimating a most-probable hypothesis based on the integration result.

Moreover, it is possible to create the constitution combining Embodiment 3 with Embodiment 6 or its variation, or it is possible to create the constitution combining Embodiment 4 with Embodiment 6 or its variation. Alternatively, it is possible to create the constitution combining Embodiments 3 and 4 with Embodiment 6 or its variation.

Embodiment 7

Figure 36:
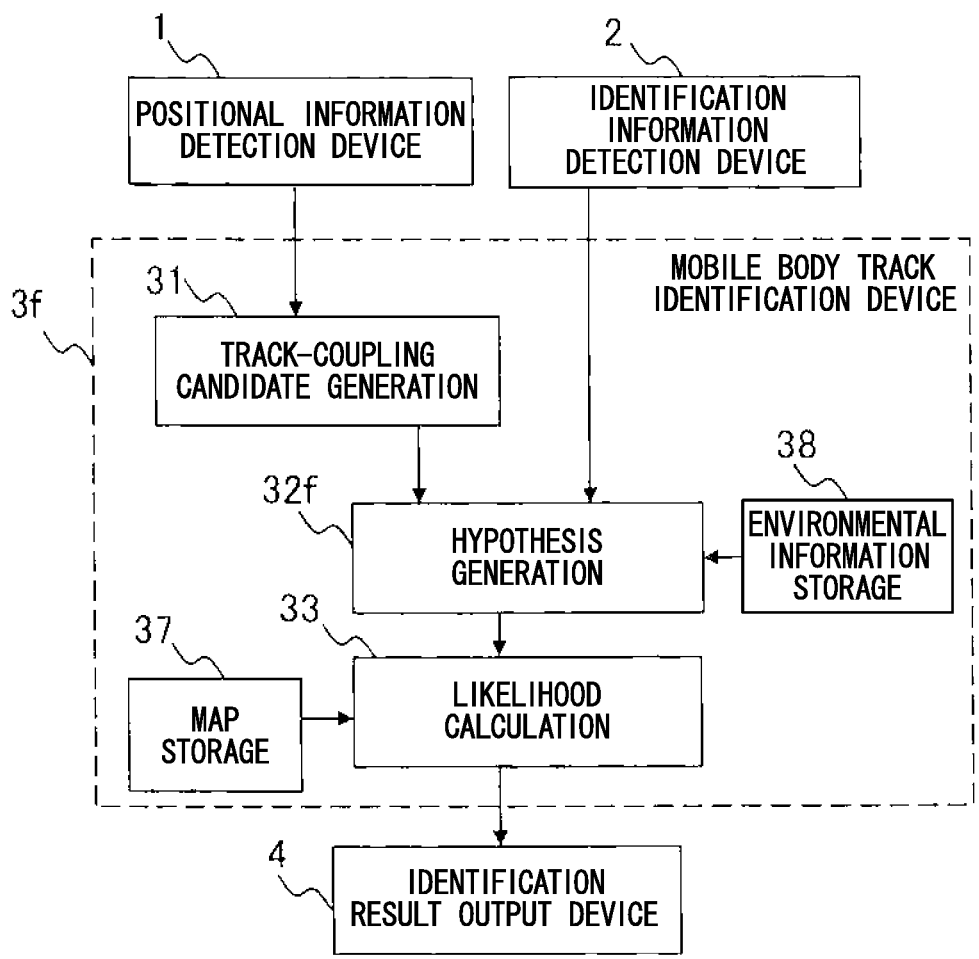
FIG. 36 A block diagram showing the constitution of a mobile body track identification device in a mobile body track identification system according to Embodiment 7 of the present invention.

FIG. 36 is a block diagram of a mobile body track identification system according to Embodiment 7 of the present invention. Herein, the same constituent parts as the constituent parts of Embodiment 1 are designated by the same reference numerals; hence, descriptions thereof will be omitted. The mobile body track identification system of Embodiment 7 includes the positional information detection device 1, the identification information detection device 2, a mobile body track identification device 3f, and the identification result output device 4. The mobile body track identification device 3f of Embodiment 7 includes the track-coupling candidate generation part 31, a hypothesis generation part 32f, the likelihood calculation part 33, the map storage 37, and an environmental information storage 38.

The environmental information storage 38 stores indexes, representing the position of obstruction that exists in the tracking area 50 and a transient time in which a mobile body passes by the position of obstruction, as environmental information. The following description refers to environmental information including indexes, representing the position of obstruction and a transient time in which a mobile body passes by the position of obstruction, but it is possible to employ other elements as environmental information. Other examples of environmental information will be described later. Additionally, the following description refers to an index representing a transient time, in which a mobile body passes by the position of obstruction, as "cost".

Similar to Embodiment 1, the hypothesis generation part 32f receives track-coupling candidates from the track-coupling candidate generation part 31 while receiving identifications from the identification information detection device 2. Additionally, the hypothesis generation part 32f reads environmental information from the environmental information storage 38.

With respect to a track-coupling candidate involving interruption of tracks, the hypothesis generation part 32f calculates a transient time of a mobile body during interruption of tracks in the track-coupling candidate based on a track disappearance time and a track appearance time. Hereinafter, this transient time will be referred to as a real transient time. Additionally, the hypothesis generation part 32f calculates a moving distance of a mobile body during the real transient time so as to estimate a time in which the mobile body moves in the moving distance based on environmental information. Hereinafter, this estimation value will be referred to as an estimated transient time. The track-coupling candidate, in which the estimated transient time is longer than the real transient time, is discarded from track-coupling candidates used for generation of hypotheses. That is, the hypothesis generation part 32f generates hypotheses by use of track-coupling candidates, in which estimated transient times are shorter than real transient times, and track-coupling candidates not involving interruption of tracks.

Figure 37:
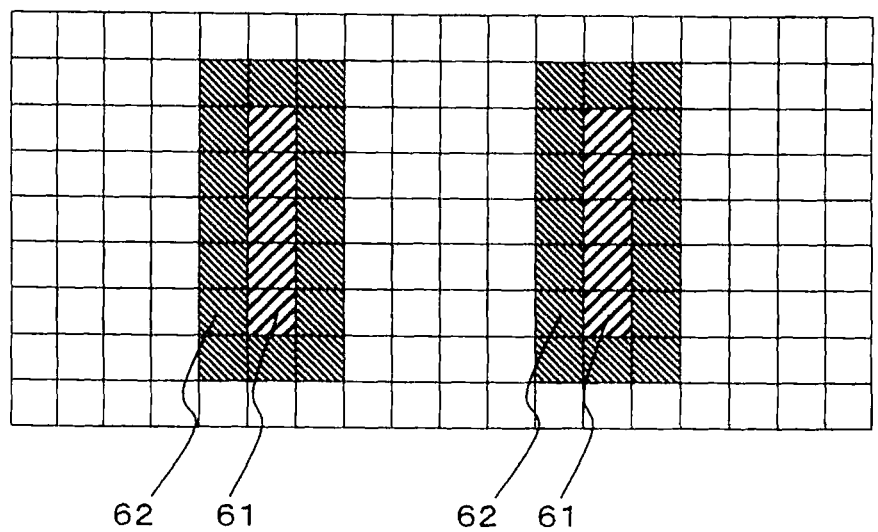
FIG. 37 A diagrammatic illustration of a rejection decision procedure on track-coupling candidates according to environmental information of an obstruction map in Embodiment 7.

Next, the processing for calculating real transient times and estimated transient times and for determining whether or not track-coupling candidates need to be discarded will be described in conjunction with specific examples of environmental information. FIG. 37 is a schematic illustration of environmental information. Herein, the tracking area 50 is divided into a plurality of areas, so that costs defined in divided areas are used as environmental information stored in the environmental information storage 38. Hereinafter, divided areas will be referred to as cells. Specifically, the tracking area is divided into 18×9=192 cells. Herein, cost "0" is set to areas (i.e. while cells in FIG. 37) involving nonexistence of obstruction. Higher costs are set to cells which need longer times for mobile body to pass by due to existence of obstruction. In the tracking area shown in FIG. 37, obstacles exist in areas 61, 62. A cost "3.0" is set to a cell corresponding to the center area 61 involving existence of obstruction, whilst a cost "0.5" is set to a cell corresponding to the peripheral area 62 involving existence of obstruction. Cells whose costs are not "0" indicate existence of obstruction. The above setting of environmental information will be referred to as an obstruction map.

The hypothesis generation part 32f calculates a real transient time from a track disappearance time to a next track appearance time with respect to a track-coupling candidate.

Additionally, the hypothesis generation part 32f interpolates a straight line between positional coordinates at track disappearance and positional coordinates of next track appearance in a track-coupling candidate. The hypothesis generation part 32f calculates positional coordinates, within a range of positional coordinates on the interpolated line, at a detection time (i.e. a detection time of positional information and identifications) of a real transient time (in other words, a track interrupted time). The hypothesis generation part 32f calculates the sum of costs set to the cells corresponding to those positional coordinates.

The hypothesis generation part 32f calculates a distance between a track disappearance time and a next track appearance time in a track-coupling candidate, thus determining the distance as a moving distance a moving distance of a mobile body involving interruption of tracks. The hypothesis generation part 32f divides the moving distance of a mobile body involving interruption of tracks by an upper-limit value of the moving speed of a mobile body, and adds the sum of costs to the division result, thus determining the addition result as an estimated transient time. In this connection, the upper-limit value of the moving speed of a mobile body is determined in advance and retained in the hypothesis generation part 32f.

The hypothesis generation part 32f performs the above processing on track-coupling candidates involving interruption of tracks. Subsequently, it precludes track-coupling candidates, in which estimated transient times are longer than real transient times, from track-coupling candidates used for generation of hypotheses.

Figure 38:
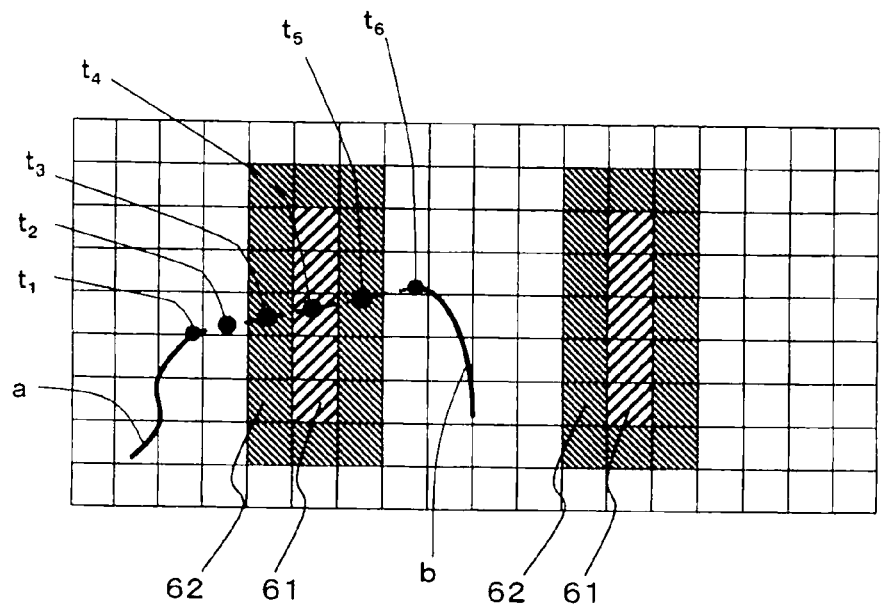
FIG. 38 An illustration indicative of a comparison between a real transit time, which is calculated between a track-disappearing time and a next track-appearing time, and an estimated transit time, which is calculated based on track-disappearing position coordinates and next track-appearing position coordinates, in each track-coupling candidate with an interruption of its track.

Next, a specific calculation method of real transient times and estimated transient times will be described. It focuses on a track-coupling candidate including tracks a, b shown in FIG. 38. The track a has a disappearance time t1 whilst the track b has an appearance time t6. Herein, the time t1 is earlier than the time t6. Additionally, the track a has positional coordinates of disappearance (Xa, Ya) whilst the track b has positional coordinates of appearance (Xb, Yb).

First, the hypothesis generation part 32f calculates a real transient time involving interruption of tracks by way of t6−t1.

Next, the hypothesis generation part 32f interpolates a straight line between positional coordinates of disappearance (Xa, Ya) of the track a and positional coordinates of appearance (Xb, Yb) of the track b, thus calculating positional coordinates, within a range of positional coordinates on the line, in detection times t2 to t5 that fall within the real transient time. In this connection, costs "0", "0.5", "3.0", and "0.5" are set to the cells at the positions of times t2, t3, t4, and t5; hence, the sum of costs in the interpolation interval is "0+0.5+3.0+0.5=4.0".

The hypothesis generation part 32f calculates a moving distance L of a mobile body during interruption of tracks via Equation 5.

$$L = \sqrt{(Xa-Xb)^2 + (Ya-Yb)^2}$$ [Equation 5]

The hypothesis generation part 32f calculates an estimated transient time Tm via Equation 6.

$$Tm = \frac{L}{V\max} + C$$ [Equation 6]

In Equation 6, L denotes the moving distance calculated via Equation 5, and Vmax denotes a value that is determined as the upper-limit value of a moving speed of a mobile body in advance. Additionally, C denotes the sum of costs in an interpolated space, which is "4.0" in FIG. 38.

The hypothesis generation part 32f discards the track-coupling candidate including the tracks a, b when the estimated transient time Tm calculated via Equation 6 is longer than the real transient time t6−t1.

Due to existence of obstruction, higher costs are set to cells that require longer times for a mobile body to pass by in the obstruction map. The costs in FIG. 38 have a correcting function for increasing a transient time that allows a mobile body to pass through the path, interpolated between the tracks a, b, involving existence of obstruction.

A straight line is interpolated between interrupted tracks with respect to track-coupling candidates that are allowed to remain without being discarded, so that positional coordinates are calculated at detection times (times t2 to t5 in FIG. 38) in the interpolated portion. By using track-coupling candidates that are allowed to remain without being discarded, the hypothesis generation part 32f generates track-coupling candidate/identification pairs, thus generating hypotheses. The generation process of track-coupling candidate/identification pairs and hypotheses is identical to that of Embodiment 1.

In the above description, the environmental information storage 38 stores environmental information using indexes (cost) representing the position of obstruction and a transient time in which a mobile body passes by the position of obstruction. The environmental information storage 38 may store a transient time, in which a mobile body moves along a passable path in a tracking area, as environmental information. The processing of the hypothesis generation part 32f using this environmental information (i.e. a process of determining whether to discard track-coupling candidates) will be described below.

When environmental information uses a transient time of a mobile body along a passable path in a tracking area, the hypothesis generation part 32f calculates a real transient time of a mobile body during interruption of tracks based on a track disappearance time and a next track appearance time with respect to a track-coupling candidate involving interruption of tracks. With reference to environmental information, the hypothesis generation part 32f calculates an estimated transient time along a passable path, which leads from the proximity of a track disappearance position to the proximity of a track appearance position in a track-coupling candidate. The hypothesis generation part 32f discards a track-coupling candidate, which is currently focused on, in which the estimated transient time calculated based on environmental information is longer than the real transient time.

Figure 39:
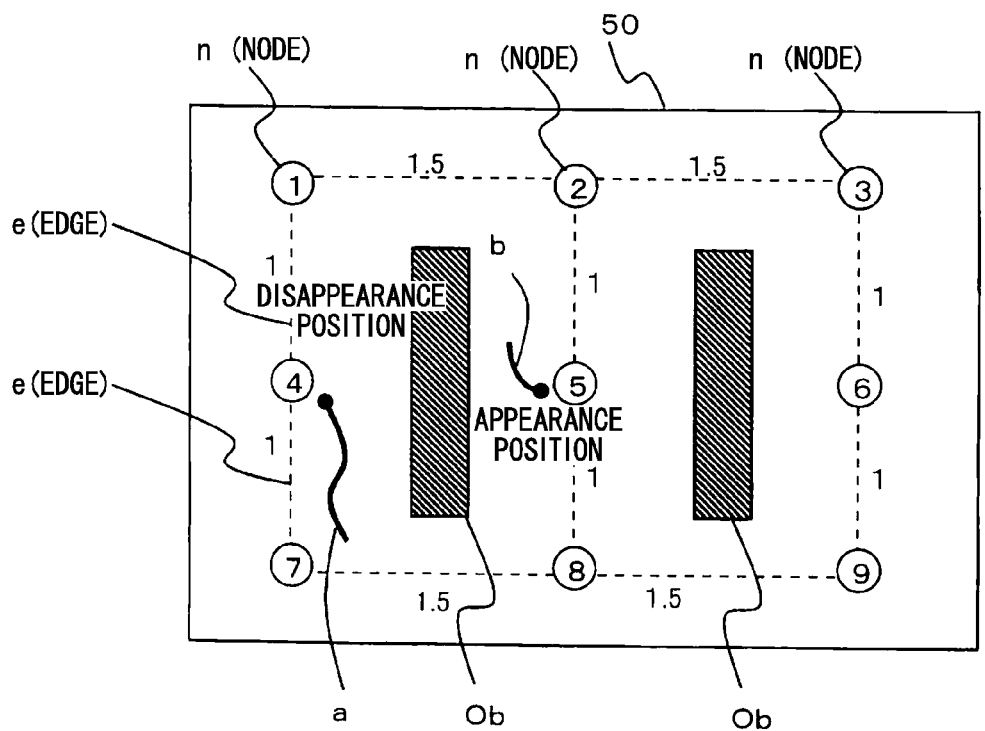
FIG. 39 A diagrammatic illustration of a rejection decision procedure on track-coupling candidates according to environmental information of a path graph in Embodiment 7.

FIG. 39 schematically shows environmental information which is applied to a transient time of a mobile body along a passable path in a tracking area. This environmental information locates a plurality of nodes n in areas not involving existence of obstacles Ob serving as obstruction to a mobile body in a tracking area. The nodes n are points representing positional coordinates at which a mobile body may exist in a tracking area with arbitrary resolutions. Additionally, edges e satisfying a condition of not intersecting with obstacles Ob are selected from among edges connecting between the nodes n. Straight lines are used at the edges e. FIG. 39 shows the setting of nine nodes n, which are allocated with node identification number "1" to "9". Edges such as an edge e connecting between nodes 1, 2 and an edge e connecting between nodes 2, 5 are selected as edges not intersecting with the obstacles Ob. Herein, edges such as an edge connecting between nodes 4, 5 and an edge connecting between nodes 5, 6 are not selected because they intersect with the obstacles Ob. Transient times are set to individual edges e along which a mobile body passes through. In this connection, transient times set to edges will be referred to as costs. In FIG. 39, costs are described along with the edges e. For instance, "1" is set to the transient time (cost) in which a mobile body moves along the edge e connecting between nodes 1, 4. Additionally, "1.5" is set to the transient time (cost) in which a mobile body moves along the edge e connecting between nodes 1, 2. The positions of nodes n and the costs of edges e are determined as environmental information representing transient times in passable paths for a mobile body in advance, so that the environmental information is stored in the environmental information storage 38. This environmental information is defined as a path graph representing the correlation between edges and costs.

The hypothesis generation part 32f interpolates edges between the proximity of track disappearance position and the proximity of track appearance position in a track-coupling candidate, thus calculating the sum of costs along the interpolated edges as an estimated transient time ranging from the proximity of track disappearance position to the proximity of track appearance position. The hypothesis generation part 32f discards a track-coupling candidate, which is currently focused on, in which the estimated transient time (i.e. sum of costs of interpolated edges) is longer than the real transient time.

Next, the processing of interpolating edges as paths between tracks will be described. The following description refers to the case where paths are interpolated between the tracks a, b shown in FIG. 39. Herein, the appearance time of the track a is earlier so that appearance of the track b is detected after disappearance of the track a.

The hypothesis generation part 32f calculates distances between positional coordinates of disappearance of the track a and nodes so as to select a node which is the closest to positional coordinates of disappearance of the track a. Similarly, the hypothesis generation part 32f calculates distances between positional coordinates of appearance of the track b and nodes so as to select a node which is the closest to positional coordinates of appearance of the track b. In FIG. 39, the hypothesis generation part 32f selects node 4 which is the closest to positional coordinates of disappearance of the track a while selecting node 5 which is the closest to positional coordinates of appearance of the track b.

Next, the hypothesis generation part 32f searches for a path connecting between the selected two nodes 4, 5 on a graph, thus calculating the sum of costs corresponding to edges included in the searched path. Subsequently, the hypothesis generation part 32f discards a track-coupling candidate, which is currently focused on, in which the sum of costs of edges included in the searched path (i.e. an estimated transient time) is larger than a real transient time (i.e. a time between a detection time of disappearance of the track a and a detection time of appearance of the track b).

In the case where a plurality of paths connecting between the selected two nodes 4, 5 exists, the paths connecting these nodes may have different combinations of interpolated edges. In this case, the hypothesis generation part 32f handles paths between the two nodes 4, 5 (i.e. combinations of interpolated edges) as different track-coupling candidates, thus comparing the sum of cost of edges with a real transient time per each track-coupling candidate. Subsequently, it discards track-coupling candidates in which the sum of costs of interpolated edges is larger than the real transient time while adopting track-coupling candidates, in which the sum of costs of interpolated edges is lower than or equal to the real transient time, for use in generation of track-coupling candidate/identification pairs and hypotheses.

In FIG. 39, a "first path" denoted by nodes 4(R)1(R)2(R)5, a "second path" denoted by nodes 4(R)7(R)8(R)5, and a "third path" denoted by nodes 4(R)1(R)2(R)3(R)6(R)9(R)8(R)5 can be presumed as paths between the two nodes 4, 5. Other paths may exist, but the first to third paths are subjected to consideration. The sum of costs along the first path is "1+1.5+1=3.5", whilst the sum of costs along the second path is "3.5" as well. Additionally, the sum of costs along the third path is "8.5".

With respect to a real transient time (i.e. a time from a detection time of disappearance of the track a and a detection time of appearance of the track b) less than 3.5, the sum of costs owing to interpolation of any one of the first to third paths becomes larger than the real transient time; hence, the hypothesis generation part 32f discards track-coupling candidates including the tracks a, b.

With respect to a real transient time that is equal to or above 3.5 but less than 8.5, the sum of costs owing to interpolation of either the first path or the second path is larger than the real transient time, the hypothesis generation part 32f adopts a track-coupling candidate interpolating the first path between the tracks a, b and a track-coupling candidate interpolating the second path between the tracks a, b for use in generation of track-coupling candidate/identification pairs and hypotheses. At this time, the hypothesis generation part 32f calculates positional coordinates along paths at various detection times (i.e. detection times of positional information, and detection times of identifications) that occur in a real transient time from a detection time of disappearance of the track a and a detection time of appearance of the track b. In this connection, a track-coupling candidate interpolating the third path between the tracks a, b is discarded because the sum of costs along the third path is larger than the real transient time.

As shown in FIG. 39, numeral paths arbitrarily connecting between two nodes may exist in a path graph configured of closed circuitry. In this case, the upper limit is determined with respect to the cost of an interpolated path, so that paths in which the sum of costs exceeds the upper limit are precluded from the interpolation process between tracks.

As described above, the hypothesis generation part 32f performs track-coupling candidate search/discard processes by use of the obstruction map (see FIG. 37) as environmental information or the path graph (see FIG. 39) as environmental information. For this reason, the hypothesis generation part 32f may determine whether or not to discard track-coupling candidates by use of either one of environmental information, but it is possible to makes a decision whether to discard track-coupling candidates by use of both the environmental information. Alternatively, the hypothesis generation part 32f may determine whether to discard track-coupling candidates by use of a different manner of environmental information rather than the obstruction map or the path graph.

In this connection, the track-coupling candidate generation part 31, the hypothesis generation part 32f, and the likelihood calculation part 33 can be realized using a CPU of a computer that operates according to a mobile body track identification program. In this case, a program memory of a computer (not shown) stores the mobile body track identification program so that the CPU loads the program to achieve the functions of the track-coupling candidate generation part 31, the hypothesis generation part 32f, and the likelihood calculation part 33.

Next, the operation of the mobile body track identification device 3f of Embodiment 7 will be described.

Figure 40:
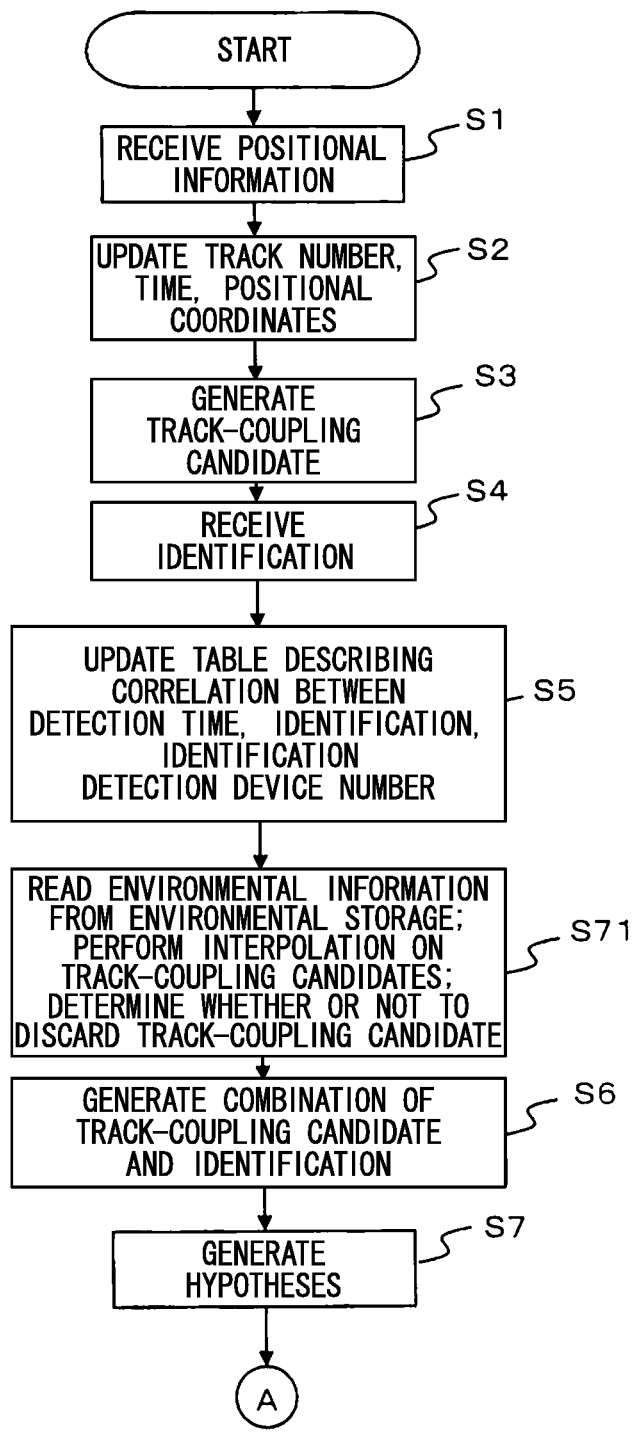
FIG. 40 A flowchart showing the operation of the mobile body track identification device according to Embodiment 7.

FIG. 40 is a flowchart showing the processing of the mobile body track identification device 3f of Embodiment 7. Herein, the same steps as the steps of Embodiment 1 are designated by the same reference numerals; hence, descriptions thereof will be omitted.

In FIG. 40, a series of steps (i.e. steps S1 to S5) for updating the table describing identifications is identical to that of Embodiment 1.

After step S5, the hypothesis generation part 32f reads environmental information from the environmental information storage 38 so as to determine whether or not to generate track-coupling candidate/identification pairs and hypotheses with respect to track-coupling candidates involving interruption of tracks (step S71). That is, the hypothesis generation part 32f determines whether or not to use track-coupling candidate involving interruption of tracks for generation of hypotheses. The details of step S71 have been described above.

After step S71, the hypothesis generation part 32f generates track-coupling candidate/identification pairs by use of track-coupling candidates which are allowed to remain without being discarded (step S6). The method of generating track-coupling candidate/identification pairs in Embodiment 7 is identical to that of Embodiment 1. Subsequently, the hypothesis generation part 32f generates hypotheses by use of track-coupling candidate/identification pairs (step S7). The method of generation hypotheses in Embodiment 7 is identical to that of Embodiment 1.

Figure 5:
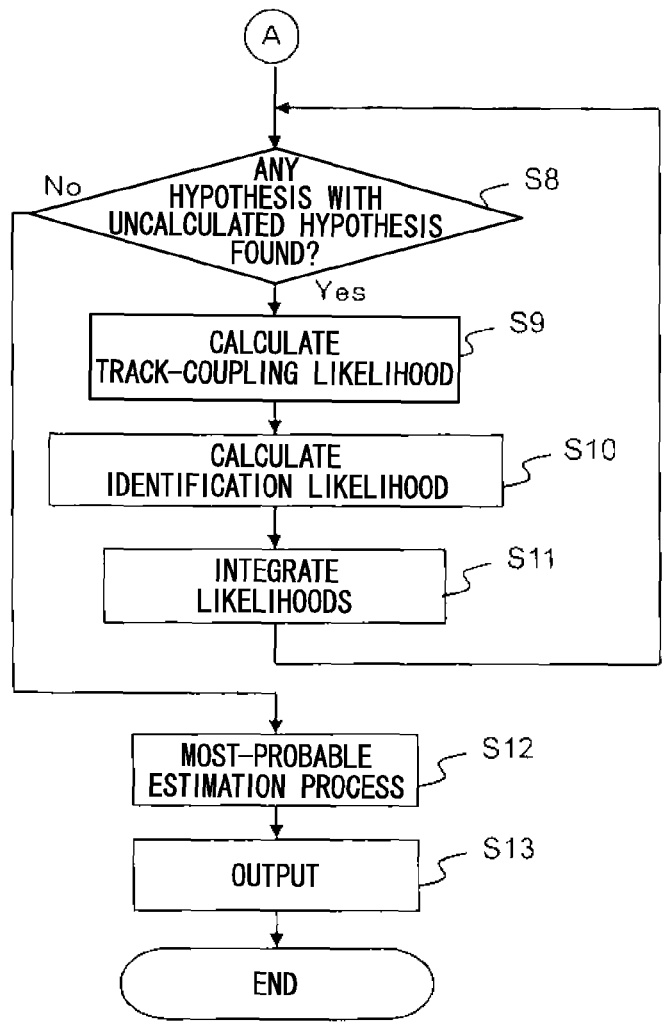
FIG. 5 A flowchart showing the operation of the mobile body track identification device.

The processing after generation of hypotheses is identical to the foregoing processing of Embodiment 1 after step S8 shown in FIG. 5; hence, description thereof will be omitted.

Embodiment 7 is able to accurately perform interpolation of track-coupling candidates by use of environmental information stored in the environmental information storage 38. As a result, it is possible to accurately specify positional coordinates of interpolated portions during calculation of identification likelihoods; hence, it is possible to accurately calculate identification likelihoods. By discarding track-coupling candidates, in which a path interpolated between two tracks overlaps with obstruction, from those for use in generation of hypotheses, it is possible to reduce the number of hypotheses generated by the hypothesis generation part 32f, thus achieving high-speed processing of calculating likelihoods.

Next, variations of Embodiment 7 will be described. That is, it is possible to apply the foregoing variation of Embodiment 1 to Embodiment 7 so that the likelihood calculation part 33 does not include the track-coupling likelihood calculation part 331 so as not to calculate track-coupling likelihoods. In this case, the identification likelihood calculation part 332 estimates a hypothesis with the highest identification likelihood as a most-probable hypothesis.

Similar to Embodiment 2, the likelihood calculation part 33 of Embodiment 7 may not include the track-coupling likelihood calculation part 331 whilst the mobile body track identification device 3f may include the track-coupling candidate calculation part 331a. In this case, the identification likelihood calculation part 332 estimates a hypothesis with the highest identification likelihood as a most-probable hypothesis. This constitution can demonstrate the same effect as the effect of Embodiment 2.

It is possible to combine Embodiment 5 with Embodiment 7 such that the likelihood calculation part 33 includes the attribute likelihood calculation part 334 in addition to the likelihood calculation control part 330, the track-coupling likelihood calculation part 331, and the identification likelihood calculation part 332. In this case, the mobile body track identification system needs to include the attribute information detection device 5.

It is possible to combine Embodiment 6 with Embodiment 7 such that the likelihood calculation part 33 includes the mobility likelihood calculation part 335 in addition to the likelihood calculation control part 330, the track-coupling likelihood calculation part 331, and the identification likelihood calculation part 332. In this case, the mobile body track identification system needs to include the mobility information detection device 6.

Moreover, it is possible to realize the constitution combining Embodiment 3 with Embodiment 7 or its variation, and it is possible to realize the constitution combining Embodiment 4 with Embodiment 7 or its variation. Additionally, it is possible to realize the constitution combining Embodiments 3 and 4 with Embodiment 7 or its variation.

Figure 41:
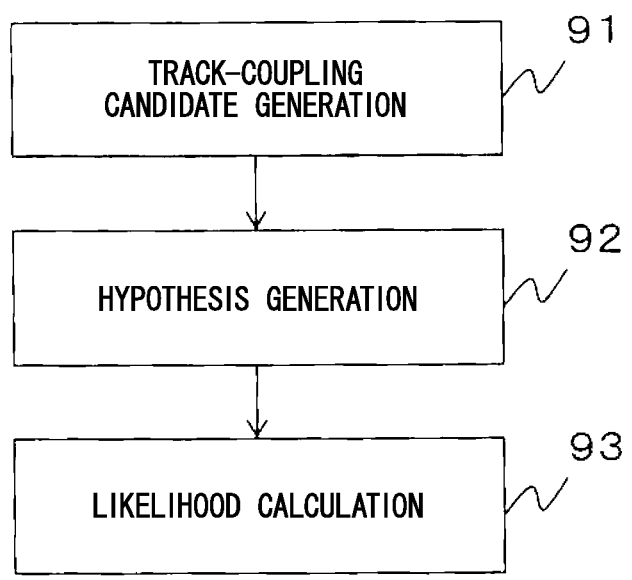
FIG. 41 A block diagram showing the minimum constitution of a mobile body track identification system according to the present invention.

Next, the minimum constitution of the present invention will be described. FIG. 41 is a block diagram showing the minimum constitution of a mobile body track identification system of the present invention. The mobile body track identification system of FIG. 41 includes a track-coupling candidate generation part 91, a hypothesis generation part 92, and a likelihood calculation part 93.

The track-coupling candidate generation part 91 (which is equivalent to the track-coupling candidate generation parts 31, 31c) generates track-coupling candidates corresponding to combinations of tracks which have been detected in a predetermined in the past.

The hypothesis generation part 92 (which is equivalent to the hypothesis generation parts 32, 32c) generates sets of track-coupling candidate/identification pairs combining track-coupling candidates generated by the track-coupling candidate generation part 91 and identifications which have been detected in a predetermined time in the past, thus generating hypotheses corresponding to sets of track-coupling candidate/identification pairs satisfying a predetermined condition (which is equivalent to the first to third conditions).

The likelihood calculation part 93 (which is equivalent to the likelihood calculation parts 33, 33a, 33b, 33c) selects individual hypotheses so as to calculate identification likelihoods representing likelihoods of detecting identifications with respect to tracks specified by track-coupling candidates included in each of track-coupling candidate/identification pairs ascribed to the selected hypothesis. Subsequently, the likelihood calculation part 93 integrates identification likelihoods so as to calculate an identification likelihood of the selected hypothesis, thus estimating a most-probable hypothesis based on it.

Since the minimum constitution uses track-coupling candidates and identifications which have been detected in a predetermined time in the past, it is possible to determine which mobile body matches which detected track with a high precision irrespective of frequent interruption of tracks of a mobile body.

Embodiments 1 to 7 and their variations can be summarized in mobile body track identification systems with the following constitutions.

(1) A mobile body track identification system includes a track-coupling candidate generation part (31, 31c) that generates track-coupling candidates combining tracks detected in a predetermined time in the past; a hypothesis generation part (32, 32c) that generates hypotheses corresponding to sets of track-coupling candidate/identification pairs, which combine track-coupling candidates generated by the track-coupling candidate generation part with identifications of mobile bodies detected in the predetermined time in the past, satisfying a predetermined condition (first to third conditions); and a likelihood calculation part (33, 33a, 33b, 33c) which selects individual hypotheses so as to calculate identification likelihoods representing likelihoods of detecting identifications with respect to tracks specified by track-coupling candidates included in each of track-coupling candidate/identification pairs ascribed to the selected hypothesis and which integrates identification likelihoods per each track-coupling candidate/identification pair so as to calculate an identification likelihood of the selected hypothesis, thus estimating a most-probable hypothesis based on it.

(2) The mobile body track identification system further includes a map storage (37) that stores a probability map defining detection probabilities of identifications of mobile bodies at various positions in a tracking area. Herein, the likelihood calculation part includes a likelihood calculation control part (330) that selects individual hypotheses; an identification likelihood calculation part (332, 332b, 332c) which specifies the position of a mobile body based on tracks, indicated by track-coupling candidates, at each of detection times of identifications included in track-coupling candidate/identification pairs ascribed to the selected hypothesis, which specifies a detection probability at the position from the probability map, which calculates identification likelihoods with respect to track-coupling candidate/identification pairs by use of the detection probability, and which integrates identification likelihoods so as to calculate an identification likelihood of the selected hypothesis; and a most-probable estimation part (i.e. the identification likelihood calculation parts 332, 332b, 332c, or the attribute likelihood calculation part 334, or the mobility likelihood calculation part 335) that estimates a most-probable hypothesis based on identification likelihoods of hypotheses.

(3) The mobile body track identification system further includes a likelihood calculation part (34) that stores track/identification correlation likelihoods representing likelihoods of correlating tracks to identifications. After the identification likelihood calculation part (332b) estimates a most-probable hypothesis, a track/identification correlation likelihood is calculated with respect to the current combination of a track and an identification included in track-coupling candidates, corresponding to track-coupling candidate/identification pairs ascribed to the most-probable hypothesis and all the hypotheses generated by the hypothesis generation part, so that the track/identification correlation likelihood is stored in the likelihood storage. To calculate identification likelihoods with respect to track-coupling candidate/identification pairs, an identification likelihood per each track-coupling candidate/identification pair is calculated based on the track/identification correlation likelihood corresponding to the current combination of a track and an identification as well as a detection probability which is specified per each identification detection time.

The above constitution is able to reflect identifications, which had been previously detected before the predetermined time in the past in calculating identification likelihoods by use of track/identification correlation likelihoods; hence, it is possible to further improve a precision of correlating tracks to identifications.

(4) The mobile body track identification system further includes a hypothesis storage (333) that stores all the hypotheses generated by the hypothesis generation part together with a most-probable hypothesis, and an information history variation determination part (35) that determines whether or not variations occur in identifications detected in a predetermined time in the past. When the information history variation determination part determines that variations occur in retrieved information, the track-coupling candidate generation part generates track-coupling candidates, so that the hypothesis generation part (32c) generates hypotheses and selects individual hypotheses. On the other hand, when the information history variation determination part determines that no variations occur in retrieved information, individual hypotheses are selected from among hypotheses stored in the hypothesis storage. Additionally, when the information history variation determination part determines that variations occur in retrieved information, a most-probable hypothesis is estimated based on hypotheses generated by the hypothesis generation part, so that all the hypotheses are stored in the hypothesis storage together with the most-probable hypothesis.

The above constitution does not repetitively generate the same hypotheses even when the hypothesis generation part repetitively generates the same hypotheses as the previously generated hypotheses; hence, it is possible to reduce the amount of calculation in correlating tracks to identifications.

(5) In the mobile body track identification system, the hypothesis generation part correlates attributes of mobile bodies, which have been detected in a predetermined time in the past, to track-coupling candidates so as to generate hypotheses corresponding to sets of track-coupling candidate/identification pairs, combining track-coupling candidates correlated to attributes with identifications detected in the predetermined time in the past, satisfying a predetermined condition. The likelihood calculation part includes an attribute likelihood calculation part (334) which calculates an attribute likelihood, representing a likelihood of each of attributes, correlated to track-coupling candidates, indicating the same mobile body, per each of track-coupling candidates included in track-coupling candidate/identification pairs ascribed to each hypothesis selected from among hypotheses, wherein it integrates attribute likelihoods per each track-coupling candidate/identification pair so as to calculates an attribute likelihood of the selected hypothesis. Additionally, the most-probable estimation part estimates a most-probable hypothesis based on identification likelihoods and attribute likelihoods of hypotheses.

(6) In the mobile body track identification system, the hypothesis generation part generates hypotheses corresponding to sets of track-coupling candidate/identification pairs, combining track-coupling candidates correlated to mobility values of mobile bodies detected in a predetermined time in the past and identifications detected in the predetermined time in the past, satisfying a predetermined conditions. The likelihood calculation part includes a mobility likelihood calculation part (335) which calculates mobility values correlated to track-coupling candidates and mobility likelihoods representing likelihoods of correlating mobility values, calculated based on track-coupling candidates, to the same mobile body with respect to track-coupling candidates included in track-coupling candidate/identification pairs ascribed to each hypothesis selected from among hypotheses, and then integrates mobility likelihoods per each track-coupling candidate/identification pair, thus calculating a mobility likelihood pertaining to the selected hypothesis. Additionally, the most-probable estimation part estimates a most-probable hypothesis based on identification likelihoods and mobility likelihoods of hypotheses.

(7) The likelihood calculation part includes a track-coupling likelihood calculation part (331) which calculates a track-coupling likelihood representing a likelihood of connecting tracks included in a track-coupling candidate per each of track-coupling candidates included in track-coupling candidate/identification pairs ascribed to each hypothesis selected from among hypotheses generated by the hypothesis generation part. Additionally, the most-probable estimation part estimates a most-probable hypothesis based on identification likelihoods and track-coupling likelihoods of hypotheses.

The above constitution estimates a most-probable hypothesis in consideration of not only identification likelihoods but also track-coupling likelihoods, thus improving a precision of correlating tracks to identifications.

(8) The track-coupling likelihood calculation part calculates track-coupling likelihoods based on detection times and positional coordinates which are detected with respect to a mobile body defining its tracks.

(9) The track-coupling likelihood calculation part (331a) calculates a track-coupling likelihood representing a likelihood of connecting tracks included in a track-coupling candidate per each of track-coupling candidates generated by the track-coupling candidate generation part, thus selecting track-coupling candidates whose track-coupling likelihoods are equal to or above a threshold. The hypothesis generation part generates hypotheses by use of the selected track-coupling candidates.

The above constitution is able to reduce the number of hypotheses generated by the hypothesis generation part, thus achieving high-speed processing of correlating tracks to identifications.

(10) The mobile body track identification system includes an environmental information storage (338) which stores environmental information by use of indexes representing the position of obstruction which exists in a tracking area of a mobile body and a transient time in which a mobile body passes by the position of obstruction. Herein, the hypothesis generation part calculates a real transient time from a track disappearance detection time to a next track appearance detection time with respect to a track-coupling candidate while estimating a transient time of the mobile body, from a track disappearance time to a next track appearance time, based on environmental information. Track-coupling candidates, in which the estimated transient time is longer than the real transient time, are precluded from track-coupling candidates for used in generation of hypotheses.

(11) The environmental information storage stores environmental information representing a transient time in which a mobile body passes by a passable path in a tracking area. Herein, the hypothesis generation part calculates a real transient time from a track disappearance detection time to a next track appearance detection time with respect to each track-coupling candidate while estimating a transient time of a mobile body, from a track disappearance time to a next track appearance time, based on environmental information. Track-coupling candidates, in which the estimated transient time is longer than the real transient time, are precluded from track-coupling candidates for use in generation of hypotheses.

Lastly, the present invention is not necessarily limited to the foregoing embodiments and variations since the present invention may embrace all the mobile body track identification technologies that fall within the scope of the invention defined in the appended claims.

INDUSTRIAL APPLICABILITY

The present invention is applicable to mobile body track identification technology that determines which mobile body matches which track detected in a tracking area.

The present invention is applicable to security technologies in such a way that, for example, when positions of persons who work in offices or factories are correlated to employee numbers inherent in individual persons in tracking, it is possible to determine whether or not each area is accessible in response to security authority per each person, thus realizing an alert function when an unauthorized person enters a restricted area.

Additionally, the present invention is applicable to marketing technologies in such a way that trends of shoppers are measured by way of tracking using the correlation between positions of shoppers who are shopping for goods in shopping centers and membership numbers inherent in individual persons.

REFERENCE SIGNS LIST

1 positional information detection device
2 identification information detection device
3 mobile body track identification device
4 identification result output device
5 attribute information detection device
6 mobility information detection device
31 track-coupling candidate generation part
32 hypothesis generation part
33 likelihood calculation part
34 likelihood storage
37 map storage
38 environmental information storage
50 tracking area
91 track-coupling candidate generation part
92 hypothesis generation part
93 likelihood calculation part
330 likelihood calculation control part
331 track-coupling likelihood calculation part
332 identification likelihood calculation part
333 hypothesis storage
334 attribute likelihood calculation part
335 mobility likelihood calculation part

The invention claimed is:

1. A mobile body track identification system comprising:
a track-coupling candidate generation part that is configured to generate track-coupling candidates corresponding to combinations of tracks of mobile bodies detected in a predetermined time in the past;
a hypothesis generation part that is configured to generate sets of track-coupling candidate/identification pairs combining track-coupling candidates and identifications of mobile bodies detected in the predetermined time in the past, thus generating hypotheses corresponding to sets of track-coupling candidate/identification pairs satisfying a predetermined condition; and
a likelihood calculation part which is configured to select individual hypotheses so as to calculate identification likelihoods representing likelihoods of detecting identifications with respect to tracks indicated by track-coupling candidates included in each of track-coupling candidate/identification pairs ascribed to each of the selected hypotheses, and to integrate identification likelihoods for each track-coupling candidate/identification pair so as to calculate an identification likelihood for each of the selected hypotheses, to estimate a most-probable hypothesis based on identification likelihoods of hypotheses.

2. The mobile body track identification system according to claim 1 further comprising a map storage that is configured to store a probability map defining detection probabilities of identifications of mobile bodies in response to positional coordinates of mobile bodies in the tracking area in advance,
wherein the likelihood calculation part includes
an identification likelihood calculation part which is configured to specify a position of a mobile body on tracks indicated by each track-coupling candidate at each identification detection time for each track-coupling candidate/identification pair ascribed to each of the selected hypotheses, to read a probability value of detecting the mobile body at the position from the probability map, to calculate an identification likelihood based on the probability value, to integrate identification likelihoods for each track-coupling candidate/identification pair so as to calculate an identification likelihood regarding each of the selected hypotheses, and
a most-probable estimation part that is configured to estimate the most-probable hypothesis based on identification likelihoods of hypotheses.

3. The mobile body track identification system according to claim 2 further comprising a likelihood storage that is configured to store track/identification correlation likelihoods representing likelihoods of correlating identifications to tracks of mobile bodies,
- wherein the identification likelihood calculation part is configured to calculate a track/identification correlation likelihood, corresponding to a current combination of a track and an identification included in track-coupling candidates in track-coupling candidate/identification pairs ascribed to the most-probable hypothesis and all the hypotheses generated by the hypothesis generation part, so as to store them in the likelihood storage, and
- wherein the identification likelihood calculation part is further configured to calculate an identification likelihood regarding each track-coupling candidate/identification pair based on the track/identification correlation likelihood corresponding to the current combination of the track and the identification included in track-coupling candidates for each track-coupling candidate/identification pair as well as the probability value which is read from the probability map at each identification detection time.

4. The mobile body track identification system according to claim 2 further comprising a hypothesis storage that is configured to store the most-probable hypothesis and all the hypotheses generated by the hypothesis generation part, and an information history variation determination part that is configured to determine whether or not variations occur in identifications detected in the predetermined time in the past,
- wherein the track-coupling candidate generation part is configured to generate track-coupling candidates when the information history variation determination part determines that variations occur in identifications,
- wherein the hypothesis generation part is configured to generate hypotheses when the information history variation determination part determines that variations occur in identifications,
- wherein individual hypotheses are to be selected from among hypotheses generated by the hypothesis generation part when the information history variation determination part determines that variations occur in identifications, while individual hypotheses are to be selected from among hypotheses stored in the hypothesis storage when the information history variation determination part determines that no variations occur in identifications, and
- wherein the most-probable hypothesis is to be estimated among hypotheses generated by the hypothesis generation part when the information history variation determination part determines that variations occur in identifications, whereby the track-coupling candidate generation part is further to store the most-probable hypothesis in the hypothesis storage together with all the hypotheses generated by the hypothesis generation part.

5. The mobile body track identification system according to claim 2, wherein the hypothesis generation part is further configured to correlate attributes of mobile bodies detected in the predetermined time in the past to track-coupling candidates so as to generate sets of track-coupling candidate/identification pairs, combining track-coupling candidates, correlated to attributes, and identifications of mobile bodies, to generate hypotheses corresponding to sets of track-coupling candidate/identification pairs satisfying a predetermined condition,
- wherein the likelihood calculation part includes an attribute likelihood calculation part which is configured to calculate an attribute likelihood representing a likelihood of indicating the same mobile body with attributes, correlated to track-coupling candidates included in track-coupling candidate/identification pairs ascribed to each of the selected hypotheses, and which to integrate attribute likelihoods for each track-coupling candidate/identification pair, thus calculating an attribute likelihood regarding each of the selected hypotheses, and
- wherein the most-probable estimation part is further configured to estimate the most-probable hypothesis based on identification likelihoods and attribute likelihoods of hypotheses.

6. The mobile body track identification system according to claim 2, wherein the hypothesis generation part is further configured to correlate mobility values of mobile bodies detected in the predetermined time in the past to track-coupling candidates so as to generate sets of track-coupling candidate/identification pairs combining track-coupling candidates correlated to mobility values and identifications of mobile bodies, to generate hypotheses corresponding to sets of track-coupling candidate/identification pairs satisfying the predetermined condition,
- wherein the likelihood calculation part includes a mobility likelihood calculation part which is configured to calculate a mobility likelihood representing a likelihood of indicating the same mobile body with mobility values correlated to track-coupling candidates included in track-coupling candidate/identification pairs ascribed to each of the selected hypotheses, and which integrates mobility likelihoods for each track-coupling candidate/identification pair, to calculate a mobility likelihood for each of the selected hypotheses, and
- wherein the most-probable estimation part is further configured to estimate the most-probable hypothesis based on identification likelihoods and mobility likelihoods of hypotheses.

7. The mobile body track identification system according to claim 2, wherein the likelihood calculation part further includes a track-coupling likelihood calculation part that is configured to calculate a track-coupling likelihood representing a likelihood of connecting tracks included in each of track-coupling candidates in track-coupling candidate/identification pairs ascribed to each of the selected hypotheses, and
- wherein the most-probable estimation part is further configured to estimate the most-probable hypothesis based on identification likelihoods and track-coupling likelihoods of hypotheses.

8. The mobile body track identification system according to claim 7, wherein the track-coupling likelihood calculation part is further configured to calculate track-coupling likelihoods based on detection times and positional coordinates of mobile bodies defining tracks.

9. The mobile body track identification system according to claim 1, wherein the track-coupling candidate generation part is further configured to calculate track-coupling likelihoods representing likelihoods of connecting tracks included in the generated track-coupling candidates so as to select track-coupling candidates whose track-coupling likelihoods are equal to or above a threshold, and
- wherein the hypothesis generation part is further configured to generate hypotheses by use of the selected track-coupling candidates.

10. The mobile body track identification system according to claim 1 further comprising:
- an environmental information storage that is configured to store environmental information by use of a position of an obstruction disposed in a tracking area and a transient time of a mobile body passing by the obstruction, wherein the hypothesis generation part is further configured to calculate a real transient time from a track disappearance detection time to a next track appearance detection time with respect to each track-coupling candidate, and to estimate a transient time of the mobile body from a track disappearance time to a next track appearance time based on the environmental information, to preclude track-coupling candidates with the estimated transient time longer than the real transient time from track-coupling candidates for use in generation of hypotheses.

11. The mobile body track identification system according to claim 1 further comprising an environmental information storage that is configured to store environmental information representing a transient time of a mobile body passing along a passable path in a tracking area,
wherein the hypothesis generation part is configured to calculate a real transient time from a track disappearance detection time to a next track appearance detection time with respect to each track-coupling candidate, and to estimate a transient time of a mobile body from a track disappearance time to a next track appearance time based on the environmental information, to preclude track coupling candidates each having the estimated transient time longer than the real transient time from track-coupling candidates for use in generation of hypotheses.

12. A mobile body track identification method comprising:
generating track-coupling candidates corresponding to combinations of tracks of mobile bodies detected in a predetermined time in the past;
generating sets of track-coupling candidate/identification pairs combining track-coupling candidates and identifications of mobile bodies detected in the predetermined time in the past, thus generating hypotheses corresponding to sets of track-coupling candidate/identification pairs satisfying a predetermined condition;
selecting individual hypotheses so as to calculate identification likelihoods representing likelihoods of detecting identifications with respect to tracks indicated by track-coupling candidates included in each of track-coupling candidate/identification pairs ascribed to each of the selected hypotheses;
integrating identification likelihoods for each track-coupling candidate/identification pair so as to calculate an identification likelihood for each of the selected hypotheses; and
estimating a most-probable hypothesis based on identification likelihoods of hypotheses.

13. The mobile body track identification method according to claim 12 further comprising:
storing a probability map defining detection probabilities of identifications of mobile bodies in response to positional coordinates of mobile bodies in the tracking area in advance;
specifying a position of a mobile body on tracks indicated by each track-coupling candidate at each identification detection time for each track-coupling candidate/identification pair ascribed to each of the selected hypotheses;
reading a probability value of detecting the mobile body at the position from the probability map;
calculating an identification likelihood based on the probability value;
further integrating identification likelihoods for each track-coupling candidate/identification pair so as to calculate an identification likelihood regarding each of the selected hypotheses; and estimating the most-probable hypothesis based on identification likelihoods of hypotheses.

14. The mobile body track identification method according to claim 13 further comprising:
storing track/identification correlation likelihoods representing likelihoods of correlating identifications to tracks of mobile bodies;
calculating a track/identification correlation likelihood, corresponding to a current combination of a track and an identification included in track-coupling candidates in track-coupling candidate/identification pairs ascribed to the most-probable hypothesis and all other hypotheses; and
calculating an identification likelihood regarding each track-coupling candidate/identification pair based on the track/identification correlation likelihood corresponding to the current combination of the track and the identification included in track-coupling candidates for each track-coupling candidate/identification pair as well as the probability value read from the probability map at each identification detection time.

15. The mobile body track identification method according to claim 13 further comprising:
storing the most-probable hypothesis and relevant hypotheses;
determining whether or not variations occur in identifications detected in the predetermined time in the past;
generating track-coupling candidates so as to generate hypotheses when it is determined that variations occur in identifications;
selecting individual hypotheses from among the generated hypotheses when it is determined that variations occur in identifications, while selecting individual hypotheses from among the stored hypotheses when it is determined that no variations occur in identifications; and
upon estimating the most-probable hypothesis among the generated hypotheses when it is determined that variations occur in identifications, storing the most-probable hypothesis together with all the other generated hypotheses.

16. The mobile body track identification method according to claim 13 further comprising:
correlating attributes of mobile bodies detected in the predetermined time in the past to track-coupling candidates so as to generate sets of track-coupling candidate/identification pairs, combining track-coupling candidates, correlated to attributes, and identifications of mobile bodies, thus generating hypotheses corresponding to sets of track-coupling candidate/identification pairs satisfying a predetermined condition;
calculating an attribute likelihood representing a likelihood of indicating the same mobile body with attributes, correlated to track-coupling candidates included in track-coupling candidate/identification pairs ascribed to each of the selected hypotheses;
integrating attribute likelihoods for each track-coupling candidate/identification pair, thus calculating an attribute likelihood regarding each of the selected hypotheses; and
estimating the most-probable hypothesis based on identification likelihoods and attribute likelihoods of hypotheses.

17. The mobile body track identification method according to claim 13
further comprising:
correlating mobility values of mobile bodies detected in the predetermined time in the past to track-coupling candidates so as to generate sets of track-coupling candidate/identification pairs combining track-coupling candidates correlated to mobility values and identifications of mobile bodies, thus generating hypotheses corresponding to sets of track-coupling candidate/identification pairs satisfying the predetermined condition;

calculating a mobility likelihood representing a likelihood of indicating the same mobile body with mobility values correlated to track-coupling candidates included in track-coupling candidate/identification pairs ascribed to each of the selected hypotheses;

integrating mobility likelihoods for each track-coupling candidate/identification pair, thus calculating a mobility likelihood for each of the selected hypotheses; and estimating the most-probable hypothesis based on identification likelihoods and mobility likelihoods of hypotheses.

18. The mobile body track identification method according to claim 13 further comprising:

calculating a track-coupling likelihood representing a likelihood of connecting tracks included in each of track-coupling candidates in track-coupling candidate/identification pairs ascribed to each of the selected hypotheses; and estimating the most-probable hypothesis based on identification likelihoods and track-coupling likelihoods of hypotheses.

19. The mobile body track identification method according to claim 18 further comprising:

calculating track-coupling likelihoods based on detection times and positional coordinates of mobile bodies used to define tracks.

20. The mobile body track identification method according to claim 12 further comprising:

calculating track-coupling likelihoods representing likelihoods of connecting tracks included in track-coupling candidates so as to select track-coupling candidates whose track-coupling likelihoods are equal to or above a threshold; and generating hypotheses by use of the selected track-coupling candidates.

21. The mobile body track identification method according to claim 12 further comprising:

storing environmental information by use of a position of obstruction disposed in a tracking area and a transient time of a mobile body passing by the obstruction;

calculating a real transient time from a track disappearance detection time to a next track appearance detection time with respect to each track-coupling candidate;

estimating a transient time of the mobile body from a track disappearance time to a next track appearance time based on the environmental information; and precluding track-coupling candidates each having the estimated transient time longer than the real transient time from track-coupling candidates for use in generation of hypotheses.

22. The mobile body track identification method according to claim 12 further comprising:

storing environmental information representing a transient time of a mobile body along a passable path in a tracking area;

calculating a real transient time from a track disappearance detection time to a next track appearance detection time with respect to each track-coupling candidate;

estimating a transient time of a mobile body from a track disappearance time to a next track appearance time based on the environmental information; and precluding track-coupling candidates each having the estimated transient time longer than the real transient time from track-coupling candidates for use in generation of hypotheses.

23. A non-transitory computer-readable storage medium implementing a mobile body track identification method comprising:

generating track-coupling candidates corresponding to combinations of tracks of mobile bodies detected in a predetermined time in the past;

generating sets of track-coupling candidate/identification pairs combining track-coupling candidates and identifications of mobile bodies detected in the predetermined time in the past, thus generating hypotheses corresponding to sets of track-coupling candidate/identification pairs satisfying a predetermined condition;

selecting individual hypotheses so as to calculate identification likelihoods representing likelihoods of detecting identifications with respect to tracks indicated by track-coupling candidates included in each of track-coupling candidate/identification pairs ascribed to each of the selected hypotheses;

integrating identification likelihoods for each track-coupling candidate/identification pair so as to calculate an identification likelihood for each of the selected hypotheses; and estimating a most-probable hypothesis based on identification likelihoods of hypotheses.

24. The non-transitory computer-readable storage medium implementing a mobile body track identification method according to claim 23 further comprising:

storing a probability map defining detection probabilities of identifications of mobile bodies in response to their positional coordinates in the tracking area in advance;

specifying a position of a mobile body on tracks indicated by each track-coupling candidate at each identification detection time for each track-coupling candidate/identification pair ascribed to each of the selected hypotheses;

reading a probability value of detecting the mobile body at the position from the probability map;

calculating an identification likelihood based on the probability value;

further integrating identification likelihoods for each track-coupling candidate/identification pair so as to calculate an identification likelihood regarding each of the selected hypotheses; and estimating the most-probable hypothesis based on identification likelihoods of hypotheses.

25. The non-transitory computer-readable storage medium implementing a mobile body track identification method according to claim 24 further comprising:

storing track/identification correlation likelihoods representing likelihoods of correlating identifications to tracks of mobile bodies;

calculating a track/identification correlation likelihood, corresponding to a current combination of a track and an identification included in track-coupling candidates in track-coupling candidate/identification pairs ascribed to the most-probable hypothesis and all other hypotheses; and calculating an identification likelihood regarding each track-coupling candidate/identification pair based on the track/identification correlation likelihood corresponding to the current combination of the track and the identification included in track-coupling candidates for each track-coupling candidate/identification pair as well as the probability value read from the probability map at each identification detection time.

26. The non-statutory computer-readable storage medium implementing a mobile body track identification method according to claim 24 further comprising:
storing the most-probable hypothesis and relevant hypotheses;
determining whether or not variations occur in identifications detected in the predetermined time in the past;
generating track-coupling candidates so as to generate hypotheses when it is determined that variations occur in identifications;
selecting individual hypotheses from among the generated hypotheses when it is determined that variations occur in identifications, while selecting individual hypotheses from among the stored hypotheses when it is determined that no variations occur in identifications; and
upon estimating the most-probable hypothesis among the generated hypotheses when it is determined that variations occur in identifications, storing the most-probable hypothesis together with all the other generated hypotheses.

27. The non-transitory computer-readable storage medium implementing a mobile body track identification method according to claim 24 further comprising:
correlating attributes of mobile bodies detected in the predetermined time in the past to track-coupling candidates so as to generate sets of track-coupling candidate/identification pairs, combining track-coupling candidates, correlated to attributes, and identifications of mobile bodies, thus generating hypotheses corresponding to sets of track-coupling candidate/identification pairs satisfying a predetermined condition;
calculating an attribute likelihood representing a likelihood of indicating the same mobile body with attributes, correlated to track-coupling candidates included in track-coupling candidate/identification pairs ascribed to each of the selected hypotheses;
integrating attribute likelihoods for each track-coupling candidate/identification pair, thus calculating an attribute likelihood regarding each of the selected hypotheses; and
estimating the most-probable hypothesis based on identification likelihoods and attribute likelihoods of hypotheses.

28. The non-transitory computer-readable storage medium implementing a mobile body track identification method according to claim 24 further comprising:
correlating mobility values of mobile bodies detected in the predetermined time in the past to track-coupling candidates so as to generate sets of track-coupling candidate/identification pairs combining track-coupling candidates correlated to mobility values and identifications of mobile bodies, thus generating hypotheses corresponding to sets of track-coupling candidate/identification pairs satisfying the predetermined condition;
calculating a mobility likelihood representing a likelihood of indicating the same mobile body with mobility values correlated to track-coupling candidates included in track-coupling candidate/identification pairs ascribed to each of the selected hypotheses;
integrating mobility likelihoods for each track-coupling candidate/identification pair, thus calculating a mobility likelihood for each of the selected hypotheses; and
estimating the most-probable hypothesis based on identification likelihoods and mobility likelihoods of hypotheses.

29. The non-transitory computer-readable storage medium implementing a mobile body track identification method according to claim 24 further comprising:
calculating a track-coupling likelihood representing a likelihood of connecting tracks included in each of track-coupling candidates in track-coupling candidate/identification pairs ascribed to each of the selected hypotheses; and
estimating the most-probable hypothesis based on identification likelihoods and track-coupling likelihoods of hypotheses.

30. The non-transitory computer-readable storage medium implementing a mobile body track identification method according to claim 29 further comprising:
calculating track-coupling likelihoods based on detection times and positional coordinates of mobile bodies used to define tracks.

31. The non-transitory computer-readable storage medium implementing a mobile body track identification method according to claim 23 further comprising:
calculating track-coupling likelihoods representing likelihoods of connecting tracks included in track-coupling candidates so as to select track-coupling candidates whose track-coupling likelihoods are equal to or above a threshold; and
generating hypotheses by use of the selected track-coupling candidates.

32. The non-transitory computer-readable storage medium implementing a mobile body track identification method according to claim 23 further comprising:
storing environmental information by use of a position of an obstruction disposed in a tracking area and a transient time of a mobile body passing by the obstruction;
calculating a real transient time from a track disappearance detection time to a next track appearance detection time with respect to each track-coupling candidate;
estimating a transient time of the mobile body from a track disappearance time to a next track appearance time based on the environmental information; and
precluding track-coupling candidates each having the estimated transient time longer than the real transient time from track-coupling candidates for use in generation of hypotheses.

33. The non-transitory computer-readable storage medium implementing a mobile body track identification method according to claim 23 further comprising:
storing environmental information representing a transient time of a mobile body along a passable path in a tracking area;
calculating a real transient time from a track disappearance detection time to a next track appearance detection time with respect to each track-coupling candidate;
estimating a transient time of a mobile body from a track disappearance time to a next track appearance time based on the environmental information; and
precluding track-coupling candidates each having the estimated transient time longer than the real transient time from track-coupling candidates for use in generation of hypotheses.

* * * * *

UNITED STATES PATENT AND TRADEMARK OFFICE
CERTIFICATE OF CORRECTION

| | | |
|---|---|---|
| PATENT NO. | : 8,989,438 B2 | Page 1 of 1 |
| APPLICATION NO. | : 13/391199 | |
| DATED | : March 24, 2015 | |
| INVENTOR(S) | : Moriguchi et al. | |

It is certified that error appears in the above-identified patent and that said Letters Patent is hereby corrected as shown below:

In the specification

Column 29, Line 62: Delete "(called a)" and insert -- (called α) --

Column 50, Line 43: Delete "Slid)" and insert -- S11d) --

In the claims

Column 77, Line 24: Claim 11, delete "track coupling" and insert -- track-coupling --

Column 81, Line 3: Claim 26, delete "non-statutory" and insert -- non-transitory --

Signed and Sealed this
Twenty-fourth Day of November, 2015

Michelle K. Lee
*Director of the United States Patent and Trademark Office*